US011466563B2

(12) United States Patent
Cerrahoğlu et al.

(10) Patent No.: US 11,466,563 B2
(45) Date of Patent: Oct. 11, 2022

(54) SYSTEMS AND METHODS FOR SUBTERRANEAN FLUID FLOW CHARACTERIZATION

(71) Applicant: Lytt Limited, Middlesex (GB)

(72) Inventors: Çağri Cerrahoğlu, London (GB); Pradyumna Thiruvenkatanathan, London (GB)

(73) Assignee: LYTT LIMITED, Middlesex (GB)

( * ) Notice: Subject to any disclaimer, the term of this patent is extended or adjusted under 35 U.S.C. 154(b) by 0 days.

(21) Appl. No.: 17/330,117

(22) Filed: May 25, 2021

(65) Prior Publication Data

US 2021/0388716 A1    Dec. 16, 2021

(30) Foreign Application Priority Data

Jun. 11, 2020 (WO) ................. PCT/EP2020/066171

(51) Int. Cl.
*E21B 47/107* (2012.01)
*E21B 47/07* (2012.01)
*G01H 9/00* (2006.01)
*G01K 11/32* (2021.01)

(52) U.S. Cl.
CPC ............ *E21B 47/107* (2020.05); *E21B 47/07* (2020.05); *G01H 9/004* (2013.01); *G01K 11/32* (2013.01); *E21B 2200/20* (2020.05)

(58) Field of Classification Search
CPC .... E21B 47/107; E21B 47/07; E21B 2200/20; G01H 9/004; G01K 11/32
See application file for complete search history.

(56) References Cited

U.S. PATENT DOCUMENTS

| | | | |
|---|---|---|---|
| 3,563,311 | A | 2/1971 | Stein |
| 3,753,257 | A | 8/1973 | Arnold |
| 3,841,144 | A | 10/1974 | Baldwin |
| 3,854,323 | A | 12/1974 | Hearn et al. |
| 4,668,093 | A | 5/1987 | Cahill |
| 5,042,297 | A | 8/1991 | Lessi |
| 5,113,941 | A | 5/1992 | Donovan |
| 5,257,530 | A | 11/1993 | Beattie et al. |
| 5,812,493 | A | 9/1998 | Robein et al. |
| 5,825,017 | A | 10/1998 | Pryor |

(Continued)

FOREIGN PATENT DOCUMENTS

| | | |
|---|---|---|
| CA | 2760662 A1 | 12/2010 |
| CA | 2953938 A1 | 1/2016 |

(Continued)

OTHER PUBLICATIONS

PCT/EP2020/066171 International Search Report and Written Opinion dated Feb. 3, 2021 (13 p.).

(Continued)

*Primary Examiner* — Michael R Wills, III
(74) *Attorney, Agent, or Firm* — Conley Rose, P.C.

(57) ABSTRACT

A method of monitoring fluid outflow along a wellbore includes obtaining an acoustic signal from a sensor within the wellbore, determining one or more frequency domain features from the acoustic signal, and identifying one or more fluid outflow locations along the portion of the depth of the wellbore using the one or more frequency domain features. The acoustic signal includes acoustic samples across a portion of a depth of the wellbore.

20 Claims, 11 Drawing Sheets

(56) References Cited

U.S. PATENT DOCUMENTS

| | | |
|---|---|---|
| 5,971,095 A | 10/1999 | Ozbek |
| 6,075,611 A | 6/2000 | Dussan et al. |
| 6,151,556 A | 11/2000 | Allen |
| 6,201,765 B1 | 3/2001 | Ireson |
| 6,450,037 B1 | 9/2002 | McGuinn et al. |
| 6,501,067 B2 | 12/2002 | Jones et al. |
| 6,516,275 B2 | 2/2003 | Lazaratos |
| 6,550,342 B2 | 4/2003 | Croteau et al. |
| 6,555,807 B2 | 4/2003 | Clayton et al. |
| 6,587,798 B2 | 7/2003 | Kersey et al. |
| 6,601,458 B1 | 8/2003 | Gysling et al. |
| 6,601,671 B1 | 8/2003 | Zhao et al. |
| 6,651,007 B2 | 11/2003 | Ozbek |
| 6,672,131 B1 | 1/2004 | Aldal et al. |
| 6,738,715 B2 | 5/2004 | Shatilo et al. |
| 6,751,559 B2 | 6/2004 | Fookes et al. |
| 6,782,150 B2 | 8/2004 | Davis et al. |
| 6,813,403 B2 | 11/2004 | Tennyson |
| 6,829,538 B2 | 12/2004 | de Kok |
| 6,837,098 B2 | 1/2005 | Gysling et al. |
| 6,904,368 B2 | 6/2005 | Reshef et al. |
| 6,933,491 B2 | 8/2005 | Maida, Jr. |
| 6,995,352 B2 | 2/2006 | Hay et al. |
| 7,028,543 B2 | 4/2006 | Hardage et al. |
| 7,030,971 B1 | 4/2006 | Payton |
| 7,072,044 B2 | 7/2006 | Kringlebotn et al. |
| 7,088,639 B2 | 8/2006 | Walls et al. |
| 7,130,496 B2 | 10/2006 | Rogers |
| 7,219,762 B2 | 5/2007 | James et al. |
| 7,355,923 B2 | 4/2008 | Reshef et al. |
| 7,357,021 B2 | 4/2008 | Blacklaw |
| 7,395,864 B2 | 7/2008 | Ramachandran et al. |
| 7,398,697 B2 | 7/2008 | Allen et al. |
| 7,404,456 B2 | 7/2008 | Weaver et al. |
| 7,503,217 B2 | 3/2009 | Johansen |
| 7,652,245 B2 | 1/2010 | Crickmore et al. |
| 7,659,828 B2 | 2/2010 | Wehrs et al. |
| 7,660,200 B2 | 2/2010 | Tang |
| 7,872,736 B2 | 1/2011 | Rogers et al. |
| 7,890,280 B2 | 2/2011 | Fomme |
| 7,896,069 B2 | 3/2011 | Dria et al. |
| 7,940,389 B2 | 5/2011 | Rogers et al. |
| 7,946,341 B2 | 5/2011 | Hartog et al. |
| 3,020,616 A1 | 9/2011 | Greenaway |
| 8,023,829 B2 | 9/2011 | Nash et al. |
| 8,131,121 B2 | 3/2012 | Huffman |
| 8,200,049 B2 | 6/2012 | Kaplan et al. |
| 8,245,780 B2 | 8/2012 | Fidan et al. |
| 8,248,589 B2 | 8/2012 | DeFreitas et al. |
| 8,264,676 B2 | 9/2012 | Kanellopoulos et al. |
| 8,408,064 B2 | 4/2013 | Hartog et al. |
| 8,520,197 B2 | 8/2013 | Handerek |
| 8,534,114 B2 | 9/2013 | Ellson |
| 8,564,786 B2 | 10/2013 | Crickmore et al. |
| 8,576,386 B2 | 11/2013 | Jones et al. |
| 8,605,542 B2 | 12/2013 | Coates et al. |
| 8,614,795 B2 | 12/2013 | Duncan et al. |
| 8,634,681 B2 | 1/2014 | Rogers |
| 8,661,907 B2 | 3/2014 | Davis et al. |
| 8,755,643 B2 | 6/2014 | Nash et al. |
| 8,797,824 B2 | 8/2014 | Crickmore et al. |
| 8,902,704 B2 | 12/2014 | Zamow et al. |
| 8,923,663 B2 | 12/2014 | Hill et al. |
| 8,941,821 B2 | 1/2015 | Coupe et al. |
| 8,950,482 B2 | 2/2015 | Hill et al. |
| 8,973,444 B2 | 3/2015 | Hill et al. |
| 8,996,298 B2 | 3/2015 | Yamada |
| 8,997,585 B2 | 4/2015 | Hayward |
| 9,002,149 B2 | 4/2015 | Rogers |
| 9,052,230 B2 | 6/2015 | Kutlik et al. |
| 9,075,155 B2 | 7/2015 | Luscombe et al. |
| 9,109,944 B2 | 8/2015 | Den Boer et al. |
| 9,110,018 B2 | 8/2015 | Handerek |
| 9,140,582 B2 | 9/2015 | Farhadiroushan et al. |
| 9,140,815 B2 | 9/2015 | Lopez et al. |
| 9,146,151 B2 | 9/2015 | Kupershmidt |
| 9,228,889 B2 | 1/2016 | McCann |
| 9,243,949 B2 | 1/2016 | Crickmore et al. |
| 9,250,112 B2 | 2/2016 | Godfrey |
| 9,250,120 B2 | 2/2016 | Smith et al. |
| 9,255,836 B2 | 2/2016 | Taverner et al. |
| 9,304,017 B2 | 4/2016 | Handerek |
| 9,341,731 B2 | 5/2016 | Biswas |
| 9,347,313 B2 | 5/2016 | Wills et al. |
| 9,354,338 B1 | 5/2016 | Psaila |
| 9,377,551 B2 | 6/2016 | Hartog et al. |
| 9,377,559 B2 | 6/2016 | Cooper |
| 9,388,685 B2 | 7/2016 | Ravi et al. |
| 9,416,644 B2 | 8/2016 | McEwen-King et al. |
| 9,423,523 B2 | 8/2016 | McEwen-King |
| 9,429,466 B2 | 8/2016 | Barfoot et al. |
| 9,430,507 B2 | 8/2016 | Stowe et al. |
| 9,435,668 B2 | 9/2016 | Lewis et al. |
| 9,435,902 B2 | 9/2016 | Hill et al. |
| 9,453,821 B2 | 9/2016 | Minto et al. |
| 9,459,329 B2 | 10/2016 | McEwen-King et al. |
| 9,465,126 B2 | 10/2016 | Lewis et al. |
| 9,478,937 B1 | 10/2016 | Kupershmidt et al. |
| 9,507,030 B2 | 11/2016 | Godfrey |
| 9,512,711 B2 | 12/2016 | Sobolewski et al. |
| 9,523,790 B1 | 12/2016 | Valishin |
| 9,541,425 B2 | 1/2017 | Farhadiroushan et al. |
| 9,557,195 B2 | 1/2017 | Barfoot et al. |
| 9,561,812 B2 | 2/2017 | Godfrey |
| 9,575,196 B2 | 2/2017 | Ji et al. |
| 9,594,002 B2 | 3/2017 | Godfrey et al. |
| 9,599,489 B2 | 3/2017 | Nash et al. |
| 9,605,537 B2 | 3/2017 | Hull et al. |
| 9,606,250 B2 | 3/2017 | Hull et al. |
| 9,625,348 B2 | 4/2017 | Hill et al. |
| 9,631,972 B2 | 4/2017 | Hill et al. |
| 9,651,474 B2 | 5/2017 | Farhadiroushan et al. |
| 9,651,709 B2 | 5/2017 | Jaaskelainen |
| 9,677,956 B2 | 6/2017 | Hill et al. |
| 9,702,244 B2 | 7/2017 | Willis et al. |
| 9,719,846 B2 | 8/2017 | Ellmauthaler et al. |
| 9,733,120 B2 | 8/2017 | Stokely et al. |
| 9,739,645 B2 | 8/2017 | Hill et al. |
| 9,746,393 B2 | 8/2017 | Godfrey |
| 9,759,824 B2 | 9/2017 | Lumens et al. |
| 9,766,371 B2 | 9/2017 | Barfoot et al. |
| 9,778,097 B2 | 10/2017 | Mcewen-King |
| 9,784,642 B2 | 10/2017 | Strong et al. |
| 9,788,469 B2 | 10/2017 | Gimblet et al. |
| 9,797,239 B2 * | 10/2017 | Godfrey ................. E21B 47/10 |
| 9,810,809 B2 | 11/2017 | Farhadiroushan et al. |
| 9,816,853 B2 | 11/2017 | Crickmore et al. |
| 9,823,114 B2 | 11/2017 | Farhadiroushan et al. |
| 9,829,368 B2 | 11/2017 | Kutlik et al. |
| 9,850,749 B2 | 12/2017 | Finfer et al. |
| 9,869,795 B2 | 1/2018 | Jaaskelainen |
| 9,880,047 B2 | 1/2018 | Martin et al. |
| 9,896,929 B2 | 2/2018 | Farhadiroushan et al. |
| 9,909,903 B2 | 3/2018 | Lewis et al. |
| 9,945,215 B2 | 4/2018 | Godfrey |
| 9,945,979 B2 | 4/2018 | Stokely et al. |
| 9,983,293 B2 | 5/2018 | Farhadiroushan et al. |
| 9,989,388 B2 | 6/2018 | Farhadiroushan et al. |
| 10,018,036 B2 | 7/2018 | Ellmauthaler et al. |
| 10,031,044 B2 | 7/2018 | Kumar et al. |
| 10,067,030 B2 | 9/2018 | Hartog et al. |
| 10,101,182 B2 | 10/2018 | Barfoot |
| 10,120,104 B2 | 11/2018 | Roy et al. |
| 10,139,268 B2 | 11/2018 | Nunes et al. |
| 10,145,821 B2 | 12/2018 | Farhadiroushan et al. |
| 10,151,626 B2 | 12/2018 | Godfrey et al. |
| 10,175,374 B2 | 1/2019 | Dusterhoft et al. |
| 10,180,515 B2 | 1/2019 | Ellmauthaler et al. |
| 10,197,693 B2 | 2/2019 | Kalyanraman et al. |
| 10,198,946 B2 | 2/2019 | Crickmore et al. |
| 10,215,017 B2 | 2/2019 | Hull et al. |
| 10,221,681 B2 | 3/2019 | McEwen-King et al. |
| 10,234,345 B2 | 3/2019 | Hull et al. |
| 10,247,584 B2 | 4/2019 | Crickmore et al. |

(56) References Cited

U.S. PATENT DOCUMENTS

| | | |
|---|---|---|
| 10,260,937 B2 | 4/2019 | Dankers et al. |
| 10,267,141 B2 | 4/2019 | Nunes et al. |
| 10,274,381 B2 | 4/2019 | Kulkarni et al. |
| 10,275,402 B2 | 4/2019 | Guerriero et al. |
| 10,281,341 B2 | 5/2019 | Hull et al. |
| 10,310,113 B2 | 6/2019 | Sun et al. |
| 10,317,262 B2 | 6/2019 | Kippersund et al. |
| 10,379,239 B2 | 8/2019 | Udengaard |
| 10,393,921 B2 | 8/2019 | Cuny et al. |
| 10,401,519 B2 | 9/2019 | Willis et al. |
| 10,416,328 B2 | 9/2019 | Walters et al. |
| 10,422,365 B2 | 9/2019 | Hull et al. |
| 10,422,901 B2 | 9/2019 | Walters et al. |
| 10,429,530 B2 | 10/2019 | Rickett et al. |
| 10,444,388 B2 | 10/2019 | Dusterhoft et al. |
| 10,444,391 B2 | 10/2019 | Ellmauthaler et al. |
| 10,444,393 B2 | 10/2019 | Cheng et al. |
| 10,458,224 B2 | 10/2019 | Dickenson et al. |
| 10,481,579 B1 | 11/2019 | Putman et al. |
| 10,520,625 B2 | 12/2019 | Walters et al. |
| 10,578,757 B2 | 3/2020 | Dong et al. |
| 10,890,730 B2 | 1/2021 | Petersen |
| 10,975,687 B2 | 4/2021 | Langnes et al. |
| 11,053,791 B2 | 7/2021 | Langnes et al. |
| 11,098,576 B2 | 8/2021 | Cerrahoglu et al. |
| 11,162,353 B2 | 11/2021 | Thiruvenkatanathan |
| 11,199,084 B2 | 12/2021 | Langnes et al. |
| 11,199,085 B2 | 12/2021 | Langnes et al. |
| 11,215,049 B2 | 1/2022 | Langnes et al. |
| 11,333,636 B2 | 5/2022 | Langnes et al. |
| 2001/0037883 A1 | 11/2001 | Veneruso et al. |
| 2002/0125009 A1 | 9/2002 | Wetzel et al. |
| 2002/0139929 A1 | 10/2002 | Mullins et al. |
| 2002/0195246 A1 | 12/2002 | Davidson |
| 2003/0010126 A1 | 1/2003 | Romanet et al. |
| 2003/0014199 A1 | 1/2003 | Toomey |
| 2003/0029241 A1 | 2/2003 | Mandal |
| 2004/0059505 A1 | 3/2004 | Gallagher |
| 2004/0252748 A1 | 12/2004 | Gleitman |
| 2005/0100172 A1 | 5/2005 | Schliep et al. |
| 2005/0246111 A1 | 11/2005 | Gysling et al. |
| 2006/0113089 A1 | 6/2006 | Henriksen et al. |
| 2006/0165239 A1 | 7/2006 | Langner et al. |
| 2006/0165344 A1 | 7/2006 | Mendez et al. |
| 2007/0047867 A1 | 3/2007 | Goldner |
| 2007/0163780 A1 | 7/2007 | Onodera et al. |
| 2007/0199696 A1 | 8/2007 | Walford |
| 2007/0215345 A1 | 9/2007 | Lafferty et al. |
| 2007/0234789 A1 | 10/2007 | Glasbergen et al. |
| 2007/0247631 A1 | 10/2007 | Paulson |
| 2007/0253561 A1 | 11/2007 | Williams et al. |
| 2008/0065362 A1 | 3/2008 | Lee et al. |
| 2008/0137475 A1 | 6/2008 | Maisons |
| 2008/0154510 A1 | 6/2008 | Scott |
| 2008/0232748 A1 | 9/2008 | Nash |
| 2008/0314142 A1 | 12/2008 | Davies |
| 2009/0010104 A1 | 1/2009 | Leaney |
| 2009/0055098 A1 | 2/2009 | Mese et al. |
| 2009/0132183 A1 | 5/2009 | Hartog et al. |
| 2009/0202192 A1 | 8/2009 | Taverner et al. |
| 2009/0213692 A1 | 8/2009 | Martinez et al. |
| 2010/0163223 A1 | 7/2010 | Brown |
| 2010/0243241 A1 | 9/2010 | Hampton et al. |
| 2010/0258304 A1 | 10/2010 | Hegeman |
| 2010/0268489 A1 | 10/2010 | Lie et al. |
| 2011/0011577 A1 | 1/2011 | Dusterhoft et al. |
| 2011/0030467 A1 | 2/2011 | Bakulin |
| 2011/0042071 A1 | 2/2011 | Hsu et al. |
| 2011/0085415 A1 | 4/2011 | Morton et al. |
| 2011/0094741 A1 | 4/2011 | Vigneaux et al. |
| 2011/0110191 A1 | 5/2011 | Williams-Stroud et al. |
| 2011/0139538 A1 | 6/2011 | Hill et al. |
| 2011/0149688 A1 | 6/2011 | Hill et al. |
| 2011/0188346 A1 | 8/2011 | Hull |
| 2011/0255077 A1 | 10/2011 | Rogers |
| 2011/0301882 A1 | 12/2011 | Andersen |
| 2011/0315369 A1 | 12/2011 | Holderman et al. |
| 2012/0020184 A1 | 1/2012 | Wilson et al. |
| 2012/0043079 A1 | 2/2012 | Wassouf et al. |
| 2012/0057432 A1 | 3/2012 | Hill et al. |
| 2012/0092960 A1 | 4/2012 | Gaston et al. |
| 2012/0096922 A1 | 4/2012 | Ellson |
| 2012/0111560 A1 | 5/2012 | Hill et al. |
| 2012/0137781 A1 | 6/2012 | Hill et al. |
| 2012/0152024 A1 | 6/2012 | Johansen |
| 2012/0155218 A1 | 6/2012 | Beasley et al. |
| 2012/0201096 A1 | 8/2012 | Valero et al. |
| 2012/0257475 A1 | 10/2012 | Luscombe et al. |
| 2012/0290213 A1 | 11/2012 | Huo et al. |
| 2012/0298421 A1 | 11/2012 | Coates et al. |
| 2013/0139600 A1 | 6/2013 | McEwen-King et al. |
| 2013/0151203 A1 | 6/2013 | McEwen-King et al. |
| 2013/0166227 A1 | 6/2013 | Hermann et al. |
| 2013/0167628 A1 | 7/2013 | Hull et al. |
| 2013/0170519 A1 | 7/2013 | Alliot |
| 2013/0298665 A1 | 11/2013 | Minchau |
| 2013/0299165 A1 | 11/2013 | Crow |
| 2013/0319121 A1 | 12/2013 | Hill et al. |
| 2014/0025319 A1 | 1/2014 | Farhadiroushan et al. |
| 2014/0036627 A1 | 2/2014 | Hull et al. |
| 2014/0036628 A1 | 2/2014 | Hill et al. |
| 2014/0044222 A1 | 2/2014 | Kim et al. |
| 2014/0069173 A1 | 3/2014 | Roy et al. |
| 2014/0086009 A1 | 3/2014 | Yoneshima |
| 2014/0110124 A1 | 4/2014 | Goldner et al. |
| 2014/0150523 A1 | 6/2014 | Stokely et al. |
| 2014/0150548 A1 | 6/2014 | Childers et al. |
| 2014/0204368 A1 | 7/2014 | Lewis et al. |
| 2014/0216151 A1 | 8/2014 | Godfrey et al. |
| 2014/0334253 A1 | 11/2014 | Lumens et al. |
| 2014/0362668 A1 | 12/2014 | McEwen-King |
| 2015/0000415 A1 | 1/2015 | Kelley |
| 2015/0085610 A1 | 3/2015 | Raum et al. |
| 2015/0144333 A1 | 5/2015 | Lee et al. |
| 2015/0146759 A1 | 5/2015 | Johnston |
| 2015/0234526 A1 | 8/2015 | Chalubert et al. |
| 2015/0235544 A1 | 8/2015 | Hernandez et al. |
| 2015/0308191 A1 | 10/2015 | Zhan et al. |
| 2015/0308909 A1 | 10/2015 | Carneal et al. |
| 2016/0123798 A1 | 5/2016 | Godfrey et al. |
| 2016/0138386 A1 | 5/2016 | Stokley et al. |
| 2016/0146962 A1 | 5/2016 | Hayward |
| 2016/0201453 A1 | 7/2016 | Kaiser et al. |
| 2016/0223389 A1 | 8/2016 | Farhadiroushan et al. |
| 2016/0259079 A1 | 9/2016 | Wilson et al. |
| 2016/0265345 A1 | 9/2016 | In'T Panhuis et al. |
| 2016/0281494 A1* | 9/2016 | Shirdel .............. E21B 43/24 |
| 2016/0312552 A1 | 10/2016 | Early et al. |
| 2016/0312604 A1 | 10/2016 | Hull et al. |
| 2016/0320232 A1 | 11/2016 | Nunes et al. |
| 2016/0327419 A1 | 11/2016 | Hellevang et al. |
| 2016/0342569 A1 | 11/2016 | Al Marzouqi |
| 2016/0356665 A1 | 12/2016 | Felemban et al. |
| 2016/0369590 A1 | 12/2016 | Tonkin et al. |
| 2016/0369607 A1 | 12/2016 | Roy et al. |
| 2017/0010385 A1 | 1/2017 | Englich et al. |
| 2017/0016312 A1 | 1/2017 | Clarke et al. |
| 2017/0039826 A1 | 2/2017 | Cojocaur |
| 2017/0045410 A1 | 2/2017 | Crickmore et al. |
| 2017/0052049 A1 | 2/2017 | Crickmore et al. |
| 2017/0052050 A1* | 2/2017 | Crickmore .......... E21B 47/07 |
| 2017/0074998 A1 | 3/2017 | McColpin et al. |
| 2017/0074999 A1 | 3/2017 | Walters et al. |
| 2017/0075001 A1 | 3/2017 | McColpin et al. |
| 2017/0075002 A1 | 3/2017 | Ranjan et al. |
| 2017/0075003 A1 | 3/2017 | Dusterhoft et al. |
| 2017/0075004 A1 | 3/2017 | McColpin et al. |
| 2017/0075005 A1 | 3/2017 | Ranjan et al. |
| 2017/0082766 A1 | 3/2017 | Milne et al. |
| 2017/0090054 A1 | 3/2017 | Willis et al. |
| 2017/0119255 A1 | 5/2017 | Mahajan et al. |
| 2017/0123089 A1 | 5/2017 | Walters et al. |
| 2017/0153154 A1 | 6/2017 | Hull et al. |
| 2017/0205253 A1 | 7/2017 | Handerek |

(56) References Cited

U.S. PATENT DOCUMENTS

| | | |
|---|---|---|
| 2017/0234999 A1 | 8/2017 | Dykstra et al. |
| 2017/0241830 A1 | 8/2017 | Jaaskelainen |
| 2017/0241831 A1 | 8/2017 | Jaaskelainen |
| 2017/0292862 A1 | 10/2017 | Godfrey |
| 2017/0315261 A1 | 11/2017 | Bartling et al. |
| 2017/0342814 A1 | 11/2017 | Krueger et al. |
| 2017/0343389 A1 | 11/2017 | Parker et al. |
| 2017/0350234 A1 | 12/2017 | Xia et al. |
| 2017/0363756 A1 | 12/2017 | El Allouche et al. |
| 2017/0371057 A1 | 12/2017 | Mateeva et al. |
| 2018/0010443 A1 | 1/2018 | Lu et al. |
| 2018/0024260 A1 | 1/2018 | Hornman et al. |
| 2018/0031413 A1 | 2/2018 | Stokely et al. |
| 2018/0045543 A1 | 2/2018 | Farhadiroushan et al. |
| 2018/0045768 A1 | 2/2018 | Godfrey et al. |
| 2018/0058196 A1 | 3/2018 | Jaaskelainen et al. |
| 2018/0066490 A1 | 3/2018 | Kjos |
| 2018/0087372 A1 | 3/2018 | Stokely et al. |
| 2018/0094952 A1 | 4/2018 | Handerek |
| 2018/0112519 A1 | 4/2018 | Duan et al. |
| 2018/0112520 A1 | 4/2018 | Duan |
| 2018/0112523 A1 | 4/2018 | Yang et al. |
| 2018/0136354 A1 | 5/2018 | Haldorsen |
| 2018/0172860 A1 | 6/2018 | Wilson et al. |
| 2018/0180658 A1 | 6/2018 | Godfrey |
| 2018/0203144 A1 | 7/2018 | Karrenbach et al. |
| 2018/0222498 A1 | 8/2018 | Kelley |
| 2018/0224572 A1 | 8/2018 | Farhadiroushan et al. |
| 2018/0230797 A1 | 8/2018 | Seshadri et al. |
| 2018/0231658 A1 | 8/2018 | Jalilian et al. |
| 2018/0238167 A1 | 8/2018 | Ravi et al. |
| 2018/0252097 A1 | 9/2018 | Skinner et al. |
| 2018/0259662 A1 | 9/2018 | Srinivasan |
| 2018/0266854 A1 | 9/2018 | Moore et al. |
| 2018/0267201 A1 | 9/2018 | Lewis |
| 2018/0284752 A1 | 10/2018 | Celia et al. |
| 2018/0292569 A1 | 10/2018 | LeBlanc et al. |
| 2018/0320827 A1 | 11/2018 | Hull et al. |
| 2018/0340801 A1 | 11/2018 | Kelley et al. |
| 2018/0342156 A1 | 11/2018 | Martin et al. |
| 2018/0354534 A1 | 12/2018 | Cole |
| 2018/0356210 A1 | 12/2018 | Moore et al. |
| 2019/0003499 A1 | 1/2019 | Logan et al. |
| 2019/0003903 A1 | 1/2019 | Godfrey |
| 2019/0025094 A1 | 1/2019 | Lewis et al. |
| 2019/0026634 A1 | 1/2019 | Homeyer et al. |
| 2019/0033898 A1 | 1/2019 | Shah et al. |
| 2019/0064030 A1 | 2/2019 | Sundermann |
| 2019/0072379 A1 | 3/2019 | Jalilian et al. |
| 2019/0113641 A1 | 4/2019 | Fang et al. |
| 2019/0120044 A1 | 4/2019 | Langnes et al. |
| 2019/0137045 A1 | 5/2019 | Jalilian et al. |
| 2019/0169985 A1 | 6/2019 | Dickenson et al. |
| 2019/0186958 A1 | 6/2019 | Godfrey |
| 2019/0197846 A1 | 6/2019 | Englund |
| 2019/0225250 A1 | 7/2019 | Esprey et al. |
| 2019/0257169 A1 | 8/2019 | Grimsbo et al. |
| 2019/0257699 A1 | 8/2019 | Handerek et al. |
| 2019/0277135 A1 | 9/2019 | Zha |
| 2019/0323863 A1 | 10/2019 | Shatalin et al. |
| 2019/0324444 A1 | 10/2019 | Celia et al. |
| 2019/0331819 A1 | 10/2019 | Wu et al. |
| 2019/0338621 A1* | 11/2019 | Jin ............................ E21B 43/00 |
| 2019/0339688 A1 | 11/2019 | Celia et al. |
| 2019/0345803 A1* | 11/2019 | Madasu ................ G01V 99/005 |
| 2019/0353814 A1 | 11/2019 | Cha et al. |
| 2019/0375213 A1 | 12/2019 | Theopold et al. |
| 2019/0390546 A1 | 12/2019 | Langnes et al. |
| 2020/0018149 A1* | 1/2020 | Luo .......................... G01H 9/004 |
| 2020/0024942 A1 | 1/2020 | Lolla et al. |
| 2020/0032639 A1 | 1/2020 | Langnes et al. |
| 2020/0032645 A1 | 1/2020 | LeBlanc et al. |
| 2020/0048999 A1 | 2/2020 | Langnes et al. |
| 2020/0056907 A1 | 2/2020 | Godfrey |
| 2020/0057220 A1 | 2/2020 | Hull et al. |
| 2020/0070862 A1 | 3/2020 | Bilodeau et al. |
| 2020/0072993 A1* | 3/2020 | Wilson ...................... G01V 1/46 |
| 2020/0081145 A1 | 3/2020 | Padhi et al. |
| 2020/0088022 A1* | 3/2020 | Shen ........................ E21B 47/14 |
| 2020/0102821 A1 | 4/2020 | Willis et al. |
| 2020/0124489 A1 | 4/2020 | Godfrey |
| 2020/0131900 A1 | 4/2020 | Leblanc et al. |
| 2020/0158594 A1 | 5/2020 | Dankers et al. |
| 2020/0172130 A1 | 6/2020 | Esprey |
| 2020/0173273 A1 | 6/2020 | Thiruvenkatanathan |
| 2020/0173818 A1 | 6/2020 | Handerek et al. |
| 2020/0174149 A1 | 6/2020 | Yhiruvenkatanathan |
| 2020/0182047 A1 | 6/2020 | Langnes et al. |
| 2020/0184556 A1 | 6/2020 | Celia |
| 2020/0190971 A1 | 6/2020 | Thiruvenkatanathan |
| 2020/0200000 A1 | 6/2020 | Langnes et al. |
| 2020/0200943 A1 | 6/2020 | Adeyemi et al. |
| 2020/0233107 A1 | 7/2020 | Constantinou et al. |
| 2020/0256834 A1 | 8/2020 | Langnes et al. |
| 2020/0291772 A1* | 9/2020 | Thiruvenkatanathan ................... G01V 1/42 |
| 2020/0309982 A1* | 10/2020 | Jin ............................ G01V 1/42 |
| 2021/0047916 A1 | 2/2021 | Thiruvenkatanathan et al. |
| 2021/0073314 A1* | 3/2021 | Ray .......................... G06F 30/00 |
| 2021/0087923 A1 | 3/2021 | Thiruvenkatanathan |
| 2021/0087925 A1* | 3/2021 | Heidari ................... E21B 47/12 |
| 2021/0115767 A1 | 4/2021 | Tajallipour et al. |
| 2021/0115785 A1 | 4/2021 | Cerrahoglu et al. |
| 2021/0115786 A1 | 4/2021 | Cerrahoglu et al. |
| 2021/0148199 A1 | 5/2021 | Thiruvenkatanathan |
| 2021/0189874 A1* | 6/2021 | Jaaskelainen .......... G01V 1/288 |
| 2021/0231830 A1* | 7/2021 | Nitsche ................... E21B 47/07 |
| 2021/0397994 A1 | 12/2021 | Cerrahoglu et al. |

FOREIGN PATENT DOCUMENTS

| | | |
|---|---|---|
| CA | 2866274 A1 | 3/2016 |
| CN | 101769442 A | 7/2010 |
| CN | 102226390 A | 10/2011 |
| CN | 203561437 U | 4/2014 |
| CN | 105135219 A | 12/2015 |
| CN | 105676267 A | 6/2016 |
| CN | 205746047 U | 11/2016 |
| CN | 108918405 A | 11/2018 |
| CN | 109000157 A | 12/2018 |
| CN | 110231409 A | 9/2019 |
| CN | 209858753 U | 12/2019 |
| EP | 2418466 A2 | 2/2012 |
| EP | 3006908 A1 | 4/2016 |
| EP | 3032441 A2 | 6/2016 |
| EP | 3073051 A1 | 9/2016 |
| EP | 3314308 A1 | 5/2018 |
| EP | 3440314 A2 | 2/2019 |
| GB | 1299843 A | 12/1972 |
| GB | 2354782 A | 4/2001 |
| GB | 2359834 A | 9/2001 |
| GB | 2522061 A | 7/2015 |
| GB | 2555550 A | 5/2018 |
| GB | 2555637 A | 5/2018 |
| GB | 18203315 | 12/2018 |
| JP | 5518424 B2 | 6/2014 |
| NL | 9000577 A | 10/1990 |
| RU | 2007101037 A | 7/2008 |
| WO | 9721116 A1 | 6/1997 |
| WO | 2004031738 A1 | 4/2004 |
| WO | 2007024763 A2 | 3/2007 |
| WO | 2008147953 A1 | 12/2008 |
| WO | 2009048340 A2 | 4/2009 |
| WO | 2009086279 A2 | 7/2009 |
| WO | 2009109747 A1 | 9/2009 |
| WO | 2010099484 A2 | 9/2010 |
| WO | 2012011831 A1 | 1/2012 |
| WO | 2013114135 A2 | 8/2013 |
| WO | 2015011394 A1 | 1/2015 |
| WO | 2015025216 A2 | 2/2015 |
| WO | 2015060981 A1 | 4/2015 |
| WO | 2015170113 A1 | 11/2015 |
| WO | 2015170116 A1 | 11/2015 |
| WO | 2016010550 A1 | 1/2016 |

(56) References Cited

FOREIGN PATENT DOCUMENTS

| | | | |
|---|---|---|---|
| WO | 2016020654 A1 | 2/2016 |
| WO | 2016108914 A1 | 7/2016 |
| WO | 2016115030 A1 | 7/2016 |
| WO | 2016207341 A1 | 12/2016 |
| WO | 2017009606 A1 | 1/2017 |
| WO | 2017044923 A1 | 3/2017 |
| WO | 2017064472 A1 | 4/2017 |
| WO | 2017078536 A1 | 5/2017 |
| WO | 2017109467 A1 | 6/2017 |
| WO | 2017156339 A1 | 9/2017 |
| WO | 2017174746 A1 | 10/2017 |
| WO | 2017174750 A2 | 10/2017 |
| WO | 2017203271 A1 | 11/2017 |
| WO | 2017214729 A1 | 12/2017 |
| WO | 2018044309 A1 | 3/2018 |
| WO | 2018057029 A1 | 3/2018 |
| WO | 2018088994 A1 | 5/2018 |
| WO | 2018136050 A1 | 7/2018 |
| WO | 2018154275 A1 | 8/2018 |
| WO | 2018178279 A1 | 10/2018 |
| WO | 2018195661 A1 | 11/2018 |
| WO | 2019005050 A1 | 1/2019 |
| WO | 2019027466 A1 | 2/2019 |
| WO | 2019038401 A1 | 2/2019 |
| WO | 2019072899 A2 | 4/2019 |
| WO | 2019094140 A1 | 5/2019 |
| WO | 2019094474 A1 | 5/2019 |
| WO | 2019136556 A1 | 7/2019 |
| WO | 2019139564 A1 | 7/2019 |
| WO | 2020109426 A2 | 6/2020 |
| WO | 2020109427 A2 | 6/2020 |
| WO | 2020119957 A1 | 6/2020 |
| WO | 2020182312 A1 | 9/2020 |
| WO | 2020260928 A1 | 12/2020 |
| WO | 2021034300 A1 | 2/2021 |
| WO | 2021037586 A1 | 3/2021 |
| WO | 2021052604 A1 | 3/2021 |
| WO | 2021052605 A1 | 3/2021 |
| WO | 2021052607 A1 | 3/2021 |
| WO | 2021073740 A1 | 4/2021 |
| WO | 2021073741 A1 | 4/2021 |
| WO | 2021073763 A1 | 4/2021 |
| WO | 2021073776 A1 | 4/2021 |
| WO | 2021093974 A1 | 5/2021 |
| WO | 2021093976 A1 | 5/2021 |
| WO | 2021148141 A1 | 7/2021 |
| WO | 2021151504 A1 | 8/2021 |
| WO | 2021151521 A1 | 8/2021 |
| WO | 2021249643 A1 | 12/2021 |
| WO | 2021254632 A1 | 12/2021 |
| WO | 2021254633 A1 | 12/2021 |
| WO | 2021254799 A1 | 12/2021 |

OTHER PUBLICATIONS

International Preliminary Report on Patentability dated Jun. 10, 2021, PCT Application No. PCT/EP2019/082809.
Office Action dated Mar. 12, 2020, U.S. Appl. No. 16/698,407, filed Nov. 27, 2019.
Final Office Action dated Jun. 30, 2020, U.S. Appl. No. 16/698,407, filed Nov. 27, 2019.
Office Action dated Mar. 22, 2021, U.S. Appl. No. 16/698,407, filed Nov. 27, 2019.
Final Office Action dated Jun. 29, 2021, U.S. Appl. No. 16/698,407, filed Nov. 27, 2019.
Office Action dated Nov. 15, 2021, U.S. Appl. No. 16/698,407, filed Nov. 27, 2019.
Final Office Action dated Apr. 4, 2022, U.S. Appl. No. 16/698,407, filed Nov. 27, 2019.
Examination Report dated Jul. 15, 2020, GCC Application No. GC 2019-38726.
Examination Report dated Dec. 6, 2020, GCC Application No. GC 2019-38726.
Examination Report/Notice of Allowance dated Jun. 9, 2021, GCC Application No. GC 2019-38726.
Office Action dated Mar. 15, 2022, EA Application No. 202191441.
EP Rule 161(1) and 162 EPC Communication dated Jul. 6, 2021, EP Application No. 21194305.5.
European Extended Search Report dated Nov. 23, 2021, EP Application No. 21194305.5.
International Search Report and Written Opinion dated Jul. 24, 2020, PCT Application No. PCT/EP2019/081542.
Office Action dated Dec. 30, 2020, U.S. Appl. No. 17/091,940, filed Nov. 6, 2020.
Final Office Action dated Apr. 7, 2021, U.S. Appl. No. 17/091,940, filed Nov. 6, 2020.
Notice of Allowance dated Jun. 29, 2021, U.S. Appl. No. 17/091,940, filed Nov. 6, 2020.
Examination Report dated Oct. 17, 2021, GC Application No. 2020-40879.
International Search Report and Written Opinion dated Jul. 24, 2020, PCT Application No. PCT/EP2019/081545.
Partial International Search Report dated Oct. 20, 2020, PCT Application No. PCT/EP2020/051814.
International Search Report and Written Opinion dated Dec. 11, 2020, PCT Application No. PCT/EP2020/051814.
Partial International Search Report dated Oct. 16, 2020, PCT Application No. PCT/EP2020/051817.
International Search Report and Written Opinion dated Dec. 20, 2020, PCT Application No. PCT/EP2020/051817.
International Preliminary Report on Patentability dated Apr. 28, 2022, PCT Application No. PCT/EP2020/051817.
GCC Examination Report dated Oct. 13, 2021, GCC Application No. 2020/40676.
International Search Report and Written Opinion dated Oct. 14, 2020, PCT Application No. PCT/EP2020/052445.
International Search Report and Written Opinion dated Dec. 9, 2020, PCT Application No. PCT/EP2020/067043.
International Search Report and Written Opinion dated Mar. 15, 2021, PCT Application No. PCT/EP2020/067045.
International Search Report and Written Opinion dated Sep. 14, 2021, PCT Application No. PCT/EP2021/065081.
Office Action dated Dec. 29, 2021, U.S. Appl. No. 17/351,217.
International Search Report and Written Opinion dated Mar. 12, 2021, PCT Application No. PCT/EP2020/067044.
Abdelgaward, Ahemd, "Distributed Sand Monitoring Framework Using Wireless Sensor Networks," School of Engineering Technology, Central Michigan University, Mount Pleasant, MI 48859, US, Oct. 2013, vol. 1 Is. 1, pp. 1-10.
Abukhamsin, Ahmed Yasin, et al., "In Flow Profiling and Production Optimization in Smart Wells Using DI STRI BUT ED Acoustic and Temperature Measurements," Jun. 1, 2017 (Jun. 1, 2017), XP055604495, Retrieved from the Internet: URL: https://pangea.stanford.edu/ERE/pdf/pereports/PhD/Abukhamsin2016.pdf [retrieved on Jul. 11, 2019] paragraphs [0001], [0002], [0004].
Ansari, Rafay et al., "Advanced Petrophysical Surveillance Improves the Understanding of Well Behavior in Unconventional Reservoirs," Society of Petroleum Engineers (SPE-170878-MS), The Netherlands, Oct. 27-29, 2014.
Bakku, Sudhish K., et al., "Vertical Seismic Profiling Using Distributed Acoustic Sensing in a Hydrofrac Treatment Well," SEG Technical Program Expanded Abstracts Denver 2014 ISSN (print): 1052-3812, ISSN (online): 1949-4645, https://doi.org/10.1190/segam2014-1559.1.
Broesch, James "Digital Signal Processing: Instant Access," Chapter 7, www.newnespress.com.
Brown, Gerald K., "External Acoustic Sensors and Instruments for the Detection of Sand in Oil and Gas Wells," Offshore Technology Conference, May 5-8, 1997, Houston, Texas, US, OTC-8478-MS, https://doi.org/10.4043/8478-MS.
Brown, Gerald K., et al., "Solids and Sand Monitoring—An Overview," CORROSION Mar. 26-31, 2000, Orlando, Florida, US, NACE International, NACE-00091.

(56) References Cited

OTHER PUBLICATIONS

Cannon, Robert Thayer, et al., "Distributed Acoustic Sensing: State of the Art," SPE Digital Energy Conference, Mar. 5-7, 2013, The Woodlands, Texas, US, SPE-163688-MS, https://doi.org/10.2118/163688-MS.
Chen, Jianyou, et al., "Distributed acoustic sensing coupling noise removal based on sparse optimization," Society of Exploration Geophysicists and American Association of Petroleum Geologists, vol. 7, Issue 2, May 2019, pp. 1M-T563, ISSN (print): 2324-8858, ISSN (online): 2324-8866, https://doi.org/10.1190/INT-2018-0080. 1.
Chhantyal, Khim et al., "Upstream Ultrasonic Level Based Soft Sensing of Volumetric Flow of Non-Newtonian Fluids in Open Venturi Channels," IEEE Sensors Journal, vol. 18, No. 12, Jun. 15, 2018.
Clam+A663:F708pOn DSP-06 Particle Monitor, Aug. 2009.
International Search Report and Written Opinion dated Oct. 5, 2017, PCT Application No. PCT/EP2017/058300.
International Preliminary Report on Patentability dated Oct. 18, 2018, PCT Application No. PCT/EP2017/058300.
Office Action dated Jan. 7, 2022, U.S. Appl. No. 16/091,519, filed Oct. 4, 2018.
Office Action dated Dec. 12, 2020, EG Application No. PCT1590/2018.
Office Action dated Apr. 22, 2020, EA Application No. 201892228.
Office Action dated Nov. 23, 2020, EA Application No. 201892228.
Office Action dated Jun. 28, 2021, EA Application No. 201892228.
Notification on Intention to Grant dated Mar. 5, 2022, EA Application No. 201892228.
EP Rule 161(1) and 162 EPC Communication dated Jul. 12, 2018, EP Application No. 17715935.7.
Intention to Grant dated Dec. 12, 2019, EP Application No. 17715935.7.
Decision to Grant dated May 8, 2020, EP Application No. 17715935.7.
Office Action dated Dec. 29, 2019, U.S. Appl. No. 16/563,544, filed Sep. 16, 2019.
Notice of Allowance dated Apr. 22, 2020, U.S. Appl. No. 16/563,544, filed Sep. 16, 2019.
European Search Report dated Aug. 10, 2020, EP Application No. 20170700.7.
European Office Action dated Feb. 22, 2022, EP Application No. 20170700.7.
International Search Report and Written Opinion dated Sep. 22, 2017, PCT Application No. PCT/EP2017/058292.
International Preliminary Report on Patentability dated Oct. 18, 2018, PCT Application No. PCT/EP2017/058292.
Restriction Requirement dated Dec. 15, 2020, U.S. Appl. No. 16/291,929, filed Oct. 5, 2018.
Office Action dated Mar. 30, 2021, U.S. Appl. No. 16/291,929, filed Oct. 5, 2018.
Notice of Allowance dated Aug. 6, 2021, U.S. Appl. No. 16/291,929, filed Oct. 5, 2018.
Notice of Acceptance dated Mar. 24, 2022, AU Application No. 2017246520, filed on Oct. 3, 2018.
CA Examination Report dated Feb. 16, 2022, CA Application No. 3,020,007.
Office Action dated Aug. 1, 2021, EG Application No. 1588/2018.
Office Action dated Mar. 23, 2020, EA Application No. 201892227.
Office Action dated Nov. 16, 2020, EA Application No. 201892227.
Office Action dated Jun. 17, 2021, EA Application No. 201892227.
Notification on Intention to Grant dated Mar. 5, 2022, EA Application No. 201892227.
EP Rule 161(1) and 162 EPC Communication dated Nov. 29, 2018, EP Application No. 17715932.4.
Intention to Grant dated Sep. 26, 2019, EP Application No. 17715932.4.
Decision to Grant dated Feb. 2, 2020, EP Application No. 17715932.4.
Office Action dated Dec. 4, 2019, U.S. Appl. No. 16/563,689, filed Sep. 6, 2019.
Notice of Allowance dated May 20, 2020, U.S. Appl. No. 16/563,689, filed Sep. 6, 2019.
Corrected Notice of Allowability dated Jun. 19, 2020, U.S. Appl. No. 16/563,689, filed Sep. 6, 2019.
Notice of Allowance dated Apr. 21, 2021, U.S. Appl. No. 16/563,689, filed Sep. 6, 2019.
Notice of Allowance dated Aug. 23, 2021, U.S. Appl. No. 16/563,689, filed Sep. 6, 2019.
European Search Report dated Apr. 22, 2020, for European Application No. 20154638.9.
European Article 94(3) dated Jun. 8, 2020, EP Application No. 20154638.9.
Intention to Grant dated Feb. 25, 2021, EP Application No. 20154638.9.
Decision to Grant dated Jul. 15, 2021, EP Application No. 20154638.9.
International Search Report and Written Opinion dated Jun. 29, 2018, PCT Application No. PCT/EP2018/058174.
International Preliminary Report on Patentability dated Oct. 10, 2019, PCT Application No. PCT/EP2018/058174.
Office Action dated Jan. 24, 2020, U.S. Appl. No. 16/566,711, filed Sep. 10, 2019.
Final Office Action dated Aug. 4, 2020, U.S. Appl. No. 16/566,711, filed Sep. 10, 2019.
Advisory Action dated Oct. 16, 2020, U.S. Appl. No. 16/566,711, filed Sep. 10, 2019.
Notice of Allowance dated Dec. 11, 2020, U.S. Appl. No. 16/566,711, filed Sep. 10, 2019.
European Article 94(3) Examination Repod dated Jan. 15, 2020, for European Application No. 18714513.1.
European Article 94(3) Examination Report dated Jul. 29, 2020, for European Application No. 18714513.1.
Intention to Grant dated Feb. 23, 2021, for European Application No. 18714513.1.
Decision to Grant dated Jun. 24, 2021, for European Application No. 18714513.1.
European Search Report dated Dec. 4, 2019, for European Application No. 19198488.9.
European Article 94(3) Examination Report dated Feb. 3, 2020, , for European Application No. 19198488.9.
Intention to Grant dated Aug. 10, 2020, for European Application No. 19198488.9.
Intention to Grant dated Feb. 3, 2021, for European Application No. 19198488.9.
Intention to Grant dated Nov. 23, 2021, for European Application No. 19198488.9.
Decision to Grant dated Apr. 7, 2022, for European Application No. 19198488.9.
Eurasian Office Action dated Sep. 3, 2020, for Eurasian Application No. 201992243/31.
Eurasian Notice of Allowance dated Apr. 29, 2021, for Eurasian Application No. 201992243/31.
TT Invitation to Amend dated Nov. 5, 2021, for Eurasian Application No. 201992243/31.
International Search Report and Written Opinion dated Nov. 28, 2018, PCT Application No. PCT/EP2018/072811.
International Preliminary Report on Patentability dated Mar. 5, 2020, PCT Application No. PCT/EP2018/072811.
Office Action dated Apr. 29, 2021, U.S. Appl. No. 16/639,774, filed Feb. 18, 2020.
Notice of Allowance dated Aug. 10, 2021, U.S. Appl. No. 16/639,774, filed Feb. 18, 2020.
Eurasian Office Action dated Nov. 20, 2020, EA Application No. 2020090528.
Eurasian Office Action dated May 27, 2021, EA Application No. 2020090528.
Notice of Acceptance dated Dec. 15, 2021, EA Application No. 2020090528.
EP Rule 161(1) and 162 EPC Communication dated Apr. 7, 2020, Ep Application No. 18765814.1.

(56) References Cited

OTHER PUBLICATIONS

Intention to Grant dated Mar. 16, 2021, Ep Application No. 18765814.1.
Decision to Grant dated Sep. 9, 2021, Ep Application No. 18765814.1.
International Search Report and Written Opinion dated Feb. 14, 2020, PCT Application No. PCT/EP2019/057149.
International Preliminary Report on Patentability dated Jun. 24, 2021, PCT Application No. PCT/EP2019/057149.
Office Action dated Mar. 4, 2020, U.S. Appl. No. 16/710,237, filed Dec. 11, 2019.
Final Office Action dated Sep. 3, 2020, U.S. Appl. No. 16/710,237, filed Dec. 11, 2019.
Office Action dated Feb. 11, 2021, U.S. Appl. No. 16/710,237, filed Dec. 11, 2019.
Office Action dated Jul. 22, 2021, U.S. Appl. No. 16/710,237, filed Dec. 11, 2019.
Office Action dated Apr. 26, 2022, U.S. Appl. No. 16/710,237, filed Dec. 11, 2019.
GCC Examination Report dated Jan. 30, 2021, GCC Application No. 2019/38809.
EP Rule 161(1) and 162 EPC Communication dated Jul. 20, 2021, EP Application No. 19714346.4.
International Search Report and Written Opinion dated Jun. 4, 2019, PCT Application No. PCT/EP2018/077568.
International Preliminary Report on Patentability dated Apr. 23, 2020, PCT Application No. PCT/EP2018/077568.
Office Action dated Aug. 25, 2021, U.S. Appl. No. 16/755,211, filed Apr. 10, 2020.
Notice of Allowance dated Jan. 21, 2022, U.S. Appl. No. 16/755,211, filed Apr. 10, 2020.
Eurasian Office Action dated Jan. 27, 2021, EA Application No. 202090867.
Eurasian Office Action dated Sep. 3, 2021, EA Application No. 202090867.
Eurasian Office Action dated Jan. 25, 2022, EA Application No. 202090867.
EP Rule 161(1) and 162 EPC Communication dated May 19, 2020, EP Application No. 18788701.3.
International Search Report and Written Opinion dated Sep. 9, 2020, PCT Application No. PCT/EP2018/082985.
International Search Report and Written Opinion dated May 29, 2020, PCT Application No. PCT/EP2019/082808.
International Preliminary Report on Patentability dated Jun. 10, 2020, PCT Application No. PCT/EP2019/082808.
Office Action dated Feb. 24, 2020, U.S. Appl. No. 16/698,335, filed Nov. 11, 2019.
Final Office Action dated Jun. 24, 2020, U.S. Appl. No. 16/698,335, filed Nov. 11, 2019.
Advisory Action dated Aug. 25, 2020, U.S. Appl. No. 16/698,335, filed Nov. 11, 2019.
Office Action dated Dec. 3, 2020, U.S. Appl. No. 16/698,335, filed Nov. 11, 2019.
Final Office Action dated Jun. 15, 2021, U.S. Appl. No. 16/698,335, filed Nov. 11, 2019.
GCC Examination Report dated Nov. 17, 2020, GCC Application No. 2019/38718.
GCC Examination Report dated Jan. 6, 2021, GCC Application No. 2019/38718.
European Article 94(3) Examination Report dated Nov. 11, 2021, EP Application No. 19809084.7.
International Search Report and Written Opinion dated Jan. 27, 2020, PCT Application No. PCT/EP2019/056425.
International Preliminary Report on Patentability dated Sep. 23, 2021, PCT Application No. PCT/EP2019/056425.
Office Action dated Nov. 5, 2021, U.S. Appl. No. 16/817,559, filed Mar. 12, 2021.
GCC Examination Report dated Jul. 26, 2021, GCC Application No. 2020/39381.
EP Rule 161(1) and 162 EPC Communication dated Oct. 21, 2021, EP Application No. 19712714.5.
International Search Report and Written Opinion dated Feb. 28, 2020, PCT Application No. PCT/IB2019/055355.
International Preliminary Report on Patentability dated Jan. 6, 2022, PCT Application No. PCT/IB2019/055355.
EP Rule 161(1) and 162 EPC Communication dated Feb. 4, 2022, EP Application No. 19765548.3.
International Search Report and Written Opinion dated Jun. 16, 2020, PCT Application No. PCT/EP2019/075385.
International Preliminary Report on Patentability dated Mar. 31, 2022, PCT Application No. PCT/EP2019/075385.
Office Action dated Jan. 12, 2022, U.S. Appl. No. 17/025,874, filed Sep. 18, 2020.
International Search Report and Written Opinion dated Jun. 16, 2020, PCT Application No. PCT/EP2019/075378.
International Preliminary Report on Patentability dated Mar. 31, 2022, PCT Application No. PCT/EP2019/075378.
International Search Report and Written Opinion dated Jun. 17, 2020, PCT Application No. PCT/US2019/046759.
International Preliminary Report on Patentability dated March 3, 3022, PCT Application No. PCT/US2019/046759.
International Search Report and Written Opinion dated May 12, 2020, PCT Application No. PCT/EP2019/072891.
International Search Report and Written Opinion dated Nov. 6, 2020, PCT Application No. PCT/EP2020/072811.
International Preliminary Report on Patentability dated Mar. 10, 2022, PCT Application No. PCT/EP2020/072811.
International Search Report and Written Opinion dated Jul. 9, 2020, PCT Application No. PCT/EP2019/078195.
International Preliminary Report on Patentability dated Apr. 28, 2022, PCT Application No. PCT/EP2019/078195.
Office Action dated Jan. 7, 2021, U.S. Appl. No. 17/071,031, filed Oct. 15, 2020.
Notice of Allowance dated Apr. 22, 2021, U.S. Appl. No. 17/071,031, filed Oct. 15, 2020.
International Search Report and Written Opinion dated Jun. 16, 2020, PCT Application No. PCT/EP2019/075387.
International Preliminary Report on Patentability dated Mar. 31, 2022, PCT Application No. PCT/EP2019/075387.
International Search Report and Written Opinion dated Jun. 16, 2020, PCT Application No. PCT/EP2019/075382.
International Preliminary Report on Patentability dated Mar. 31, 2022, PCT Application No. PCT/EP2019/075382.
Partial International Search Report Search Report dated Sep. 10, 2020, PCT Application No. PCT/EP2019/085454.
International Search Report Search Report dated Nov. 6, 2020, PCT Application No. PCT/EP2019/085454.
International Preliminary Report on Patentability dated Apr. 28, 2022, PCT Application No. PCT/EP2019/085454.
GCC Examination Report dated Dec. 1, 2021, for GCC Application No. GC2020-40675.
International Search Report and Written Opinion dated Jul. 9, 2020, PCT Application No. PCT/EP2019/078197.
International Preliminary Report on Patentability dated Apr. 28, 2022, PCT Application No. PCT/EP2019/078197.
Office Action dated Jan. 14, 2021, U.S. Appl. No. 17/071,021, filed Oct. 20, 2020.
Final Office Action dated May 11, 2021, U.S. Appl. No. 17/071,021, filed Oct. 20, 2020.
Advisory Action dated Jul. 28, 2021, U.S. Appl. No. 17/071,021, filed Oct. 20, 2020.
Final Office Action dated Dec. 7, 2021, U.S. Appl. No. 17/071,021, filed Oct. 20, 2020.
Advisory Action dated Mar. 2, 2022, U.S. Appl. No. 17/071,021, filed Oct. 20, 2020.
Notice of Allowance dated Apr. 6, 2022, U.S. Appl. No. 17/071,021, filed Oct. 20, 2020.
International Search Report and Written Opinion dated May 29, 2020, PCT Application No. PCT/EP2019/082809.
ClampOn SandQ® Monitor, Aug. 2014.
Conway, Chris, et al., "An introduction to fiber optic Intelligent Distributed Acoustic Sensing (iDAS) technology for power industry

(56) References Cited

OTHER PUBLICATIONS applications," 9th International Conference on Insulated Power Cables, Jicable15—Versailles Jun. 21-25, 2015, A3.4.

Correa, Julia, et al., "3D vertical seismic profile acquired with distributed acoustic sensing on tubing installation: A case study from the CO2CRC Otway Project," Interpretation—a Journal of Subsurface Characterization, 7(1), ISSN 2324-8858, Feb. 1, 2019, DOI 10.1190/INT-2018-0086.1, https://escholarship.org/uc/item/2br8g398.

De la Cruz Salas, Luis M., "Computational Methods for Oil Recovery", Instituto de Geofisica Universidad Nacional Autonoma de Mexico, Jan. 2011, Slides 1-97 (Year: 2011).

Elichev, et al., "Understanding Well Events with Machine Learning," Society of Petroleum Engineers, SPE-196861-MS, pp. 1-12, 2019.

Finfer, D.C., et al., "Borehole Flow Monitoring using a Nonintrusive Passive Distributed Acoustic Sensing (DAS)," Society of Petroleum Engineers, SPE-170844-MS, SPE Annual Technical Conference and Exhibition held in Amsterdam, The Netherlands, Oct. 27-29, 2014.

Folkestad, Trond, et al., "Acoustic measurements detect sand in North Sea flow lines," Oil and Gas Journal; (USA), Journal vol. 88:35; Journal ID: ISSN 0030-1388.

Gardner, Neil, et al., "Distributed Fiber-Optic Technologies Drive New Intervention Applications," SPE JPT-7975, vol. 67 | Issue: 1, Jan. 1, 2015.

Hildebrandt Marcel et al, "A Recommender System for Complex Real-World Applications with Nonlinear Dependencies and Knowledge Graph Context", May 25, 2019 (May 25, 2019), Advances in Databases and Information Systems; [Lecture Notes in Computer Science; Lect.Notes Computer], Springer International Publishing, Cham, pp. 179-193, ISBN: 9783319104034.

Hill, David, Permanent real-time full wellbore flow monitoring using distributed fiber-optic sensing, OptaSense, 2015.

Hofman, Joachim, et al., "Analysis of the acoustic response in water and sand of different fiber optic sensing cables," SPIE Sensing Technology + Applications, 2015, Baltimore, Maryland, U.S., Proceedings vol. 9491, Sensors for Extreme Harsh Environments II; 94910E (2015) https://doi.org/10.1117/12.2178282.

Hull, John William, et al., "Well-Integrity Monitoring and Analysis Using Distributed Fiber-Optic Acoustic Sensors," IADC/SPE Drilling Conference and Exhibition, Feb. 2-4, 2010, New Orleans, Louisiana, US, SPE-128304-MS, https://doi.org/10.2118/128304-MS.

Isensys, "Sand Alert—Fixed and Portable Sand Monitoring," Isensys LLP, Sep. 2016, www.isensys.co.uk.

Johannessen, Kjetil, et al., "Distributed Acoustic Sensing—A New Way of Listening to Your Well/Reservoir," SPE Intelligent Energy International, Mar. 27-29, 2012, Utrecht, NL, SPE-149602-MS, https://doi.org/10.2118/149602-MS.

Lashgari, Hamid R., et al., "A Four-Phase Chemical/Gas Model in an Implicit-Pressure/ Explicit-Concentration Reservoir Simulator," SPE J. 21 (2016): 1086-1105 (Year: 2016).

Li, Meng, et al., "Current and Future Applications of Distributed Acoustic Sensing as a New Reservoir Geophysics Tool," The Open Petroleum Engineering Journal, 2015, 8, (Suppl 1: M3) 272-281.

Ma, King, et al. "Deep Learning on Temporal-Spectral Data for Anomaly Detection," Department of Electrical and Computer Engineering, University of Calgary, Proc. of SPIE vol. 10190, 2017.

Martin, Shawn, "Can Oil Well Monitoring Systems Withstand Stimulation Treatments," Feb. 26, 2015, https://insights.globalspec.com/article/601/can-oil-well-monitoring-systems-withstand-stimulation-treatments [retrieved on Aug. 18, 2020].

Martinez, Roberto Jr., "Diagnosis of Fracture Flow Conditions With Acoustic Sensing," SPE Hydraulic Fracturing Technology Conference, Feb. 4-6, The Woodlands, Texas, US, Publication Date 2014.

Miller, Douglas E., et al., "Vertical Seismic Profiling Using a Fiber-optic Cable as a Distributed Acoustic Sensor," 74th EAGE Conference Exhibition incorporating SPE EUROPEC 2012, Copenhagen, Denmark, Jun. 4-7, 2012.

Mohd Daud, Farik, et al., "Successful Application of Ultrasound Technology to Detect Sand Producing Intervals in the Wellbore," International Petroleum Technology Conference, Nov. 15-17, 2011, Bangkok, Thailand, IPTC-14737-MS, https://doi.org/10.2523/IPTC-14737-MS.

Molenaar, Mathieu, et al., "Downhole tests show benefits of distributed acoustic sensing," Oil and Gas Journal 109 (1):82-85, Jan. 2011.

Molenaar, Menno M., et al., "First Downhole Application of Distributed Acoustic Sensing for Hydraulic-Fracturing Monitoring and Diagnostics," SPE Drilling Completion, vol. 27, Is. 1, Mar. 2012, SPE-140561-PA, https://doi.org/10.2118/140561-PA.

Mullens, Stephen, et al., "Fiber-Optic Distributed Vibration Sensing Provides Technique for Detecting Sand Production," Offshore Technology Conference, May 3-6, 2010, Houston, Texas, US, OTC-20429-MS, https://doi.org/10.4043/20429-MS.

Naldrett, G., et al., "Production Monitoring Using Next-Generation Distributed Sensing Systems," Petrophysics, vol. 59, No. 4 (Aug. 2018); pp. 496-510; 16 Figures. DOI: 10.30632/PJV59V4-2018a5. One Petro Search Results, Jul. 22, 2021, 10 pp. (Year: 2021).

Paleja, Rakesh, et al., "Velocity Tracking for Flow Monitoring and Production Profiling Using Distributed Acoustic Sensing," SPE Annual Technical Conference and Exhibition, Sep. 28-30, 2015, Houston, Texas, US, SPE-174823-MS, https://doi.org/10.2118/174823-MS.

Roxar sand monitor, https://www.emerson.com/en-us/automation/roxar.

Roxar, "Sand Monitor, Non-intrusive acoustic sensor," Draft 1-120209, Sundheim-Madison Feb. 2009.

Saeed, et al., "Event Detection for Managed-Pressure Drilling: A New Paradigm," Society of Petroleum Engineers, SPE 158491, pp. 1-12, 2012.

Schuliz, Whitney H., "Time-Lapse Multicomponent Geophone and DAS VSP Processing and Analysis," Colorado School of Mines, Geo-Physics Department, 2019.

Silixa, "Fracture Monitoring," https://silixa.com/solutions/oil-and-gas-downhole/frac-services/fracture-monitoring/.

Silixa, "Well Integrity," https://silixa.com/solutions/oil-and-gas-downhole/permanent-reservoir-and-well-surveillance/well-integrity/.

Silkina, Tatiana, "Application of Distributed Acoustic Sensing to Flow Regime Classification," Natural Gas Technology, Norwegian University of Science and Technology, Jun. 2014.

Stokely, Christopher L., "Acoustics-Based Flow Monitoring During Hydraulic Fracturing," SPE-179151-MS, Society of Petroleum Engineers, SPE Hydraulic Fracturing Technology Conference, Feb. 9-11, 2016, The Woodlands, Texas, USA, https://doi.org/10.2118/179151-MS.

Susilo, Yoliandri, et al., "Significant Increase in Sand Control Reliability of Open Hole Gravel Pack Completions in ACG Field—Azerbaijan," SPE European Formation Damage Conference Exhibition, Jun. 5-7, 2013, Noordwijk, NL, SPE-165206-MS, https://doi.org/10.2118/165206-MS.

Thiruvenkatanathan Prad: "Seeing the LYTT: Real time flow profiling in hydrocarbon wells", Jun. 11, 2020 (Jun. 11, 2020). pp. 1-3, XP055776735, Retrieved from the Internet: URL:https://www.lytt.com/blog/the-new-tool-that-is-lytting-up-inflow-profiling [retrieved—on Feb. 16, 2021], p. 1 p. 2.

Tiffin, David L., et al., "Drawdown Guidelines for Sand Control Completions", SPE International, SPE 84495, Oct. 5, 2003 (Oct. 5, 2003), pp. 1-10, XP002361435.

Van der Horst, Juun, et al., "Fibre Optic Sensing For Improved Wellbore Production Surveillance," International Petroleum Technology Conference, Jan. 19-22, 2014, Doha, Qatar, IPTC-17528-MS, https://doi.org/10.2523/PTC-17528-MS.

Wang, Fang, et al., "Pipeline Leak Detection by Using Time-Domain Statistical Features," IEEE Sensors Journal, vol. 17, No. 19, Oct. 2017.

Wang, Kai, et al., "Vibration Sensor Approaches for the Monitoring of Sand Production in Bohai Bay," Hindawi Publishing Corporation, Shock and Vibration, vol. 2015, Article ID 591780, http://dx.doi.org/10.1155/2015/591780.

(56) References Cited

OTHER PUBLICATIONS

Williams, J., "Distributed acoustic sensing for pipeline monitoring," Pipeline and Gas Journal Jul. 2012, vol. 239 No. 7.

Norld first installation of a fibre optic acoustic sensor for reservoir monitoring, Oil and Gas Product News, Oct. 30, 2009.

WorldOil.com, "Adelous unveils distributed acoustic sensor solution for upstream oil gas," May 28, 2015. https://www.worldoil.com/news/2015/5/28/adelos-unveils-distributed-acoustic-sensor-solution-for-upstream-oil-gas.

Xiao, J., et al., "Dynamic Water Injection Profiling in Intelligent Wells Using Distributed Acoustic Sensor with Multimode Optical Fibers," SPE Annual Technical Conference and Exhibition, Sep. 28-30, 2015, Houston, Texas, US, SPE-174865-MS, https://doi.org/10.2118/174865-MS.

Xiao, J.J., et al., "Intelligent Distributed Acoustic Sensing for In-well Monitoring," SPE Saudi Arabia Section Technical Symposium and Exhibition, Apr. 21-24, 2014, Al-Khobar, SA, SPE-172197-MS, https://doi.org/10.2118/172197-MS.

\* cited by examiner

SYSTEMS AND METHODS FOR SUBTERRANEAN FLUID FLOW CHARACTERIZATION

CROSS-REFERENCE TO RELATED APPLICATIONS

This application claims the benefit of and priority to International Application No. PCT/EP2020/066171 filed Jun. 11, 2020 with the European Receiving Office and entitled "Systems and Methods for Subterranean Fluid Flow Characterization," which is hereby incorporated herein by reference in its entirety for all purposes.

STATEMENT REGARDING FEDERALLY SPONSORED RESEARCH OR DEVELOPMENT

Not applicable.

BACKGROUND

To access hydrocarbons disposed within a subterranean formation, a wellbore is drilled from the surface into the formation. Thereafter, formation fluids (e.g., such as hydrocarbon liquids, hydrocarbon gases, water, etc.) may be flowed into the wellbore and communicated to the surface. In addition, in some instances, a fluid (e.g., water, steam, acid, etc.) may be injected into the formation via the wellbore so as to increase a pressure of the formation, adjust a porosity or permeability of the formation, decrease a viscosity of the hydrocarbons disposed within the formation, etc. Thus, during the operating life of a subterranean wellbore, various fluid flows both into and/or out of the wellbore may be present.

BRIEF SUMMARY

In an aspect, a method of monitoring fluid outflow along a wellbore comprises obtaining an acoustic signal from a sensor within the wellbore, determining one or more frequency domain features from the acoustic signal, and identifying one or more fluid outflow locations along the portion of the depth of the wellbore using the one or more frequency domain features. The acoustic signal comprises acoustic samples across a portion of a depth of the wellbore.

In an aspect, a method of monitoring an injection of fluid into a subterranean formation comprises obtaining one or more frequency domain features from an acoustic signal originating within a wellbore extending into the subterranean formation, identifying one or more fluid outflow locations within the wellbore using the one or more frequency domain features, obtaining one or more temperature features from a temperature signal originating within the wellbore, and identifying one or more fluid uptake locations within the subterranean formation using the temperature features within the wellbore.

In an aspect, a method of monitoring fluid outflow along a wellbore comprises determining one or more temperature features from a distributed temperature signal originating in the wellbore, determining one or more frequency domain features from an acoustic signal originating in the wellbore, and using the one or more temperature features and the one or more frequency domain features to identify one or more fluid outflow locations along the wellbore.

In an aspect, a method of monitoring fluid injection into a subterranean formation comprises obtaining a first acoustic signal from a first sensor within a first wellbore, determining one or more frequency domain features from the first acoustic signal, identifying one or more fluid outflow locations within the first wellbore using the one or more frequency domain features from the first acoustic signal, obtaining a second acoustic signal from a second sensor within a second wellbore, determining one or more frequency domain features from the second acoustic signal, and identifying one or more fluid inflow locations within the second wellbore using the one or more frequency domain features from the second acoustic signal. The first acoustic signal comprises acoustic samples across a portion of a depth of the first wellbore, and the second acoustic signal comprises acoustic samples across a portion of a depth of the second wellbore.

In an aspect, a method for monitoring fluid injection into a subterranean formation comprises injecting a fluid into a wellbore extending into the subterranean formation, receiving an acoustic signal from a sensor within the wellbore, determining one or more frequency domain features from the acoustic signal, determining an allocation of an injected volume of the fluid across a plurality of outflow locations using the one or more frequency domain features, receiving, at a first time, an indication of a change in the allocation, storing a portion of the acoustic signal as a result of receiving the indication of the change, wherein the portion includes the first time, and identifying an event within the subterranean formation using the portion of the acoustic signal. The acoustic signal comprises acoustic samples across a portion of a depth of the wellbore.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
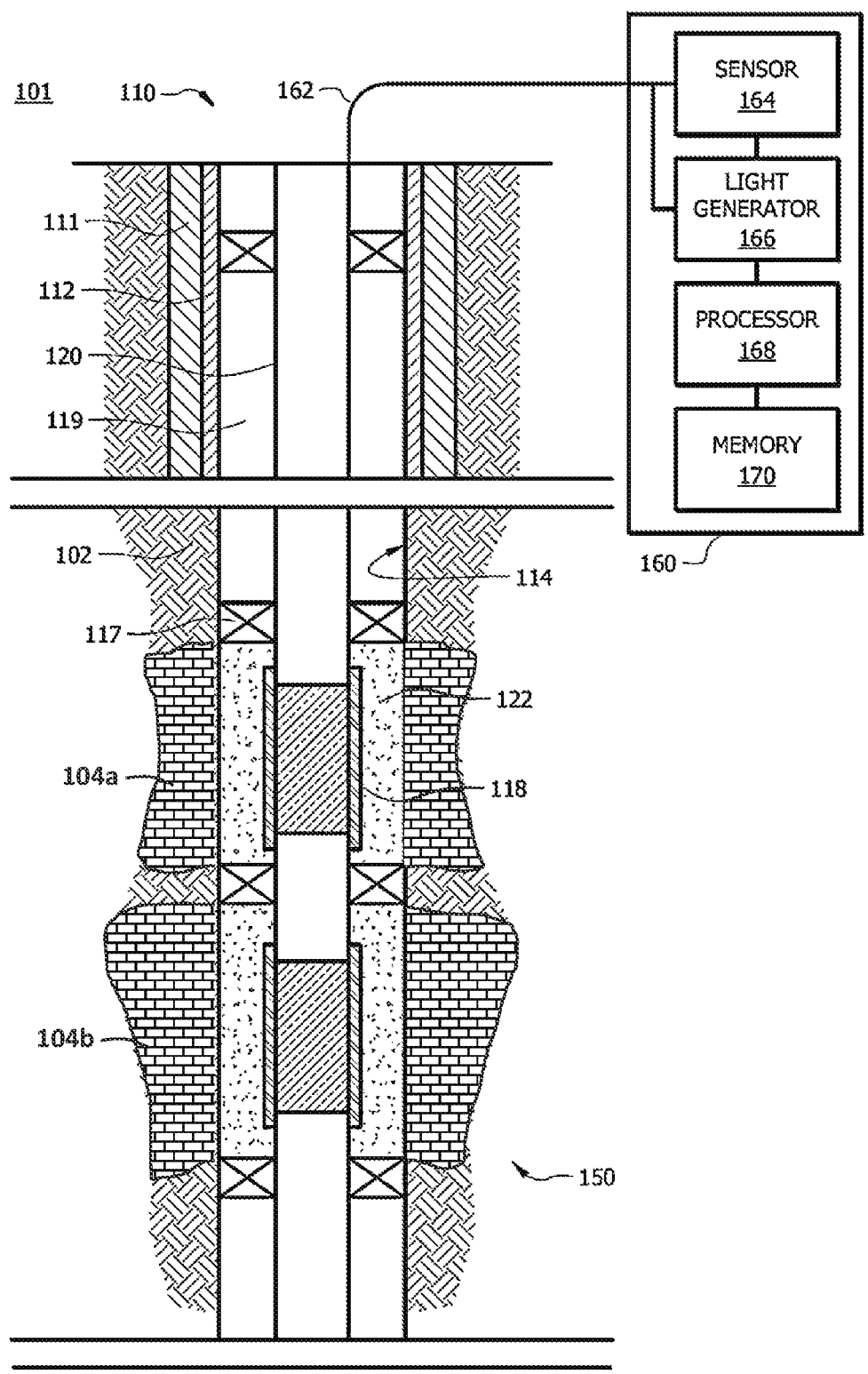
FIG. 1 is a schematic, cross-sectional illustration of a downhole wellbore operating environment according to some embodiments.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to . . . ". Reference to up or down will be made for purposes of description with "up," "upper," "upward," "upstream," or "above" meaning toward the surface of the wellbore and with "down," "lower," "downward," "downstream," or "below" meaning toward the terminal end of the well, regardless of the wellbore orientation. Reference to inner or outer will be made for purposes of description with "in," "inner," or "inward" meaning towards the central longitudinal axis of the wellbore and/or wellbore tubular, and "out," "outer," or "outward" meaning towards the wellbore wall. As used herein, the term "longitudinal" or "longitudinally" refers to an axis substantially aligned with the central axis of the wellbore tubular, and "radial" or "radially" refer to a direction perpendicular to the longitudinal axis. The various characteristics mentioned above, as well as other features and characteristics described in more detail below, will be readily apparent to those skilled in the art with the aid of this disclosure upon reading the following detailed description of the embodiments, and by referring to the accompanying drawings.

As previously described, during the operational life of a subterranean wellbore, various fluid flows into and/or out of the wellbore may occur. It is desirable to identify and characterize the fluid flows within the wellbore so as to facilitate more effective management of the wellbore. For instance, a well operator may wish the know where fluid enters or exits the wellbore and at what flow rates or amounts so as to ensure that fluid is flowing as desired within the wellbore and also within the surrounding formation during operations.

Accordingly, embodiments disclosed herein provide systems and methods of characterizing fluid flow within a subterranean formation. Specifically, in some embodiments, the disclosed systems and methods may be used to continuously identify and characterize fluid inflow and/or outflow from a subterranean wellbore from or into, respectively, a subterranean formation. In some embodiments, the disclosed systems and methods may be used to characterize fluid flow within a subterranean formation following injection or outflow from the subterranean wellbore. In some embodiments, the disclosed systems and methods may be used to identify and characterize events within the subterranean formation, such as, for instance micro-seismic events.

In some instances, the systems and methods can provide information in real time or near real time. As used herein, the term "real time" refers to a time that takes into account various communication and latency delays within a system, and can include actions taken within about ten seconds, within about thirty seconds, within about a minute, within about five minutes, or within about ten minutes of the action occurring. Various sensors (e.g., distributed fiber optic acoustic sensors, point sensors, etc.) can be used to obtain a suitable sampling or measurement at various points along the wellbore. In some embodiments, the sampling or measurement may comprise an acoustic signal, a temperature signal, or both. The acoustic and/or temperature signals can be processed using signal processing architecture with various feature extraction techniques to obtain a measure of one or more frequency domain features and/or one or more temperature features. While discussed in terms of being real time in some instances, the data can also be analyzed at a later time at the same location and/or a displaced location.

For embodiments that utilize an acoustic signal to characterize subterranean fluid flows, various frequency domain features can be obtained from the acoustic signal, and in some contexts, the frequency domain features can also be referred to herein as spectral features or spectral descriptors. The frequency domain features are features obtained from the frequency domain analysis of the acoustic signals obtained within the wellbore, where the acoustic signal can be further resolved into depth intervals or sections using time of flight measurements from returned or reflected signals in an optical fiber. The frequency domain features can be derived from the full spectrum of the frequency domain of the acoustic signal such that each of the frequency domain features can be representative of the frequency spectrum of the acoustic signal. Further, a plurality of different frequency domain features can be obtained from the same acoustic signal, where each of the different frequency domain features is representative of frequencies across the same frequency spectrum of the acoustic signal as the other frequency domain features. For example, the frequency domain features (e.g., each frequency domain feature) can be statistical shape measurement or spectral shape function of the spectral power measurement across the same frequency bandwidth of the acoustic signal. Further, as used herein, frequency domain features can also refer to features or feature sets derived from one or more frequency domain features, including combinations of features, mathematical modifications to the one or more frequency domain features, rates of change of the one or more frequency domain features, and the like.

In some embodiments, the spectral features can comprise other features, including those in the time domain, various transforms (e.g., wavelets, Fourier transforms, etc.), and/or those derived from portions of the acoustic signal or other sensor inputs. Such other features can be used on their own or in combination one or more frequency domain features, including in the development of transformations of the features, as described in more detail herein.

In some embodiments, the acoustic signal(s) can be obtained in a manner that allows for a signal to be obtained along the entire wellbore or a portion of interest. Specifically, some embodiments may make use of fiber optic distributed acoustic sensors (DAS) to capture acoustic signals resulting from fluid flowing into and/or out of a subterranean wellbore along an entire length or some designated length of the wellbore. After applying suitable signal processing procedures (e.g., such as those described herein), fluid inflow, outflow, and flow signals may be distinguished from other noise sources to properly identify and characterize each type of event.

For embodiments that utilize a temperature signal to characterize subterranean fluid flows various temperature features can be derived from temperature measurements within a subterranean wellbore. Fiber optic distributed temperature sensors (DTS) can capture distributed temperature sensing signals resulting from downhole events, such as wellbore events (e.g., fluid inflow/outflow, leaks, overburden movement, and the like), as well as other background events. This allows for signal processing procedures that distinguish events and flow signals from other sources to properly identify each type of event. This in turn results in a need for a clearer understanding of the fingerprint of in-well event of interest (e.g., fluid inflow, fluid outflow, fluid flow along the tubulars, etc.) in order to be able to segregate and identify a signal resulting from an event of interest from other ambient background signals. As used herein, the resulting fingerprint of a particular event can also be referred to as an event signature, as described in more detail herein. In some embodiments, the temperature features can be used with a model (e.g., a machine learning model, multivariate model, etc.) to provide for detection, identification, and determination of the various events. A number of different models can be developed and used to determine when certain events have occurred, for example, within a wellbore.

Referring now to FIG. 1, a schematic, cross-sectional illustration of a downhole wellbore operating environment 101 according to some embodiments is shown. More specifically, environment 101 includes a wellbore 114 traversing a subterranean formation 102, casing 112 lining at least a portion of wellbore 114, and a tubular 120 extending through wellbore 114 and casing 112. A plurality of completion assemblies such as spaced screen elements or assemblies 118 may be provided along tubular 120 at one or more production zones 104a, 104b within the subterranean formation 102. In particular, two production zones 104a, 104b are depicted within subterranean formation 102 of FIG. 1; however, the precise number and spacing of the production zones 104a, 104b may be varied in different embodiments. The completion assemblies can comprise flow control devices such as sliding sleeves, adjustable chokes, and/or inflow control devices to allow for control of the flow from each production zone 104a, 104b. The production zones 104a, 104b may be layers, zones, or strata of formation 102 that contain hydrocarbon fluids (e.g., oil, gas, condensate, etc.) therein.

In addition, a plurality of spaced zonal isolation devices 117 and gravel packs 122 may be provided between tubular 120 and the sidewall of wellbore 114 (i.e., within the annulus 119) at or along the interface of the wellbore 114 with the production zones 104a, 104b. In some embodiments, the operating environment 101 includes a workover and/or drilling rig positioned at the surface and extending over the wellbore 114. While FIG. 1 shows an example completion configuration in FIG. 1, it should be appreciated that other configurations and equipment may be present in place of or in addition to the illustrated configurations and equipment. For example, sections of the wellbore 114 can be completed as open hole completions or with gravel packs without completion assemblies.

In general, the wellbore 114 can be formed in the subterranean formation 102 using any suitable technique (e.g., drilling). The wellbore 114 can extend substantially vertically from the earth's surface over a vertical wellbore portion, deviate from vertical relative to the earth's surface over a deviated wellbore portion, and/or transition to a horizontal wellbore portion. In general, all or portions of a wellbore may be vertical, deviated at any suitable angle, horizontal, and/or curved. In addition, the wellbore 114 can be a new wellbore, an existing wellbore, a straight wellbore, an extended reach wellbore, a sidetracked wellbore, a multi-lateral wellbore, and other types of wellbores for drilling and completing one or more production zones. As illustrated, the wellbore 114 includes a substantially vertical producing section 150 which includes the production zones 104a, 104b. In this embodiment, producing section 150 is an open-hole completion (i.e., casing 112 does not extend through producing section 150). Although section 150 is illustrated as a vertical and open-hole portion of wellbore 114 in FIG. 1, embodiments disclosed herein can be employed in sections of wellbores having any orientation, and in open or cased sections of wellbores. The casing 112 extends into the wellbore 114 from the surface and can be secured within the wellbore 114 with cement 111.

The tubular 120 may comprise any suitable downhole tubular or tubular string (e.g., drill string, casing, liner, jointed tubing, and/or coiled tubing, etc.), and may be inserted within wellbore 114 for any suitable operation(s) (e.g., drilling, completion, intervention, workover, treatment, production, etc.). In the embodiment shown in FIG. 2, the tubular 120 is a completion assembly string. In addition, the tubular 120 may be disposed within in any or all portions of the wellbore 114 (e.g., vertical, deviated, horizontal, and/or curved section of wellbore 114).

In this embodiment, the tubular 120 extends from the surface to the production zones 104a, 104b and generally provides a conduit for fluids to travel from the formation 102 (particularly from production zones 104a, 104b) to the surface. A completion assembly including the tubular 120 can include a variety of other equipment or downhole tools to facilitate the production of the formation fluids from the production zones. For example, zonal isolation devices 117 can be used to isolate the production zones 104a, 104b within the wellbore 114. In this embodiment, each zonal isolation device 117 comprises a packer (e.g., production packer, gravel pack packer, frac-pac packer, etc.). The zonal isolation devices 117 can be positioned between the screen assemblies 118, for example, to isolate different gravel pack zones or intervals along the wellbore 114 from each other. In general, the space between each pair of adjacent zonal isolation devices 117 defines a production interval, and each production interval may corresponding with one of the production zones 104a, 104b of subterranean formation 102.

The screen assemblies 118 provide sand control capability. In particular, the sand control screen elements 118, or other filter media associated with wellbore tubular 120, can be designed to allow fluids to flow therethrough but restrict and/or prevent particulate matter of sufficient size from flowing therethrough. The screen assemblies 118 can be of any suitable type such as the type known as "wire-wrapped", which are made up of a wire closely wrapped helically about a wellbore tubular, with a spacing between the wire wraps being chosen to allow fluid flow through the filter media while keeping particulates that are greater than a selected size from passing between the wire wraps. Other types of filter media can also be provided along the tubular 120 and can include any type of structures commonly used in gravel pack well completions, which permit the flow of fluids through the filter or screen while restricting and/or blocking the flow of particulates (e.g. other commercially-available screens, slotted or perforated liners or pipes; sintered-metal screens; sintered-sized, mesh screens; screened pipes; pre-packed screens and/or liners; or combinations thereof). A protective outer shroud having a plurality of perforations therethrough may be positioned around the exterior of any such filter medium.

The gravel packs 122 can be formed in the annulus 119 between the screen elements 118 (or tubular 120) and the sidewall of the wellbore 114 in an open hole completion. In general, the gravel packs 122 comprise relatively coarse granular material placed in the annulus to form a rough screen against the ingress of sand into the wellbore while also supporting the wellbore wall. The gravel pack 122 is optional and may not be present in all completions.

In some embodiments, one or more of the completion assemblies can comprise flow control elements such as sliding sleeves, chokes, valves, or other types of flow control devices that can control the flow of a fluid from an individual production zone or a group of production zones. The force on the production face can then vary based on the type of completion within the wellbore and/or each production zone (e.g., in a sliding sleeve completion, open hole completion, gravel pack completion, etc.). In some embodiments, a sliding sleeve or other flow controlled production zone can experience a force on the production face that is relatively uniform within the production zone, and the force on the production face can be different between each production zone. For example, a first production zone can have a specific flow control setting that allows the production rate from the first zone to be different than the production rate from a second production zone. Thus, the choice of completion type (e.g., which can be specified in a completion plan) can effect on the need for or the ability to provide a different production rate within different production zones.

Referring still to FIG. 1, a monitoring system 110 can comprise an acoustic monitoring system and/or a temperature monitoring system. The monitoring system 110 can be positioned in the wellbore 114. As described herein, the monitoring system 110 may be utilized to detect and/or characterize fluid flow event(s) (e.g., fluid inflow or outflow events) within wellbore 114.

Figure 2A:
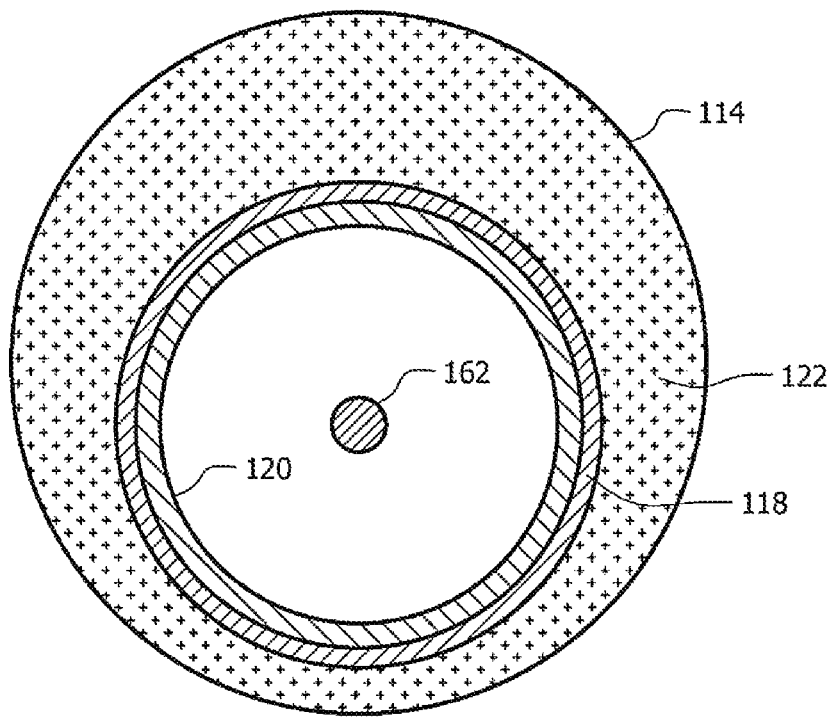
FIGS. 2A and 2B are different example cross-sectional views of a wellbore of the wellbore operating environment of FIG. 1 according to some embodiments.
Figure 2B:
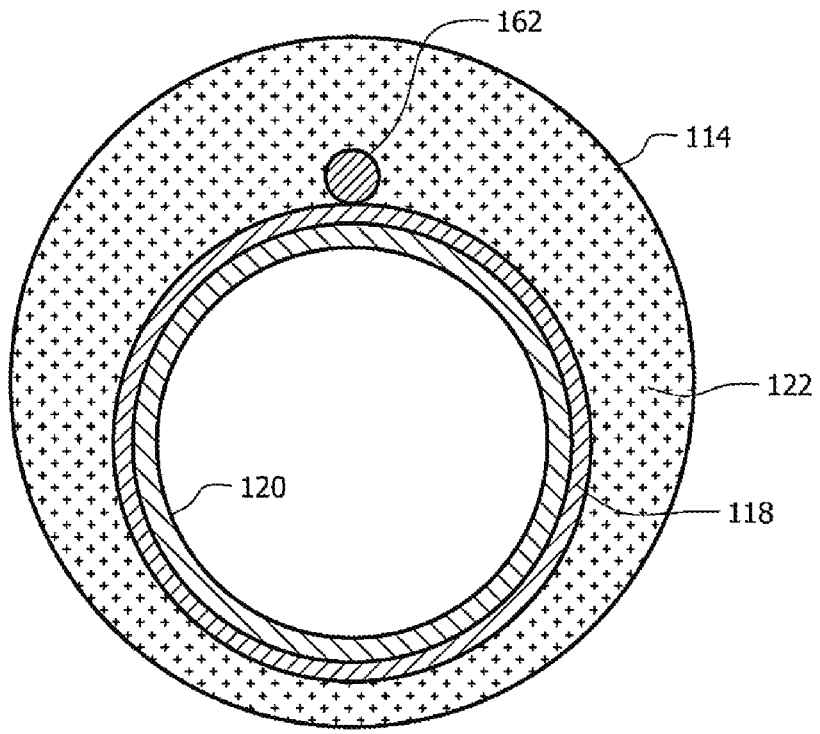

The monitoring system 110 comprises an optical fiber 162 that is coupled to and extends along tubular 120. In cased completions, the optical fiber 162 can be installed between the casing and the wellbore wall within a cement layer and/or installed within the casing or production tubing. Referring briefly to FIGS. 2A and 2B, optical fiber 162 of the monitoring system 110 may be coupled to an exterior of tubular 120 (e.g., such as shown in FIG. 2B) or an interior of tubular (e.g., such as shown in FIG. 2A). When the optical fiber 162 is coupled to the exterior of the tubular 120, as depicted in the embodiment of FIG. 2B, the optical fiber 162 can be positioned within a control line, control channel, or recess in the tubular 120. In some embodiments an outer shroud contains the tubular 120 and protects the optical fiber 162 during installation. A control line or channel can be formed in the shroud and the optical fiber 162 can be placed in the control line or channel (not specifically shown in FIGS. 2A and 2B).

Referring again to FIG. 1, generally speaking, during operation of a the monitoring system, an optical backscatter component of light injected into the optical fiber 162 may be used to detect various conditions incident on the optical fiber such as acoustic perturbations (e.g., dynamic strain), temperature, static strain, and the like along the length of the optical fiber 162. The light can be generated by a light generator or source 166 such as a laser, which can generate light pulses. The light used in the system is not limited to the visible spectrum, and light of any frequency can be used with the systems described herein. Accordingly, the optical fiber 162 acts as the sensor element with no additional transducers in the optical path, and measurements can be taken along the length of the entire optical fiber 162. The measurements can then be detected by an optical receiver such as sensor 164 and selectively filtered to obtain measurements from a given depth point or range, thereby providing for a distributed measurement that has selective data for a plurality of zones (e.g., production zones 104a, 104b) along the optical fiber 162 at any given time. For example, time of flight measurements of the backscattered light can be used to identify individual zones or measurement lengths of the fiber optic 162. In this manner, the optical fiber 162 effectively functions as a distributed array of sensors spread over the entire length of the optical fiber 162, which typically across production zones 104a, 104b within the wellbore 114.

The light backscattered up the optical fiber 162 as a result of the optical backscatter can travel back to the source, where the signal can be collected by a sensor 164 and processed (e.g., using a processor 168). In general, the time the light takes to return to the collection point is proportional to the distance traveled along the optical fiber 162, thereby allowing time of flight measurements of distance along the optical fiber. The resulting backscattered light arising along the length of the optical fiber 162 can be used to characterize the environment around the optical fiber 162. The use of a controlled light source 166 (e.g., having a controlled spectral width and frequency) may allow the backscatter to be collected and any parameters and/or disturbances along the length of the optical fiber 162 to be analyzed. In general, the various parameters and/or disturbances along the length of the optical fiber 162 can result in a change in the properties of the backscattered light.

An acquisition device 160 may be coupled to one end of the optical fiber 162 that comprises the sensor 164, light generator 166, a processor 168, and a memory 170. As discussed herein, the light source 166 can generate the light (e.g., one or more light pulses), and the sensor 164 can collect and analyze the backscattered light returning up the optical fiber 162. In some contexts, the acquisition device 160 (which comprises the light source 166 and the sensor 164 as noted above), can be referred to as an interrogator. The processor 168 may be in signal communication with the sensor 164 and may perform various analysis steps described in more detail herein. While shown as being within the acquisition device 160, the processor 168 can also be located outside of the acquisition device 160 including being located remotely from the acquisition device 160. The sensor 164 can be used to obtain data at various rates and may obtain data at a sufficient rate to detect the acoustic signals of interest with sufficient bandwidth. While described as a sensor 164 in a singular sense, the sensor 164 can comprise one or more photodetectors or other sensors that can allow one or more light beams and/or backscattered light to be detected for further processing. In an embodiment, depth resolution ranges in a range of from about 1 meter to about 10 meters, or less than or equal to about 10, 9, 8, 7, 6, 5, 4, 3, 2, or 1 meter can be achieved. Depending on the resolution needed, larger averages or ranges can be used for computing purposes. When a high depth resolution is not needed, a system may have a wider resolution (e.g., which may be less expensive) can also be used in some embodiments. Data acquired by the monitoring system 110 (e.g., via fiber 162, sensor 164, etc.) may be stored on memory 170.

The monitoring system 110 can be used for detecting a variety of parameters and/or disturbances in the wellbore including being used to detect temperatures along the wellbore, acoustic signals along the wellbore, static strain and/or pressure along the wellbore, or any combination thereof.

In some embodiments, the monitoring system 110 may comprise a DTS system.

Specifically, the monitoring system 110 may rely on light injected into the optical fiber 162 along with the reflected signals to determine a temperature along the optical fiber 162 based on optical time-domain reflectometry. In some embodiments, the monitoring system 110 may comprise a DAS system that may rely on light injected into the optical fiber 162 along with the reflected signals to capture acoustic perturbations (e.g., dynamic strain) along the length of the fiber 162.

In order to obtain DTS and/or DAS measurements, a pulsed laser from the light generator 166 can be coupled to the optical fiber 162 that serves as the sensing element. The injected light can be backscattered as the pulse propagates through the optical fiber 162 owing to density and composition as well as to molecular and bulk vibrations. A portion of the backscattered light can be guided back to the acquisition device 160 and split of by a directional coupler to a sensor 164. It is expected that the intensity of the backscattered light decays exponentially with time. As the speed of light within the optical fiber 162 is known, the distance that the light has passed through the optical fiber 162 can be derived using time of flight measurements.

In both DAS and DTS systems (e.g., such as those that may be included within monitoring system 110), the backscattered light includes different spectral components which contain peaks that are known as Rayleigh and Brillouin peaks and Raman bands. The Rayleigh peaks are independent of temperature and can be used to determine the DAS components of the backscattered light. The Raman spectral bands are caused by thermally influenced molecular vibrations. The Raman spectral bands can then be used to obtain information about distribution of temperature along the length of the optical fiber 162 disposed in the wellbore.

The Raman backscattered light has two components, Stokes and Anti-Stokes, one being only weakly dependent on temperature and the other being greatly influenced by temperature. The relative intensities between the Stokes and Anti-Stokes components and are a function of temperature at which the backscattering occurred. Therefore, temperature can be determined at any point along the length of the optical fiber 162 by comparing at each point the Stokes and Anti-stokes components of the light backscattered from the particular point. The Brillouin peaks may be used to monitor strain along the length of the optical fiber 162.

The monitoring system 110 may comprise DTS system, a DAS system, or a combined DTS and DAS system. In some embodiments, more than one acquisition devices 160 may be coupled to a single optical fiber 162 such that at least of the acquisition devices 160 is to interpret backscattered light emitted through the optical fiber 162 for distributed acoustic signals, and at least one of the acquisition devices 160 is to interpret backscattered light emitted through the optical fiber 162 for distributed temperature signals. In some embodiments, a single acquisition device 160 may support both DAS and DTS functionality within the monitoring system 110. In some embodiments, a plurality of fibers 162 are present within the wellbore, and the DAS system can be coupled to a first optical fiber and the DTS system can be coupled to a second, different, optical fiber. In some embodiments, a single optical fiber can be used with both systems, and a time division multiplexing or other process can be used to measure both DAS and DTS on the same optical fiber.

In an embodiment, depth resolution for the monitoring system 110 (e.g., functioning as a DAS and/or DTS system as described above) can range from about 1 meter to about 10 meters, or less than or equal to about 10, 9, 8, 7, 6, 5, 4, 3, 2, or 1 meter can be achieved. Depending on the resolution needed, larger averages or ranges can be used for computing purposes. When a high depth resolution is not needed, a system may have a wider resolution (e.g., which may be less expensive) can also be used in some embodiments. Data acquired by the monitoring system 110 (e.g., via fiber 162, sensor 164, etc.) may be stored on memory 170.

While the monitoring system 110 described herein can use a temperature and/or acoustic measurements for a location or depth range in the wellbore 114, in general, any suitable monitoring system can be used. For example, various point sensors, thermocouples, resistive temperature sensors, microphones, geophones, hydrophones, or other sensors can be used to provide temperature or acoustic measurements at a given location based on the temperature and/or acoustic measurement processing described herein. Further, an optical fiber comprising a plurality of point sensors such as Bragg gratings can also be used. As described herein, a benefit of the use of the DTS system is that temperature measurements can be obtained across a plurality of locations and/or across a continuous length of the wellbore 114 rather than at discrete locations.

The monitoring system 110 can be used to obtain temperature measurements and/or acoustic measurements along the length of the wellbore (or some portion thereof). The resulting measurements can be processed to obtain various temperature and/or acoustic based features that can then be used to identify fluid outflow or inflow locations, identify outflow or inflowing fluid types, and/or quantify the rate of fluid outflow or inflow, etc. Each of the specific types of features obtained from the monitoring system are described in more detail below.

Referring still to FIG. 1, fluid can be produced into the wellbore 114 and into the completion assembly string (e.g., tubular 120). During operations, the fluid flowing into the wellbore may comprise hydrocarbon fluids, such as, for instance hydrocarbon liquids (e.g., oil), gases (e.g., natural gas such as methane, ethane, etc.), and/or water, any of which can also comprise particulates such as sand. However, the fluid flowing into the tubular may also comprise other components, such as, for instance steam, carbon dioxide, and/or various multiphase mixed flows. The fluid flow can further be time varying such as including slugging, bubbling, or time altering flow rates of different phases. The amounts or flow rates of these components can vary over time based on conditions within the formation 102 and the wellbore 114. Likewise, the composition of the fluid flowing into the tubular 120 sections throughout the length of the entire production string (e.g., including the amount of sand contained within the fluid flow) can vary significantly from section to section at any given time.

Conversely, during operations, fluid can be injected from wellbore 114 into formation 102 during operations. For instance, water, steam, acid, slurry, or other suitable fluids or fluid combinations may be injected into formation 102 via wellbore 114 so as to increase a pressure of the formation 102 for driving or enhancing production in another wellbore (not shown in FIG. 1) extending within formation 102, to decrease a viscosity of hydrocarbons trapped within the formation 102 (e.g., such as in steam assisted gravity drainage—SAGD—production systems), to increase a porosity and/or permeability of the formation 102, etc.

As the fluid enters or exits the wellbore 114 (or some portion thereof such as, for instance tubular 120), the fluid can create acoustic signals and temperature changes that can be detected by the monitoring system 110 (e.g., via operations of the monitoring system 110 as a DTS system and/or a DAS systems as described herein). With respect to the temperature variations, the temperature changes can result from various fluid effects within the wellbore such as cooling based on gas entering the wellbore, temperature changes resulting from liquids entering or exiting the wellbore, changes in temperature within the zones (e.g., zones 104a, 104b) based on fluid injected therein from wellbore 114, and various flow related temperature changes as a result of the fluids passing through the wellbore. For example, as fluids enter the wellbore, the fluids can experience a sudden pressure drop, which can result in a change in the temperature. The magnitude of the temperature change depends on the phase and composition of the inflowing fluid, the pressure drop, and the pressure and temperature conditions. The other major thermodynamic process that takes place as the fluid enters the well is thermal mixing which results from the heat exchange between the fluid body that flows into the wellbore and the fluid that is already flowing in the wellbore. As a result, inflow of fluids from the reservoir into the wellbore can cause a deviation in the flowing well temperature profile.

In addition, the outflow or inflow of fluids (e.g., hydrocarbon liquids, hydrocarbon gas, water, etc.) into the wellbore 114 can also create detectable acoustic sounds. Specifically, as fluid enters or exits flow ports or openings in the tubular 120, vibrations are induced that can create acoustic signals within wellbore 114. Accordingly, the flow of the various fluids into the wellbore 114 and/or through the wellbore 114 can create vibrations or acoustic sounds that can be detected using acoustic monitoring system. Each type of fluid outflow or inflow (e.g., such as the different fluid types, flow rates, and fluid flow locations) can produce a unique acoustic signature.

Referring still to FIG. 1, when operating monitoring system 110 as a DTS system, a number of temperature features can be obtained from the temperature measurements. The temperature features can provide an indication of one or more temperature trends at a given location in the wellbore during a measurement period. The resulting features can form a distribution of temperature results that can then be used with various models to identify one or more events within the wellbore at the location.

The temperature measurements can represent output values from the DTS system, which can be used with or without various types of pre-processing such as noise reduction, smoothing, and the like. When background temperature measurements are used, the background measurement can represent a temperature measurement at a location within the wellbore taken in the absence of the flow of a fluid. For example, a temperature profile along the wellbore 114 can be taken when the well is initially formed and/or the wellbore 114 can be shut in and allowed to equilibrate to some degree before measuring the temperatures at various points in the wellbore. The resulting background temperature measurements or temperature profile can then be used in determining the temperature features in some embodiments.

In general, the temperature features represent statistical variations of the temperature measurements through time and/or depth. For example, the temperature features can represent statistical measurements or functions of the temperature within the wellbore that can be used with various models to determine whether or not fluid inflow events have occurred. The temperature features can be determined using various functions and transformations, and in some embodiments can represent a distribution of results. In some embodiments, the temperature features can represent a normal or Gaussian distribution. The resulting distributions can then be used with models such as multivariate models to determine the presence of the fluid inflow events.

In some embodiments, the temperature features can include various features including, but not limited to, a depth derivative of temperature with respect to depth, a temperature excursion measurement, a baseline temperature excursion, a peak-to-peak value, a Fast Fourier transform (FFT), a Laplace transform, a wavelet transform, a derivative of temperature with respect to depth, a heat loss parameter, an autocorrelation, and combinations thereof.

In some embodiments, the temperature features can comprise a depth derivative of temperature with respect to depth. This feature can be determined by taking the temperature measurements along the wellbore and smoothing the measurements. Smoothing can comprise a variety of steps including filtering the results, de-noising the results, or the like. In some embodiments, the temperature measurements can be median filtered within a given window to smooth the measurements. Once smoothed, the change in the temperature with depth can be determined. In some embodiments, this can include taking a derivative of the temperature measurements with respect to depth along the longitudinal axis of the wellbore 114. The depth derivative of temperature values can then be processed, and the measurement with a zero value (e.g., representing a point of no change in temperature with depth) that have preceding and proceeding values that are non-zero and have opposite signs in depth (e.g., zero below which the value is negative and above positive or vice versa) can have the values assign to the nearest value. This can then result in a set of measurements representing the depth derivative of temperature with respect to depth.

In some embodiments, the temperature features can comprise a temperature excursion measurement. The temperature excursion measurement can comprise a difference between a temperature reading at a first depth and a smoothed temperature reading over a depth range, where the first depth is within the depth range. In some embodiments, the temperature excursion measurement can represent a difference between de-trended temperature measurements over an interval and the actual temperature measurements within the interval. For example, a depth range can be selected within the wellbore 114. The temperature readings within a time window can be obtained within the depth range and de-trended or smoothed. In some embodiments, the de-trending or smoothing can include any of those processes described above, such as using median filtering of the data within a window within the depth range. For median filtering, the larger the window of values used, the greater the smoothing effect can be on the measurements. For the temperature excursion measurement, a range of windows from about 10 to about 100 values, or between about 20-60 values (e.g., measurements of temperature within the depth range) can be used to median filter the temperature measurements. A difference can then be taken between the temperature measurement at a location and the de-trended (e.g., median filtered) temperature values. The temperature measurements at a location can be within the depth range and the values being used for the median filtering. This temperature feature then represents a temperature excursion at a location along the wellbore 114 from a smoothed temperature measurement over a larger range of depths around the location in the wellbore 114.

In some embodiments, the temperature features can comprise a baseline temperature excursion. The baseline temperature excursion represents a difference between a de-trended baseline temperature profile and the current temperature at a given depth. In some embodiments, the baseline temperature excursion can rely on a baseline temperature profile that can contain or define the baseline temperatures along the length of the wellbore 114. As described herein, the baseline temperatures represent the temperature as measured when the wellbore 114 is shut in. This can represent a temperature profile of the formation in the absence of fluid flow. While the wellbore 114 may affect the baseline temperature readings, the baseline temperature profile can approximate a formation temperature profile. The baseline temperature profile can be determined when the wellbore 114 is shut in and/or during formation of the wellbore 114, and the resulting baseline temperature profile can be used over time. If the condition of the wellbore 114 changes over time, the wellbore 114 can be shut in and a new baseline temperature profile can be measured or determined. It is not expected that the baseline temperature profile is re-determined at specific intervals, and rather it would be determined at discrete times in the life of the wellbore 114. In some embodiments, the baseline temperature profile can be re-determined and used to determine one or more temperature features such as the baseline temperature excursion.

Once the baseline temperature profile is obtained, the baseline temperature measurements at a location in the wellbore 114 can be subtracted from the temperature measurement detected by the temperature monitoring system 110 at that location to provide baseline subtracted values. The results can then be obtained and smoothed or de-trended. For example, the resulting baseline subtracted values can be median filtered within a window to smooth the data. In some embodiments, a window between 10 and 500 temperature values, between 50 and 400 temperature values, or between 100 and 300 temperature values can be used to median filter the resulting baseline subtracted values. The resulting smoothed baseline subtracted values can then be processed to determine a change in the smoothed baseline subtracted values with depth. In some embodiments, this can include taking a derivative of the smoothed baseline subtracted values with respect to depth along the longitudinal axis of the wellbore. The resulting values can represent the baseline temperature excursion feature.

In some embodiments, the temperature features can comprise a peak-to-peak temperature value. This feature can represent the difference between the maximum and minimum values (e.g., the range, etc.) within the temperature profile along the wellbore 114. In some embodiments, the peak-to-peak temperature values can be determined by detecting the maximum temperature readings (e.g., the peaks) and the minimum temperature values (e.g., the dips) within the temperature profile along the wellbore 114. The difference can then be determined within the temperature profile to determine peak-to-peak values along the length of the wellbore 114. The resulting peak-to-peak values can then be processed to determine a change in the peak-to-peak values with respect to depth. In some embodiments, this can include taking a derivative of the peak-to-peak values with respect to depth along the longitudinal axis of the wellbore 114. The resulting values can represent the peak-to-peak temperature values.

Other temperature features can also be determined from the temperature measurements. In some embodiments, various statistical measurements can be obtained from the temperature measurements along the wellbore 114 to determine one or more temperature features. For example, a cross-correlation of the temperature measurements with respect to time can be used to determine a cross-correlated temperature feature. The temperature measurements can be smoothed as described herein prior to determining the cross-correlation with respect to time. As another example, an autocorrelation measurement of the temperature measurements can be obtained with respect to depth. Autocorrelation is defined as the cross-correlation of a signal with itself. An autocorrelation temperature feature can thus measure the similarity of the signal with itself as a function of the displacement. An autocorrelation temperature feature can be used, in applications, as a means of anomaly detection for event (e.g., fluid inflow) detection. The temperature measurements can be smoothed and/or the resulting autocorrelation measurements can be smoothed as described herein to determine the autocorrelation temperature features.

In some embodiments, the temperature features can comprise a Fast Fourier transform (FFT) of the distributed temperature sensing (e.g., DTS) signal. This algorithm can transform the distributed temperature sensing signal from the time domain into the frequency domain, thus allowing detection of the deviation in DTS along length (e.g., depth). This temperature feature can be utilized, for example, for anomaly detection for event (e.g., fluid inflow) detection purposes.

In some embodiments, the temperature features can comprise the Laplace transform of DTS. This algorithm can transform the DTS signal from the time domain into Laplace domain allows us to detect the deviation in the DTS along length (e.g., depth of wellbore 114). This temperature feature can be utilized, for example, for anomaly detection for event (e.g., fluid inflow) detection. This feature can be utilized, for example, in addition to (e.g., in combination with) the FFT temperature feature.

In some embodiments, the temperature features can comprise a wavelet transform of the distributed temperature sensing (e.g., DTS) signal and/or of the derivative of DTS with respect to depth, dT/dz. The wavelet transform can be used to represent the abrupt changes in the signal data. This feature can be utilized, for example, in inflow detection. A wavelet is described as an oscillation that has zero mean, which can thus make the derivative of DTS in depth more suitable for this application. In embodiments and without limitation, the wavelet can comprise a Morse wavelet, an Analytical wavelet, a Bump wavelet, or a combination thereof.

In some embodiments, the temperature features can comprise a derivative of DTS with respect to depth, or dT/dz. The relationship between the derivative of flowing temperature $T_f$ with respect to depth (L) (i.e., $dT_f/dL$) has been described by several models. For example, and without limitation, the model described by Sagar (Sagar, R., Doty, D. R., & Schmidt, Z. (1991, Nov. 1). *Predicting Temperature Profiles in a Flowing Well.* Society of Petroleum Engineers. doi: 10.2118/19702-PA) which accounts for radial heat loss due to conduction and describes a relationship (Equation (1) below) between temperature change in depth and mass rate. The mass rate $w_t$ is conversely proportional to the relaxation parameter A and, as the relaxation parameter A increases, the change in temperature in depth increases. Hence this temperature feature can be designed to be used, for example, in events comprising inflow quantification.

$$\frac{dT_f}{dL} = -A\left[(T_f - T_e) + \frac{g}{g_c}\frac{\sin\theta}{JC_{pm}A} - \frac{F_c}{A}\right]. \quad (1)$$

The formula for the relaxation parameter, A, is provided in Equation (2):

$$A = \left(\frac{2\pi}{w_i C_{pl}}\right)\left(\frac{r_{ti}Uk_e}{k_e + r_{ti}Uf/12}\right)\left(\frac{1}{86,400 \times 12}\right) \quad (2)$$

A=coefficient, ft$^{-1}$
$C_{pL}$=specific heat of liquid, Btu/lbm·° F.
$C_{pm}$=specific heat of mixture, Btu/lbm·° F.
$C_{po}$=specific heat of oil, Btu/lbm·° F.
$C_{pw}$=specific heat of water, Btu/lbm·° F.
$d_c$=casing diameter, in.
$d_t$=tubing diameter, in.
$d_{wb}$=wellbore diameter, in.
D=depth, ft
$D_{inj}$=injection depth, ft
f=modified dimensionless heat conduction time function for long times for earth
f(t)=dimensionless transient heat conduction time function for earth
$F_c$=correction factor $\overline{F}_c$=average correction factor for one length interval
g=acceleration of gravity, 32.2 ft/sec$^2$
$g_c$=conversion factor, 32.2 ft-lbm/sec$^2$-lbf
$g_G$=geothermal gradient, ° F./ft
h=specific enthalpy, Bu/lbm
J=mechanical equivalent of heat, 778 f-lbf/Btu
$k_{an}$=thermal conductivity of material in annulus, Btu/D-ft-° F.
$k_{ang}$=thermal conductivity of gas in annulus, Btu/D-ft-° F.
$k_{anw}$=thermal conductivity of water in annulus, Btu/D-ft-° F.
$k_{cem}$=thermal conductivity of cement, Btu/D-ft-° F.
$k_e$=thermal conductivity of earth, Btu/D-ft-° F.
L=length of well from perforations, ft
$L_{in}$=length from perforation to inlet, ft
p=pressure, psi
$p_{wh}$=wellhead pressure, psig
$q_{gf}$=formation gas flow rate, scf/D
$q_{ginj}$=injection gas flow rate, scf/D
$q_o$=oil flow rate, STB/D
$q_w$=water flow rate, STB/D
Q=heat transfer between fluid and surrounding area, Btu/lbm
$r_{ci}$=inside casing radius, in.
$r_{co}$=outside casing radius, in.
$r_{ti}$=inside tubing radius, in.
$r_{to}$=outside tubing radius, in.
$r_{wb}$=wellbore radius, in.
$R_{gL}$=gas/liquid ratio, scf/STB
T=temperature, ° F.
$T_{bh}$=bottomhole temperature, ° F.
$T_c$=casing temperature, ° F.
$T_e$=surrounding earth temperature, ° F.
$T_{ein}$=earth temperature at inlet, ° F.
$T_f$=flowing fluid temperature, ° F.
$T_{fin}$=flowing fluid temperature at inlet, ° F.
$T_h$=cement/earth interface temperature, ° F.
U=overall heat transfer coefficient, Btu/D-ft$^2$-° F.
v=fluid velocity, ft/sec
V=volume
$w_t$=total mass now rate, lbm/sec
Z=height from bottom of hole, ft
$Z_{in}$=height from bottom of hole at inlet, ft
α=thermal diffusivity of earth, 0.04 ft$^2$/hr
$\gamma_{API}$=oil gravity, °API
$\gamma_g$=gas specific gravity (air=1)
$\gamma_o$=oil specific gravity
$\gamma_w$=water specific gravity
θ=an of inclination, degrees
μ=Joule-Thomson coefficient In some embodiments, the temperature features can comprise a heat loss parameter. As described hereinabove, Sagar's model describes the relationship between various input parameters, including the mass rate $w_t$ and temperature change in depth $dT_f/d_L$. These parameters can be utilized as temperature features in a machine learning model which uses features from known cases (production logging results) as learning data sets, when available. These features can include geothermal temperature, deviation, dimensions of the tubulars 120 that are in the well (casing 112, tubing 120, gravel pack 122 components, etc.), as well as the wellbore 114, well head pressure, individual separator rates, downhole pressure, gas/liquid ratio, and/or a combination thereof. Such heat loss parameters can, for example, be utilized as inputs in a machine learning model for events comprising inflow quantification of the mass flow rate $w_t$.

In some embodiments, the temperature features can be based on dynamic temperature measurements rather than steady state or flowing temperature measurements. In order to obtain dynamic temperature measurements, a change in the operation of the wellbore 114 can be introduced, and the temperature monitored using the temperature monitoring system. The change in conditions can be introduced by shutting in the wellbore 114, opening one or more sections of the wellbore 114 to flow, introducing a fluid to the wellbore 114 (e.g., injecting a fluid), and the like. When the wellbore 114 is shut in from a flowing state, the temperature profile along the wellbore 114 may be expected to change from the flowing profile to the baseline profile over time. Similarly, when a wellbore 114 that is shut in is opened for flow, the temperature profile may change from a baseline profile to a flowing profile. Based on the change in the condition of the wellbore 114, the temperature measurements can change dynamically over time. In some embodiments, this approach can allow for a contrast in thermal conductivity to be determined between a location or interval having radial flow (e.g., into or out of the wellbore) to a location or interval without radial flow. One or more temperature features can then be determined using the dynamic temperature measurements. Once the temperature features are determined from the temperature measurements obtained from the temperature monitoring system, one or more of the temperature features can be used to identify events (e.g., fluid inflow events within a wellbore), as described in more detail herein.

Any of these temperature features, or any combination of these temperature features (including transformations of any of the temperature features and combinations thereof), can be used to detect one or more events. In an embodiment, a selected set of characteristics can be used to identify the presence or absence for each event, and/or all of the temperature features that are calculated can be used as a group in characterizing the presence or absence of an event. The specific values for the temperature features that are calculated can vary depending on the specific attributes of the temperature signal acquisition system, such that the absolute value of each temperature feature can change between systems. In some embodiments, the temperature features can be calculated for each event based on the system being used to capture the temperature signal and/or the differences between systems can be taken into account in determining the temperature feature values for each event between or among the systems used to determine the values and the systems used to capture the temperature signal being evaluated.

One or a plurality of temperature features can be used to identify events. In an embodiment, one, or at least two, three, four, five, six, seven, eight, etc. different temperature features can be used to detect events. The temperature features can be combined or transformed in order to define the event signatures for one or more events, such as, for instance, a fluid inflow event location or flowrate. The actual numerical results for any temperature feature may vary depending on the data acquisition system and/or the values can be normalized or otherwise processed to provide different results.

Referring still to FIG. 1, when operating monitoring system 110 as a DAS system, a number of frequency domain features can be determined for the acoustic sample data. However, not every frequency domain feature may be used in the identifying fluid flow characteristics, inflow or outflow locations, flow type, or flow rate classification or prediction. The frequency domain features represent specific properties or characteristics of the acoustic signals. There are a number of factors that can affect the frequency domain feature selection for each fluid inflow event. For example, a chosen descriptor should remain relatively unaffected by the interfering influences from the environment such as interfering noise from the electronics/optics, concurrent acoustic sounds, distortions in the transmission channel, and the like. In general, electronic/instrumentation noise is present in the acoustic signals captured on the DAS or any other electronic gauge, and it is usually an unwanted component that interferes with the signal. Thermal noise is introduced during capturing and processing of signals by analogue devices that form a part of the instrumentation (e.g., electronic amplifiers and other analog circuitry). This is primarily due to thermal motion of charge carriers. In digital systems additional noise may be introduced through sampling and quantization. The frequency domain features should have values that are significant for a given event in the presence of noise.

As a further consideration in selecting the frequency domain feature(s) for a fluid outflow or inflow event in some embodiments, the dimensionality of the frequency domain feature should be compact. A compact representation may be desired to decrease the computational complexity of subsequent calculations. It may also be desirable for the frequency domain feature to have discriminant power. For example, for different types of audio signals, the selected set of descriptors should provide altogether different values. A measure for the discriminant power of a feature is the variance of the resulting feature vectors for a set of relevant input signals. Given different classes of similar signals, a discriminatory descriptor should have low variance inside each class and high variance over different classes. The frequency domain feature should also be able to completely cover the range of values of the property it describes.

In some embodiments, combinations of frequency domain features can be used. This can include a signature having multiple frequency domain features as indicators. In some embodiments, a plurality of frequency domain features can be transformed to create values that can be used to define various event signatures. This can include mathematical transformations including ratios, equations, rates of change, transforms (e.g., wavelets, Fourier transforms, other wave form transforms, etc.), other features derived from the feature set, and/or the like as well as the use of various equations that can define lines, surfaces, volumes, or multivariable envelopes. The transformation can use other measurements or values outside of the frequency domain features as part of the transformation. For example, time domain features, other acoustic features, and non-acoustic measurements can also be used. In this type of analysis, time can also be considered as a factor in addition to the frequency domain features themselves. As an example, a plurality of frequency domain features can be used to define a surface (e.g., a plane, a three-dimensional surface, etc.) in a multivariable space, and the measured frequency domain features can then be used to determine if the specific readings from an acoustic sample fall above or below the surface. The positioning of the readings relative to the surface can then be used to determine if the event if present or not at that location in that detected acoustic sample.

As an example, the chosen set of frequency domain features should be able to uniquely identify the event signatures with a reasonable degree of certainty of each of the acoustic signals pertaining to a selected downhole surveillance application or fluid outflow or inflow event as described herein. Such frequency domain features can include, but are not limited to, the spectral centroid, the spectral spread, the spectral roll-off, the spectral skewness, the root mean square (RMS) band energy (or the normalized sub-band energies/band energy ratios), a loudness or total RMS energy, a spectral flatness, a spectral slope, a spectral kurtosis, a spectral flux, a spectral autocorrelation function, or a normalized variant thereof.

The spectral centroid denotes the "brightness" of the sound captured by the optical fiber (e.g., optical fiber 162 shown in FIG. 1) and indicates the center of gravity of the frequency spectrum in the acoustic sample. The spectral centroid can be calculated as the weighted mean of the frequencies present in the signal, where the magnitudes of the frequencies present can be used as their weights in some embodiments.

The spectral spread is a measure of the shape of the spectrum and helps measure how the spectrum is distributed around the spectral centroid. In order to compute the spectral spread, $S_i$, one has to take the deviation of the spectrum from the computed centroid as per the following equation (all other terms defined above):

$$S_i = \sqrt{\frac{\sum_{k=1}^{N}(f(k)-C_i)^2 X_i(k)}{\sum_{k=1}^{N} X_i(k)}}. \qquad (3)$$

The spectral roll-off is a measure of the bandwidth of the audio signal. The Spectral roll-off of the $i^{th}$ frame, is defined as the frequency bin 'y' below which the accumulated magnitudes of the short-time Fourier transform reach a certain percentage value (usually between 85%-95%) of the overall sum of magnitudes of the spectrum.

$$\sum_{k=1}^{y}|X_i(k)| = \frac{c}{100}\sum_{k=1}^{N}|X_i(k)|, \qquad (4)$$

where c=85 or 95. The result of the spectral roll-off calculation is a bin index and enables distinguishing acoustic events based on dominant energy contributions in the frequency domain (e.g., between gas influx and liquid flow, etc.).

The spectral skewness measures the symmetry of the distribution of the spectral magnitude values around their arithmetic mean.

The RMS band energy provides a measure of the signal energy within defined frequency bins that may then be used for signal amplitude population. The selection of the bandwidths can be based on the characteristics of the captured acoustic signal. In some embodiments, a sub-band energy ratio representing the ratio of the upper frequency in the selected band to the lower frequency in the selected band can range between about 1.5:1 to about 3:1. In some embodiments, the sub-band energy ratio can range from about 2.5:1 to about 1.8:1, or alternatively be about 2:1. The total RMS energy of the acoustic waveform calculated in the time domain can indicate the loudness of the acoustic signal. In some embodiments, the total RMS energy can also be extracted from the temporal domain after filtering the signal for noise.

The spectral flatness is a measure of the noisiness/tonality of an acoustic spectrum. It can be computed by the ratio of the geometric mean to the arithmetic mean of the energy spectrum value and may be used as an alternative approach to detect broad-banded signals. For tonal signals, the spectral flatness can be close to 0 and for broader band signals it can be closer to 1.

The spectral slope provides a basic approximation of the spectrum shape by a linearly regressed line. The spectral slope represents the decrease of the spectral amplitudes from low to high frequencies (e.g., a spectral tilt). The slope, the y-intersection, and the max and media regression error may be used as features.

The spectral kurtosis provides a measure of the flatness of a distribution around the mean value.

The spectral flux is a measure of instantaneous changes in the magnitude of a spectrum. It provides a measure of the frame-to-frame squared difference of the spectral magnitude vector summed across all frequencies or a selected portion of the spectrum. Signals with slowly varying (or nearly constant) spectral properties (e.g., noise) have a low spectral flux, while signals with abrupt spectral changes have a high spectral flux. The spectral flux can allow for a direct measure of the local spectral rate of change and consequently serves as an event detection scheme that could be used to pick up the onset of acoustic events that may then be further analyzed using the feature set above to identify and uniquely classify the acoustic signal.

The spectral autocorrelation function provides a method in which the signal is shifted, and for each signal shift (lag) the correlation or the resemblance of the shifted signal with the original one is computed. This enables computation of the fundamental period by choosing the lag, for which the signal best resembles itself, for example, where the autocorrelation is maximized. This can be useful in exploratory signature analysis/even for anomaly detection for well integrity monitoring across specific depths where well barrier elements to be monitored are positioned.

Any of these frequency domain features, or any combination of these frequency domain features (including transformations of any of the frequency domain features and combinations thereof), can be used to determine the location, type, and flow rate of fluid inflow or the fluid inflow discrimination as described hereinbelow. In an embodiment, a selected set of characteristics can be used to identify the presence or absence for each fluid outflow or inflow event, and/or all of the frequency domain features that are calculated can be used as a group in characterizing the presence or absence of a fluid outflow or inflow event. The specific values for the frequency domain features that are calculated can vary depending on the specific attributes of the acoustic signal acquisition system, such that the absolute value of each frequency domain feature can change between systems. In some embodiments, the frequency domain features can be calculated for each event based on the system being used to capture the acoustic signal and/or the differences between systems can be taken into account in determining the frequency domain feature values for each fluid inflow event between or among the systems used to determine the values and the systems used to capture the acoustic signal being evaluated.

One or a plurality of frequency domain features can be used to characterize each type of event (e.g., fluid outflow, fluid inflow, etc.) and/or to classify the flow rate of each identified type of fluid outflow/inflow (e.g., water, gas, hydrocarbon liquid, etc.). In an embodiment, one, or at least two, three, four, five, six, seven, eight, etc. different frequency domain features can be used to characterize each type of event and/or to classify the flow rate of each identified type of fluid flow/inflow. The frequency domain features can be combined or transformed in order to define the event signatures for one or more events. While exemplary numerical ranges are provided herein, the actual numerical results may vary depending on the data acquisition system and/or the values can be normalized or otherwise processed to provide different results.

Figure 3:
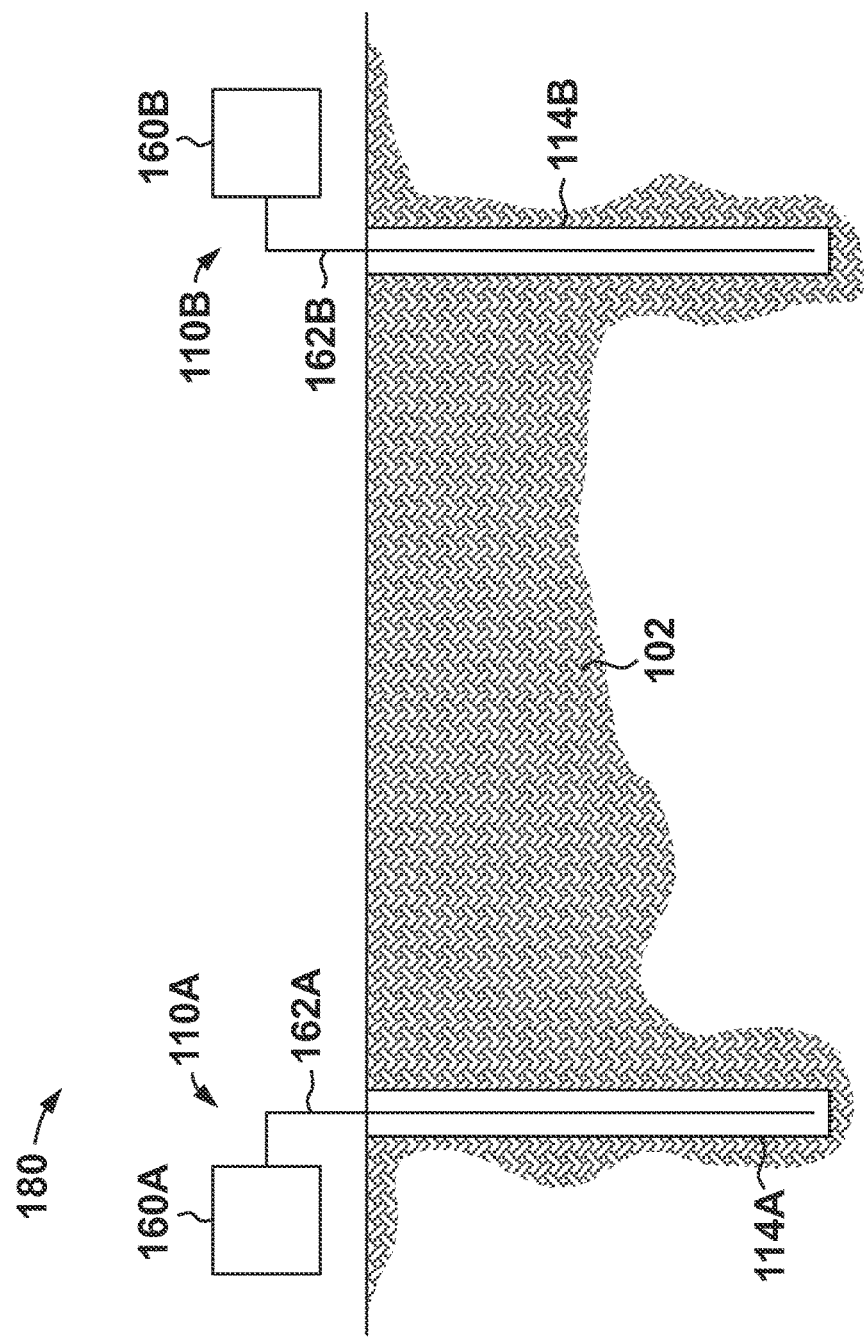
FIG. 3 is a schematic, cross-sectional illustration of a well system according to some embodiments.

Referring now to FIG. 3, a well system 180 is shown. Well system 180 includes a plurality of wellbores 114A, 114B extending into subterranean formation 102. In the depiction of FIG. 3, the well system 180 includes two wellbores 114A, 114B; however, the number and arrangement of the plurality of wellbores within embodiments of well system 180 may be varied in different embodiments. Each of the wellbores 114A, 114B may be generally configured the same or similar to the wellbore 114 of FIG. 1, previously described above. Thus, structural details of the wellbores 114A, 114B are omitted in FIG. 3 so as to simplify the drawing, and it should be appreciated that the description above for wellbore 114 may be applied to describe various embodiments of wellbores 114A, 114B.

Wellbores 114A, 114B may each comprise a corresponding monitoring system 110A, 110B, respectively. Monitoring systems 110A, 110B may be generally the same as monitoring system 110 shown in FIG. 1 and previously described above. Thus, many of the details of the monitoring system 110 are omitted so as to simplify the drawing, and it should be appreciated that the description above for monitoring system 110 may be applied to describe various embodiments of monitoring systems 110A, 110B. Accordingly, monitoring systems 110A, 110B may be configured to as DTS systems, DAS systems, or both as previously described. As shown in FIG. 3, each monitoring system 110A, 110B includes a corresponding optical fiber 162A, 162B, respectively, and acquisition device 160A, 160B, respectively (which may generally be the same as the optical fiber 162 and acquisition device 160 shown in FIG. 1 and previously described above).

During operations, fluids may be injected into formation 102 via one or both of the wellbores 114A, 114B, and fluids may be produced from formation 102 into one or both of the wellbores 114A, 114B. During these operations, monitoring systems 110A, 110B may be utilized to characterize the fluid flows into, out of, and between the wellbores 110A, 110B. Specifically, the monitoring systems 110A, 110B (e.g., via optical fibers 162A, 162B, and acquisition systems 160A, 160B, respectively) may capture distributed temperature and/or acoustic signals within wellbores 114A, 114B, and via various analysis methods as described herein may monitor, identify, and characterize various aspects of the fluids flows into, out of, and/or between wellbores 114A, 114B.

In some specific examples, a fluid (e.g., water) may be injected into formation 102 via wellbore 114A. The injected fluid may then flow into formation toward second wellbore 114B, and wellbore 114B may receive formation fluids (e.g., hydrocarbon liquids, hydrocarbon gases, native formation water, etc.), injected fluid (e.g., from wellbore 114A, or both, which may then be produced, via wellbore 114B, to the surface. During these operations, the monitoring systems 110A, 110B, via embodiments of one or more of the methods described herein, may monitor and characterize the fluid flow out of wellbore 114A, the fluid flow into wellbore 114B, and/or the fluid flow within the formation 102 (e.g., between wellbores 114A, 114B).

Figure 4:
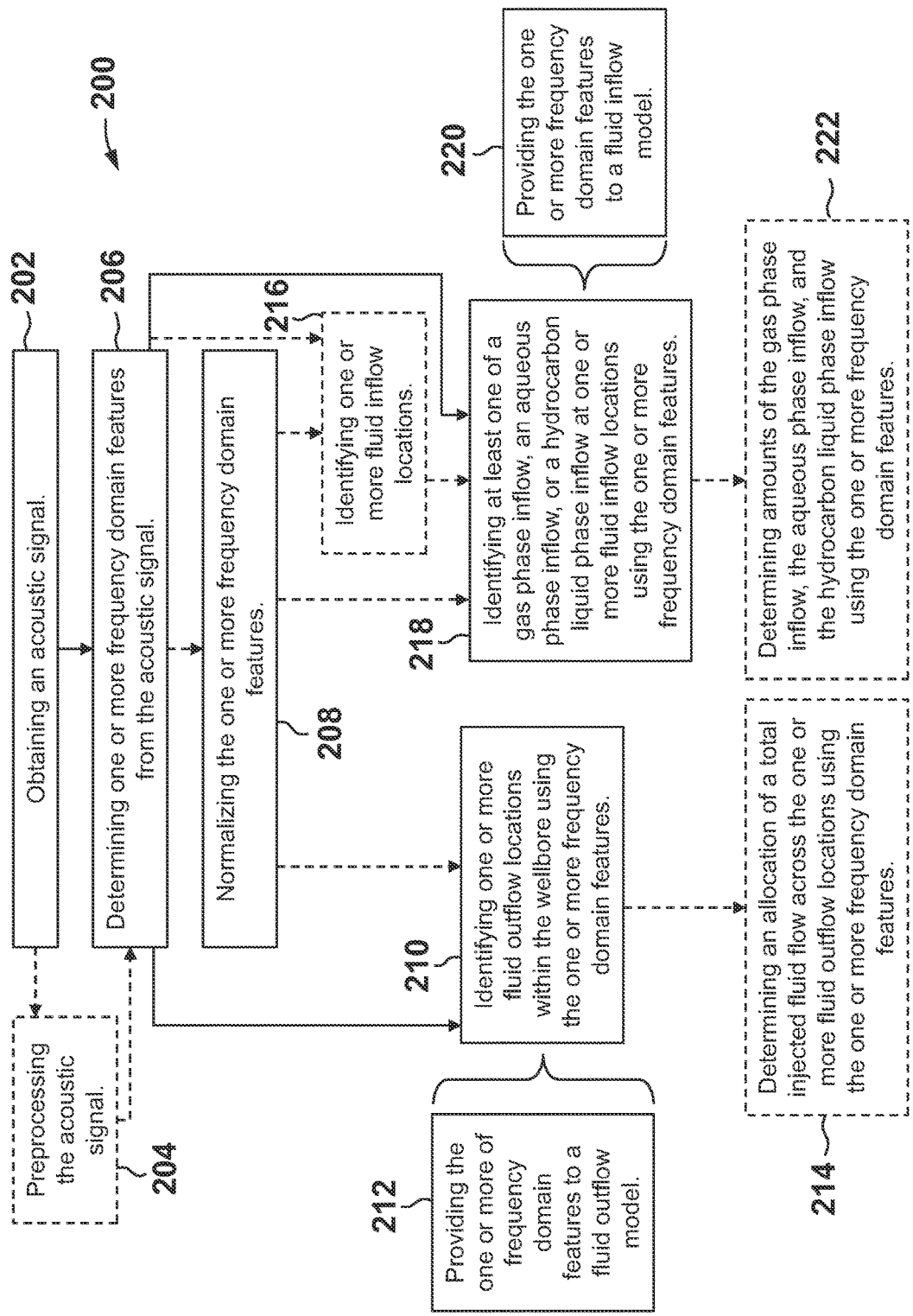
FIG. 4 is a flow diagram of a method of characterizing fluid inflows and outflows into and from a wellbore according to some embodiments.

Referring now to FIG. 4, a flow chart of a method 200 of characterizing a fluid flow into and/or out of a wellbore extending within a surrounding subterranean formation according to some embodiments of this disclosure is shown. Generally speaking, method 200 may be utilized to characterize fluid flow out of and/or into a wellbore with a DAS system (e.g., such as monitoring system 110 of FIG. 1). Without being limited to this or any other theory, by characterizing the various flows into and/or out of a wellbore, a well operator may have a more complete understanding of the status, health, and condition of the wellbore during operations Initially, method 200 includes obtaining an acoustic signal at 202. Such an acoustic signal can be obtained via any suitable method or system. For instance, in some embodiments, the acoustic signal at block 202 may be obtained utilizing a DAS system (e.g., monitoring systems 110, 110A, 110B, previously described above) installed at least partially within a wellbore (e.g., wellbore 114, 114A, 114B, etc.). In some embodiments, the acoustic signal obtained at 202 may include vibrations that resulted from the flow of fluid into or out of the wellbore. In some embodiments, the acoustic signals obtained at 202 can include frequencies in the range of about 5 Hz to about 10 kHz, frequencies in the range of about 5 Hz to about 5 kHz or about 50 Hz to about 5 kHz, or frequencies in the range of about 500 Hz to about 5 kHz. Any frequency ranges between the lower frequencies values (e.g., 5 Hz, 50 Hz, 500 Hz, etc.) and the upper frequency values (e.g., 10 kHz, 7 kHz, 5 kHz, etc.) can be used to define the frequency range for a broadband acoustic signal.

Referring again to FIG. 4, after the acoustic signal is obtained at 202, method 200 may proceed, in some embodiments, to pre-process the raw data at 204. The acoustic signal can be generated within a wellbore as previously described. Depending on the type of DAS system employed (e.g., monitoring system 110 in FIG. 1), the optical data of the acoustic signal may or may not be phase coherent and may be preprocessed to improve the signal quality (e.g., denoised for opto-electronic noise normalization/de-trending single point-reflection noise removal through the use of median filtering techniques or even through the use of spatial moving average computations with averaging windows set to the spatial resolution of the acquisition unit, etc.). The raw optical data from the acoustic sensor (e.g., optical fiber 162, 162A, 162B, etc.) can be received, processed, and generated by the sensor to produce the acoustic signal. The data rate generated by various acoustic sensors such as a DAS system (e.g., monitoring system 110) can be large. For example, the DAS system may generate data on the order of 0.5 to about 2 terabytes per hour. This raw data can optionally be stored in a memory (e.g., memory 170 for monitoring system 110 in FIG. 1).

A number of specific processing steps can be performed to determine the location of fluid outflow, the presence and location of fluid inflow, the composition of inflowing fluid, and/or the flow rate or volume of the outflowing or inflowing fluid (see e.g., blocks 210, 214, described in more detail below). In some embodiments, a processor or collection of processors (e.g., processor 168 in FIG. 1) may be utilized to perform the preprocessing steps described herein. In an embodiment, the noise detrended "acoustic variant" data can be subjected to an optional spatial filtering step following the other preprocessing steps, if present. A spatial sample point filter can be applied that uses a filter to obtain a portion of the acoustic signal corresponding to a desired depth or depth range in the wellbore. Since the time the light pulse sent into the optical fiber returns as backscattered light can correspond to the travel distance, and therefore depth in the wellbore, the acoustic data can be processed to obtain a sample indicative of the desired depth or depth range. This may allow a specific location within the wellbore to be isolated for further analysis. The preprocessing at 204 may also include removal of spurious back reflection type noises at specific depths through spatial median filtering or spatial averaging techniques. This is an optional step and helps focus primarily on an interval of interest in the wellbore. For example, the spatial filtering step can be used to focus on a producing interval where there is maximum likelihood of fluid inflow, for example. The resulting data set produced through the conversion of the raw optical data can be referred to as the acoustic sample data.

Filtering can provide several advantages. For instance, when the acoustic data set is spatially filtered, the resulting data, for example the acoustic sample data, used for the next step of the analysis can be indicative of an acoustic sample over a defined depth (e.g., the entire length of the optical fiber, some portion thereof, or a point source in the wellbore 114). In some embodiments, the acoustic data set can comprise a plurality of acoustic samples resulting from the spatial filter to provide data over a number of depth ranges. In some embodiments, the acoustic sample may contain acoustic data over a depth range sufficient to capture multiple points of interest. In some embodiments, the acoustic sample data contains information over the entire frequency range of the detected acoustic signal at the depth represented by the sample. This is to say that the various filtering steps, including the spatial filtering, do not remove the frequency information from the acoustic sample data.

In some embodiments, the filtered data may be additionally transformed from the time domain into the frequency domain using a transform at 204 (e.g., after it has been filtered—such as spatially filtered as described above). For example, Discrete Fourier transformations (DFT) or a short time Fourier transform (STFT) of the acoustic variant time domain data measured at each depth section along the fiber or a section thereof may be performed to provide the data from which the plurality of frequency domain features can be determined. The frequency domain features can then be determined from the acoustic data. Spectral feature extraction using the frequency domain features through time and space can be used to determine the spectral conformance (e.g., whether or not one or more frequency domain features match or conform to certain signature thresholds) and determine if an acoustic signature (e.g., a fluid inflow signature, a gas phase inflow signature, a water phase inflow signature, a hydrocarbon liquid phase inflow signature, etc.) is present in the acoustic sample. Within this process, various frequency domain features can be calculated for the acoustic sample data.

Preprocessing at 204 can optionally include a noise normalization routine to improve the signal quality. This step can vary depending on the type of acquisition device used as well as the configuration of the light source, the sensor, and the other processing routines. The order of the aforementioned preprocessing steps can be varied, and any order of the steps can be used.

Preprocessing at 204 can further comprise calibrating the acoustic signal. Calibrating the acoustic signal can comprise removing a background signal from the acoustic signal, aligning the acoustic data with physical depths in the wellbore, and/or correcting the acoustic signal for signal variations in the measured data. The background signal may comprise background noise that is generated by the flowing of fluids within the wellbore, and/or vibrations that are not associated with the fluid inflows or outflows of interest. In some embodiments, calibrating the acoustic signal comprises identifying one or more anomalies within the acoustic signal and removing one or more portions of the acoustic signal outside the one or more anomalies.

Following the preprocessing at 204, method 200 may determine one or more frequency domain features from the acoustic signal at 206. As used herein, "one or more" expressly includes "one," or "a plurality of." Thus, "one or more" frequency domain features may include one frequency domain feature or a plurality of frequency domain features. The use of frequency domain features to identify outflow locations, inflow locations, inflow type discrimination, and outflow or inflow flow rate or volume can provide a number of advantages. First, the use of frequency domain features results in significant data reduction relative to the raw DAS data stream. Thus, a number of frequency domain features can be calculated and used to allow for event identification while the remaining data can be discarded or otherwise stored, and the remaining analysis can performed using the frequency domain features. Even when the raw DAS data is stored, the remaining processing power is significantly reduced through the use of the frequency domain features rather than the raw acoustic data itself. Further, the use of the frequency domain features can, with the appropriate selection of one or more of the frequency domain features, provide a concise, quantitative measure of the spectral character or acoustic signature of specific sounds pertinent to downhole fluid surveillance and other applications. The frequency domain features obtained at block 206 may comprise one or more of the frequency domain features described herein including combinations, variants (e.g., a normalized variant), and/or transformations thereof.

Referring still to FIG. 4, as previously described in some embodiments method 200 may also comprise normalizing the one or more frequency domain features at 208. Any suitable normalization procedure and/or algorithm may be employed at block 208. As a result, a detailed explanation of this step is not included herein in the interests of brevity. In some embodiments, block 208 omitted from method 200.

Following block 206 (and potentially the normalization at block 208 as previously described above), method 200 may then progress to block 210 and/or block 218. In some embodiments, method 200 may progress to block 210 and not block 218 (or block 218 and not block 210) following block 206 (or block 208). In some embodiments, method 200 may progress to both block 210 and block 218 (e.g., simultaneously, consecutively, etc.). Thus, it should be understood that in some embodiments of method 200, one of the blocks 210, 218 (and blocks that proceed from or rely upon blocks 210, 218) may not be performed.

Referring still to FIG. 4, block 210 may comprise identifying at least one fluid outflow location within the wellbore using the one or more frequency domain features. In some embodiments, the one or more frequency domain features utilized at block 210 may comprise one or more of the frequency domain features described herein including combinations, variants (e.g., a normalized variant), and/or transformations thereof. For instance, in some embodiments, at least two such frequency domain features (and/or combinations, variants, or transformations thereof) are utilized at block 210. In some embodiments, the frequency domain features utilized within block 210 may comprise a ratio between at least two of the plurality of the frequency domain features. Specifically, in some embodiments, the frequency domain features utilized at 210 may comprise a normalized variant of the spectral spread and/or a normalized variant of the spectral centroid. In some embodiments, identifying the one or more fluid outflow locations comprises identifying one or more anomalies in the acoustic signal using the one or more frequency domain features of the plurality of frequency domain features; and selecting the depth intervals of the one or more anomalies as including or being the one or more outflow locations.

Referring briefly again to FIG. 1, in some embodiments, the one or more outflow locations may comprise locations where fluid (e.g., water, glycol, acid, other suitable injection fluids, etc.) is flowing from a tubular within the wellbore into an annular space between the tubular and the borehole wall. For instance, for the wellbore 114 of FIG. 1, the one or more outflow locations may comprise locations where fluid is flowing from tubular 120 into the annulus 119. As previously described, the annular space 119 may be separated into a plurality of zones or intervals by the plurality of zonal isolation devices 117 (e.g., packers). Thus, in some embodiments the one or more outflow locations may not comprise precise locations where fluid is entering formation 102, but may indicate a general depth interval, between zonal isolation devices 117, where fluid is exiting tubular 120 and is thereby exposed to the wall of the formation 102. Within each depth interval, fluid may enter the formation 102 at one or a plurality of points or locations (e.g., such as at one or more different perforations, cracks, or other entrance points/locations into the formation). As described in more detail below, these subsequent points or areas of entry into the formation may be referred to as "fluid uptake locations."

In some embodiments, block 210 of method 10 may comprise providing the one or more frequency domain features to a fluid outflow model (e.g., a logistic regression model) at 212 and determining that at least one fluid outflow is present within the wellbore (or along a length or depth range of interest), based on the fluid flow model. In some embodiments, the fluid outflow model can be developed using and/or may include machine learning such as a neural network, a Bayesian network, a decision tree, a logistical regression model, or a normalized logistical regression, or other supervised learning models. In some embodiments, the model at 212 may define a relationship between at least two of the plurality of the frequency domain features, including in some embodiments combinations, variations, and/or transformations of the frequency domain features and one or more fluid flows. In some embodiments, block 212 may comprise utilizing a plurality of different models to identify the one or more fluid outflow locations within the wellbore (e.g., wellbore 114 in FIG. 1). In some embodiments, one or more of the plurality of models may comprise multivariable models. In some of these embodiments, the plurality of models may utilize one or more of the frequency domain features (which may or may not be the same in each model) as inputs therein. In some embodiments, the plurality of models may utilize at least two of the frequency domain features as inputs therein.

Once the one or more fluid outflow locations are determined via blocks 210, 212, method 200 may next include determining an allocation of a total injected fluid flow across the one or more fluid outflow locations using the one or more frequency domain features at block 214. In some embodiments, a total injected fluid flow comprises a total flow rate (e.g., volumetric flow rate) that is injected into the wellbore (e.g., wellbore 114) from the surface. This total volumetric flow rate may be known based on one or more flow meters within or upstream of wellbore 114, and that may be separate from the DAS system (e.g., monitoring system 110).

The allocation of the total volumetric flow rate may be determined by inputting one or more or a plurality of the frequency domain features determined at block 206 into an additional fluid flow model. In some embodiments, the additional fluid flow model may be the same or similar to one or more of the fluid outflow model(s) utilized at blocks 210, 212 as previously described. Thus, in some embodiments, blocks 210, 212, and 214 may be merged so as to determine both identify the one or more outflow locations as well as to determine the allocation of the total injected fluid flow across the one or more outflow locations in a single block. In some embodiments, the fluid model(s) (or at least some thereof) for determining an allocation of the total injected fluid flow may be separate from the fluid outflow model(s) utilized at blocks 210, 212. In various embodiments, the fluid flow model(s) utilized at block 214 may use one or more of the frequency domain features in a similar manner to that described above for the fluid outflow flow model(s) of block 212.

In some embodiments, the allocation may comprise classifying the flow rate into one or more flow rate buckets (e.g., low, medium, high, etc.) and then estimating an allocation of the total volumetric flow amongst the one or more fluid outflow locations based on the classification. For instance, the flow rate of the outflowing fluid at the one or more outflow locations may be classified via the methods described in more detail below for the inflowing fluid at one or more fluid inflow locations at blocks 222. In some embodiments, the allocation may comprise a comparison between select ones, groups, and/or combinations of frequency domain features so as to compare the acoustic measurements detected at these locations and then determine, based on this comparison, a relative allocation of the total injected fluid flow therebetween. For instance, generally speaking, an increased fluid flow rate through a fluid outflow location may be expected to increase the acoustic signal intensity (e.g., amplitude) at that fluid outflow location. Thus, a comparison between the intensities (either alone or along with other values, such, frequency domain features) may allow for an estimate of an allocation of the total injected fluid flow out of the wellbore at across the one or more outflow locations at block 214.

Referring still to FIG. 4, as previously described, in some embodiments, following determining the one or more frequency domain features at block 206 or normalizing the one or more frequency domain features at block 208, method 200 may progress to block 218 directly or via block 216. Block 218 comprises identifying at least one of a gas phase inflow, an aqueous phase inflow, or a hydrocarbon liquid phase inflow using the one or more or a plurality of frequency domain features at one or more fluid inflow locations. In some embodiments, method 200 may include identifying the one or more fluid inflow locations at 216 prior to progressing to block 218. As is also shown in FIG. 4, in some embodiments, method 200 may proceed to identifying the one or more fluid inflow locations at 216 without first normalizing the frequency domain features at 218.

The one or more fluid inflow locations at 216 may comprise locations along the wellbore where fluid (e.g., formation fluids) are flowing into the wellbore or a tubular member thereof. For instance, for the wellbore 114 of FIG. 1, the one or more fluid inflow locations may comprise locations where fluid from the formation (e.g., hydrocarbon gas, water, hydrocarbon liquid, etc.) is flowing into the tubular 120.

At block 216, the one or more fluid inflow locations may be determined via other data, knowledge or experience known to those of having ordinary skill. For instance, in some embodiments, the one or more fluid inflow locations may be determined via PLS data at 216. In some embodiments, block 216 may comprise identifying the one or more fluid flow and/or inflow locations using one or more of the frequency domain features to identify acoustic signals corresponding to the inflow, and correlating the depths of those signals with locations within the wellbore. The one or more frequency domain features can comprise at least two different frequency domain features in some embodiments. In some embodiments, the one or more frequency domain features utilized to determine the one or more fluid inflow locations comprises at least one of a spectral centroid, a spectral spread, a spectral roll-off, a spectral skewness, an RMS band energy, a total RMS energy, a spectral flatness, a spectral slope, a spectral kurtosis, a spectral flux, a spectral autocorrelation function, as well as combinations, transformations, and/or normalized variant(s) thereof.

In some embodiments, block 216 of method 200 may comprise: identifying a background fluid flow signature using the acoustic signal; and removing the background fluid flow signature from the acoustic signal prior to identifying the one or more fluid inflow locations. In some embodiments, identifying the one or more fluid inflow locations comprises identifying one or more anomalies in the acoustic signal using the one or more frequency domain features of the plurality of frequency domain features; and selecting the depth intervals of the one or more anomalies as the one or more inflow locations. When a portion of the signal is removed (e.g., a background fluid flow signature, etc.), the removed portion can also be used as part of the event analysis. Thus, in some embodiments, identifying the one or more fluid inflow locations at block 216 comprises: identifying a background fluid flow signature using the acoustic signal; and using the background fluid flow signature from the acoustic signal to identify the one or more fluid inflow locations.

In some embodiments, method 200 may progress to block 218 following block 216 or following blocks 218 and/or 216 as previously described above and shown in FIG. 4. In some embodiments, the one or more frequency domain features utilized at block 218 may comprise frequency domain features described herein including combinations, variants (e.g., a normalized variant), and/or transformations thereof. For instance, in some embodiments, at least two such frequency domain features (and/or combinations, variants, or transformations thereof) are utilized at block 218. In some embodiments, the frequency domain features utilized within block 218 may comprise a ratio between at least two of the plurality of the frequency domain features. Specifically, in some embodiments, the frequency domain features utilized at 218 may comprise a normalized variant of the spectral spread and/or a normalized variant of the spectral centroid.

Referring still to FIG. 4, in some embodiments, block 218 of method 200 may comprise providing the plurality of frequency domain features to a fluid inflow model (e.g., a logistic regression model) at 220 for each of the gas phase, the aqueous phase, and the hydrocarbon liquid phase; and determining that at least one of the gas phase, the aqueous phase, or the hydrocarbon liquid phase is present based on the fluid inflow model. In some embodiments, the fluid inflow model utilized at block 220 may be similar to the fluid outflow model utilized at block 212 and previously described above; however, the fluid inflow model at block 220 may be tuned or constructed to detect the presence of absence of a fluid inflow (e.g., such as a gas phase fluid inflow, an aqueous phase fluid inflow, or a hydrocarbon liquid phase fluid inflow). Thus, the fluid inflow model can be developed using and/or may include machine learning such as a neural network, a Bayesian network, a decision tree, a logistical regression model, or a normalized logistical regression, or other supervised learning models. In some embodiments, the fluid inflow model at 220 may define a relationship between at least two of the plurality of the frequency domain features, including in some embodiments combinations, variations, and/or transformations of the frequency domain features and one or more fluid flows. In some embodiments, block 220 may comprise utilizing a plurality of different models to identify each type of fluid inflow (e.g., gas, aqueous, hydrocarbon liquid, etc.). For instance, block 218 may comprise utilizing a first fluid inflow model to identify a gas phase inflow, a second model to identify an aqueous phase fluid inflow, and a third model to identify a hydrocarbon liquid phase fluid inflow. In some embodiments, one or more of the first, second, and third models may comprise multivariable models. In some of these embodiments, the first, second, and third models may utilize one or more frequency domain features (which may or may not be the same for each of the first, second, and third models) as inputs therein.

In some embodiments, block 218 (e.g., such as block 220) may comprise utilizing the plurality of frequency domain features at the identified one or more fluid inflow locations in the model(s) (e.g., the first, second, third model as described above) and then comparing the plurality of frequency domain features to an output of the model(s); and identifying at least one of the gas phase inflow, the aqueous phase inflow, or the hydrocarbon liquid phase inflow based on the comparison(s).

Referring still to FIG. 4, method 200 may further comprise determining amounts of gas phase inflow, aqueous phase inflow, and hydrocarbon liquid phase inflow at 222. In particular, determining the amounts of the types of fluid flow/inflow (e.g., gas, aqueous, hydrocarbon liquid, etc.) may comprise determining a total fluid inflow rate for the wellbore and then allocating the total fluid inflow rate across the one or more fluid inflow locations. For instance, the total fluid inflow flow rate may be determined via measurement from one or more flow meters or sensors (e.g., similar to that described above for measuring the total injected volumetric flow rate for block 214) that me be separate from the DAS system (e.g., monitoring system 110 in FIG. 1), and then determining (e.g., via one or more of frequency domain features) the relative contributions to the total fluid inflow rate from each of the of the plurality of fluid inflow locations.

In some embodiments, block 222 may comprise classifying the flow rate (e.g., in volume per unit time—such as barrels per day) of each identified fluid inflow type into one of a plurality of predefined flow rate ranges. The predefined flow rate ranges can be determined for each type of flow corresponding to the flow model. For example, a first set of predefined flow rate ranges can be determined for gas inflow, a second set of predefined flow rate ranges can be determined for aqueous inflow, and a third set of predefined flow rate ranges can be determined for hydrocarbon liquid inflow. These various predefined flow rate ranges can then be used with a labeled data set (e.g., frequency domain features sets with known, or labeled, inflow rate that can be derived from test data, known historical data, etc.) to determine models for each of the inflow rate ranges and fluid types.

In some embodiments, the plurality of predefined ranges may comprise a plurality of pre-defined ranges corresponding with low, medium, and high inflow rates for each of the identified fluid inflows. However, in other embodiments, the plurality of pre-defined ranges may correspond with other flow rates (i.e., other than low, medium, and high). In some embodiments, the predefined flow rate ranges may be selected to indicate (e.g., to personnel monitoring production from the well) whether certain production conditions or parameters are being met. In some embodiments, the predefined flow rate ranges may be selected so as to indicate (again to suitable personnel or other machine implemented monitoring applications) that desired and/or problematic production conditions (e.g., with respect to production amounts of the identified fluids) are present. Thus, in some embodiments, the predefined flow rate ranges may have different magnitudes, scopes, boundaries, etc. In some embodiments, at least some of the predefined inflow rate ranges may have an equal scope or magnitude. In some embodiments, the predefined flow rate ranges may not include a zero-flow condition such that the predefined flow rate ranges may include and be bounded by values that are greater than zero. The size, scope, magnitude, and number of predefined flow rate ranges may be selected and varied in some embodiments due to the specific parameters of the wellbore in question (e.g., wellbore 114 in FIG. 1), and/or the desired flow rate conditions that are being monitored for the wellbore in question.

The flow rate models can be developed using and/or may include machine learning such as a neural network, a Bayesian network, a decision tree, a logistical regression model, or a normalized logistical regression, or other supervised learning models with known labeled data sets. In some embodiments, the flow rate models may each define a relationship between at least two of the plurality of the frequency domain features, including in some embodiments combinations, variations, and/or transformations of the frequency domain features and a flow rate for a specific fluid type. A plurality of models can then be developed for each fluid type that corresponds to each flow rate range in the predefined flow rate ranges for that fluid type. The flow rate models may each utilize one or more (e.g., at least two) of the frequency domain features as inputs, which may or may not be the same for each of the models within a fluid type or for the models across different fluid flow types.

In some embodiments, block 222 may comprise using one more (e.g., a plurality of) the frequency domain features described above to classify the flow rate of the fluids inflows identified at block 218. Specifically, in some embodiments, one or more of the flow rate models, utilizing one or more frequency domain features as inputs, may be used at block 222 to classify the flow rate of each identified fluid flow/inflow into the predefined ranges. For instance, as is similarly described above for block 218 (including block 220), block 222 may comprise utilizing a separate, different model (or a plurality of separate models) for classifying the flow rate of each identified fluid inflow. Thus, a first flow rate model (or a plurality of first flow rate models) may be used to classify the flow rate of an identified gas inflow, a second flow rate model (or a plurality of second flow rate models) may be utilized to classify the flow rate of an identified aqueous inflow, and a third flow rate model (or a plurality of third flow rate models) may be utilized to classify the flow rate of an identified hydrocarbon inflow. Each of the first, second, and third flow rate models at block 222 may use one or more, such as at least two (or a plurality of) the above described frequency domain features (including as previously described, combinations, transformations, and/or variants thereof) as inputs. The frequency domain features used in each of the first, second, and third models at block 222 may be the same or different. Additionally, as will be described in more detail below, the flow rate model(s) used to classify the fluid flow rate(s) at block 222 may be derived via machine learning, such as, for instance a supervised machine learning process whereby known experiment data is utilized to construct and/or refine the model(s).

In addition, in some embodiments, each of the first, second, and third flow rate models described above may include a plurality of flow rate models—each to determine whether the flow rate of the particular fluid in question falls within a plurality of predetermined flow rate ranges. Thus, the first flow rate model may comprise a plurality of first flow rate models where each of the first flow rate models may determine whether the flow rate of the gas inflow is within a corresponding one of the plurality of predefined flow rate ranges, based on a selected plurality of frequency domain features (which may be the same or different for the plurality of first models). Likewise, the same may be true for the second and third flow rate models, such that the second flow rate model and third flow rate model may comprise a plurality of second flow rate models and a plurality of third flow rate models, respectively, for determining whether the flow rate of the aqueous inflow and hydrocarbon liquid inflow, respectively, fall within a plurality of predetermined flow rate ranges.

In some embodiments, the flow rate model(s) used to classify the flow rates of the identified fluid inflows at block 222 may define decision boundaries using two or more frequency domain features. Each decision boundary may determine whether a type of identified fluid inflow (e.g., gas, aqueous, hydrocarbon liquid, etc.) has a flow rate that is within a particular flow rate range. Thus, in embodiments where there are two flow rate ranges for each identified fluid inflow, the flow rate model(s) may construct two decision boundaries for each identified fluid flow/inflow—one for determining whether a particular type of fluid has a flow rate in a first flow rate range, and a second for determining the particular type of fluid has a flow rate in a second flow rate range, where the first flow rate range is different from the second flow rate range (e.g., higher, lower, etc.).

Each decision boundary may be based on two or more selected frequency domain features. For instance, in some embodiments a flow rate model utilized at block 222 may mathematically define a decision boundary as a line in two dimensional space where the axes of the two dimensional space are defined by two selected frequency domain features. In other embodiments, a flow rate model utilized at block 222 may construct or define a decision boundary as a three-dimensional surface where the axes of the three dimensional space are defined by three selected frequency domain features. Regardless of the number of frequency domain features utilized by the models at block 222, when points are plotted in the dimensional space defined by the selected frequency domain features (e.g., a 2, 3, 4, 5, . . . N dimensional space determined by the number of selected frequency domain features), the position of plotted points in the dimensional space (e.g., plotted points of the selected frequency domain features) with respect to the decision boundary may determine whether a type of fluid does or does not have a flow rate within a particular flow rate range. The frequency domain features selected to construct the decision boundaries associated with the predetermined flow rate ranges for a particular type of identified fluid may be the same or different. In some embodiments, one or more of the axes of the dimensional space containing a particular decision boundary may comprise a combination, variation, and/or transformation of a frequency domain feature as previously described above.

The classification at block 222 of the flow rates for the inflow of the fluids identified at block 600 may be carried out for flow rates over a predetermined period of time (e.g., a period of second, minutes, hours, days, weeks, months, etc.). The predetermined period of time may comprise the entire producing life of the well (e.g., such as wellbore 114 in FIG. 1) or some period that is less than the entire working life of the well. Specifically, the period of time associated with the acoustic signal at block 202, and thus the period of time associated with the selected frequency domain features from block 206 may define the period of time over which the flow rates of the identified fluid types may be classified at block 222.

In some embodiments, for a given time period the classified flow rate of a given fluid (e.g., gas, aqueous, hydrocarbon liquid) may fluctuate between multiple predetermined flow rate ranges. In these embodiments, the model(s) may present a dominant flow rate range as the flow rate for the given fluid over the designated period of time. As used herein, the dominant flow rate range over a given period of time may represent the flow rate range that the given fluid most often was classified into during the given period of time. As one specific example, a given fluid may be classified into a first flow rate range for a first portion of a given period of time, and is classified into a second flow rate range for a second portion of the given period of time. If the first portion is greater than the second portion, the first flow rate range may be determined to be the dominant flow rate range over the entire given period of time.

In addition, the classification at block 222 of the flow rates for the inflow of the fluids identified at block 218 may be carried out for flow rates over an entire depth of a wellbore (e.g., wellbore 114 in FIG. 2) or at one or more discrete depths or depth ranges within the wellbore. Specifically, the classification at block 32 may classify different flow rates at different depths (or depth ranges) within a wellbore by analyzing the frequency domain features (e.g., within the one or models as described above) associated with the different depths (or depth ranges). Accordingly, via the classification at block 32, one may determine an overall flow rate range for a particular fluid type (e.g., gas, aqueous, hydrocarbon liquid, etc.) over an entire depth of a given wellbore, and/or may classify flow rates for a particular fluid type at a plurality of different depths (or depth ranges) within the given wellbore.

In some embodiments, the model(s) at blocks 210, 212, 218, 220, 222 of method 200 can be developed using machine learning. In order to develop and validate the model, data having known fluid flows (including fluid type, flow rate, and inflow location) and acoustic signals can be used as the basis for training and/or developing the model parameters. This data set can be referred to as a labeled data set (e.g., a data set for which the flow regime, outflow or inflow location, and/or flow rates is already known) that can be used for training the models in some instances. In some embodiments, the known data can be data from a wellbore having flow characteristics measured by various methods. In some embodiments, the data can be obtained using a test setup where known quantities of various fluids (e.g., gas, hydrocarbon liquids, aqueous liquids, etc.) can be introduced or emitted at one or more controlled points to generate controlled fluid flows, outflows, and/or inflows. At least a portion of the data can be used to develop the model, and optionally, a portion of the data can be used to test the model once it is developed.

Figure 5:
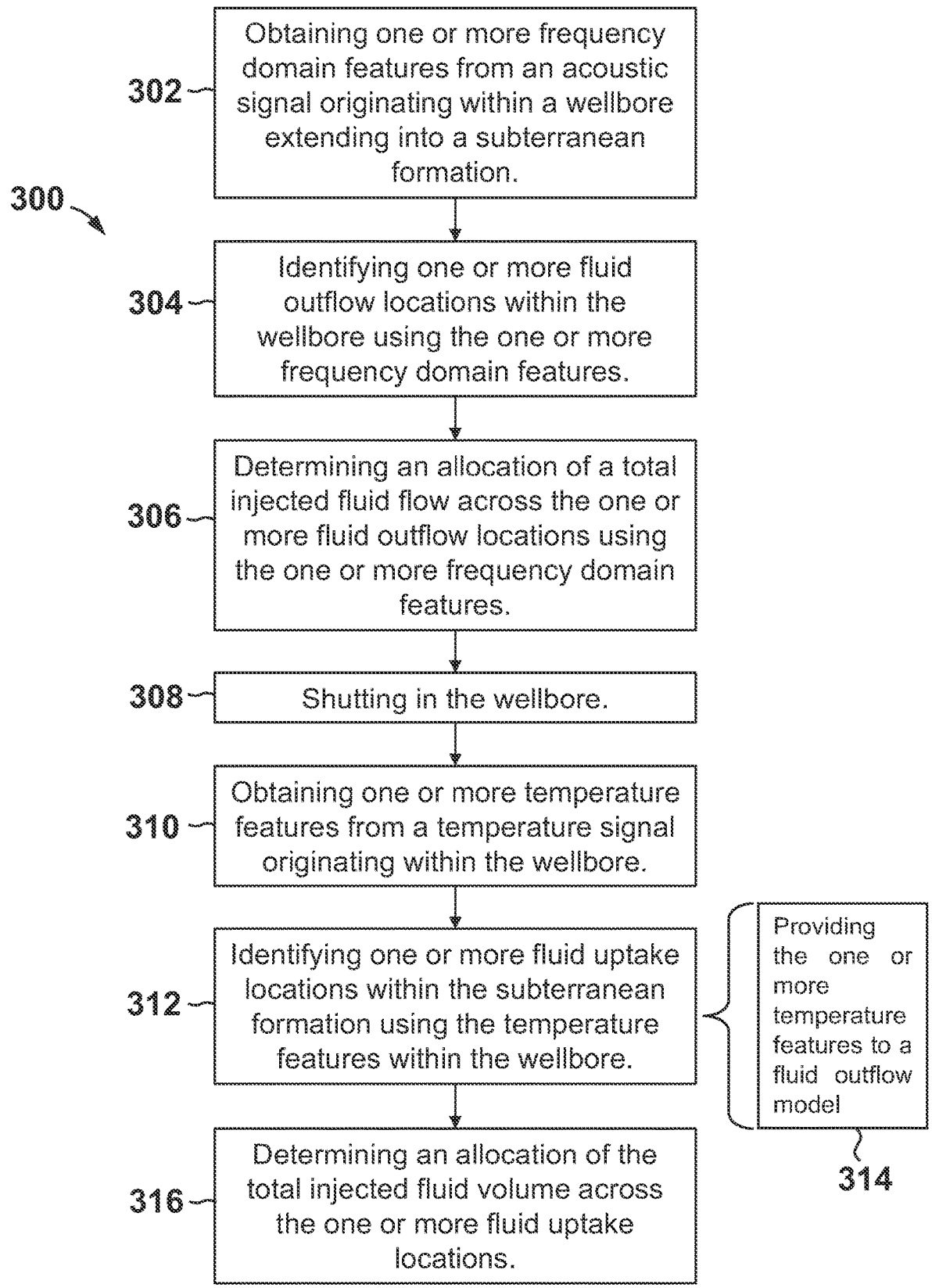
FIG. 5 is a flow diagram of a method of characterizing a fluid flow outflow from a wellbore and into a subterranean formation according to some embodiments.

Referring now to FIG. 5, a flow chart of a method 300 of characterizing a fluid outflow from a wellbore and into a surrounding subterranean formation according to some embodiments of this disclosure is shown. Generally speaking, method 300 may be utilized to characterize fluid flowing out of a wellbore and into the surrounding formation using one or more frequency domain features obtained from an acoustic signal originating within the wellbore and one or more temperature features obtained from a temperature signal originating within the wellbore. As described in more detail below, the acoustic and temperature signals may provide a well operator with valuable information regarding the fluid flows out of the wellbore and into the formation, which may be useful during certain wellbore operations (e.g., such as an injection operation).

Initially, method 300 includes obtaining one or more frequency domain features from an acoustic signal originating within a wellbore extending into a subterranean formation at block 302, identifying one or more fluid outflow locations within the wellbore using the one or more frequency domain features at block 304, and determining an allocation of a total injected fluid flow across the one or more fluid outflow locations using the one or more frequency domain features at block 306. For instance, in some embodiments, blocks 302, 304, 306 may comprise the same steps and features discussed above for blocks 202, 206, 210, 212, and 214 of method 200 (and may possibly include the additional steps of blocks 204, 208 as previously described above). As a result, a detailed description of these features is not repeated herein for blocks 302, 304, 306 of method 300 so as to simplify the description and promote conciseness and brevity. Therefore, the one or more fluid outflow locations may be identified at block 304 and allocation of the total injected volume among the one or more fluid outflow locations may be determined via one or more fluid models (e.g., fluid outflow models) that utilize one or more of the frequency domain features of the acoustic signal as inputs in the manner described.

In addition, in some embodiments, method 300 includes shutting in the wellbore at 308. Shutting in the wellbore (e.g., wellbore 114) may occur immediately after block 306 or may occur after receiving the acoustic signal from block 302. Thus, the precise timing of shutting the wellbore 114 may be greatly varied in different embodiments. In some embodiments, shutting in the wellbore at block 308 may comprise stopping flow out of or into the wellbore 114, and may involve closing one or more valves or other fluid control devices within or coupled to the wellbore (e.g., such as coupled to the tubular 120 in the wellbore 114 of FIG. 1). Following shutting in the wellbore at block 308, fluid flow into or out of the wellbore at the surface are prevented; however, it may be possible that fluid may continue to migrate between the formation and wellbore (e.g., such as between formation 102 and the wellbore 114, particularly tubular 120 for the wellbore 114 of FIG. 1) after the wellbore is shut in at block 308.

Next, method 300 includes obtaining one or more temperature features from a temperature signal originating within the wellbore at block 310. The temperature features may be determined from using a distributed temperature sensing signal within the wellbore. For example, the temperature features can be determined using the monitoring system 110 shown in FIG. 1 and described above (or the monitoring systems 110A, 110B in FIG. 3) to obtain temperature measurements along the monitored length (e.g., a monitored length along the optical fiber 162, such as along a length of the wellbore 114). In some embodiments, a monitoring system 110 can be used to receive distributed temperature measurement signals from a sensor disposed along the length (e.g., of a wellbore 114), such as optical fiber 162 (see e.g., FIG. 1 and the associated description above). The resulting signals from the monitoring system 110 can be used to determine one or more temperature features as described herein. In some embodiments, a baseline or background temperature profile can be used to determine the temperature features, and the baseline temperature profile can be obtained prior to obtaining the temperature measurements. In some embodiments, the temperature signal (from which the one or more temperature features are obtained) at block 310 may be obtained after the wellbore is shut in at block 308. In some embodiments, a plurality of temperature features can be determined from the temperature measurements, and the plurality of temperature features can comprise one or more (e.g., a plurality of) any of the temperature features previously described above including combinations, variants (e.g., a normalized variant), and/or transformations thereof.

In some embodiments, the temperature signal may be obtained after shutting in the wellbore at block 308 as generally indicated in FIG. 5. Thus, the temperature signal may be collected at a time when fluid is not flowing into or out of the wellbore from the surface (i.e., no fluid is being injected into the wellbore from the surface or produced from the wellbore at the surface).

Once the temperature features are obtained, method 300 includes identifying one or more fluid uptake locations within the subterranean formation using the temperature features within the wellbore at 312. The uptake locations can generally include areas in the near wellbore region, including the area surrounding the wellbore such that a temperature differential within the near wellbore region can be detected through conduction or convective flow of fluids in to the wellbore. Referring briefly again to FIG. 1, and as generally described above, a fluid uptake location within the subterranean formation 102 may comprise a zone or area (e.g., zones 104a, 104b) within formation 102 that may receive fluid that is output from the wellbore 114 (e.g., from tubular 120). For instance, as previously described above for the wellbore 114 of FIG. 1, fluid that is injected into wellbore 114 may be emitted from tubular 120 into annulus 119, which may be separated into a plurality of intervals via the zonal isolation devices 117 (e.g., packers). Thus, the fluid uptake locations within formation 102 may be the ultimate point or location where the fluid entering the annulus 119 is flowing into the formation 102 itself. In some embodiments, the fluid uptake locations may comprise the (or a portion of) the production zones 104a, 104b, including those within the near wellbore region. In some embodiments, the fluid uptake locations may comprise perforations or fractures in the wall of the wellbore 114 (e.g., such as perforations or fractures formed by a previous perforating or hydraulic fracturing operation within the wellbore 114).

Without being limited to this or any other theory, injected fluid that has flowed into the formation may begin to have a pronounced effect on the temperature of the formation and wellbore, particularly at the locations or depths within the wellbore where fluid was flowed into the formation (e.g., at the one or more fluid uptake locations within the near wellbore region). For instance, referring briefly again to the wellbore 114 of FIG. 1, the ambient temperature of the wellbore 114 and formation 102 may be generally higher than at the surface—especially for locations deep within the wellbore (e.g., such as at production zones 104a, 104b). As a result, an injected fluid into the wellbore 114 may be at a generally lower temperature than both the wellbore 114 and formation 102. As the fluid flows through the tubular 120 and into the formation 102 at the one or more uptake locations, the temperature of the wellbore 114 and formation immediately surrounding the wellbore 114 in the near wellbore region (e.g., at least at and around the one or more uptake locations) may cool. These changes in temperature can then be used (e.g., as described herein) to determine where the one or more fluid uptake locations are located and possibly how much fluid is entering the formation (e.g., as a total volume, flow rate, etc.) at the one or more uptake locations.

As previously described, a distributed acoustic signal (e.g., such may be obtained from a DAS system) may provide an indication of fluid outflow via the vibrations and acoustic sounds resulting from the flow of fluid out of a tubular. However, in some instances, these measurements do not provide much information with respect to how the fluid is then flowing into a formation (e.g., formation 102). Because the injection of fluid into the formation 102 may have an effect on the temperature profile within the wellbore 114 as previously described, the additional distributed temperature signal provided by a DTS system (e.g., monitoring system 110) may provide additional insight as to the ultimate uptake of the fluid into the formation 102 following the exit of the fluid from the tubular member of the wellbore 114 (e.g., from tubular member 120).

Thus, referring again to FIG. 5, in some embodiments, determining the one or more fluid uptake locations may comprise providing the one or more temperature features as inputs to a fluid outflow model at block 314. In general, the temperature features are representative of features at a particular location (e.g., a depth resolution portion of the optical fiber along a length (e.g., a length of the wellbore)) along the wellbore 114. The fluid outflow model at block 314 can comprise one or more models configured to accept the temperature features as input(s) and provide an indication of whether or not a fluid is flowing into the formation at the particular location along the length of the optical fiber 162 and/or wellbore 114. The output of the fluid outflow model at block 314 can be in the form of a binary yes/no result, and/or a likelihood of an event (e.g., a percentage likelihood, etc.). Other outputs providing an indication of a fluid uptake location are also possible. In some embodiments, the fluid model can comprise a multivariate model, a machine learning model using supervised or unsupervised learning algorithms, or the like. Thus, the fluid outflow model at block 314 may be similar to the fluid outflow model utilized at block 304 (and/or block 212 of method 200), except that the fluid outflow model of block 314 may utilize the one or more temperature features as inputs rather than one or more frequency domain features.

More specifically, the fluid outflow model at block 314 may, in some embodiments, comprise a multivariate model or a plurality of multivariate models. A multivariate model allows for the use of a plurality of variables in a model to determine or predict an outcome. A multivariate model can be developed using known data for a fluid uptake into the formation along with temperature features therefor to develop a relationship between the temperature features and the occurrence of fluid uptake at the locations within the available data. One or more multivariate models can be developed using data, where each multivariate model uses a plurality of temperature features as inputs to determine the likelihood of fluid uptake occurring at the particular location along the length of the wellbore and/or optical fiber (e.g., optical fiber 162).

The multivariate model(s) of block 314 can use multivariate equations, and the multivariate model equations can use the temperature features or combinations or transformations thereof to determine when fluid uptake is (or is not) occurring. The multivariate model(s) can define thresholds, decision points, and/or decision boundaries having any type of shapes such as a point, line, surface, or envelope between the presence and absence of fluid uptake. In some embodiments, the multivariate model can be in the form of a polynomial, though other representations are also possible. The model can include coefficients that can be calibrated based on known data. While there can be variability or uncertainty in the resulting values used in the model, the uncertainty can be taken into account in the output of the model. Once calibrated or tuned, the model can then be used with the corresponding temperature features to provide an output that is indicative of the occurrence (or lack of occurrence) of a fluid uptake into the formation (e.g., formation 102) at one or more locations.

The multivariate model is not limited to two dimensions (e.g., two temperature features or two variables representing transformed values from two or more temperature features), and rather can have any number of variables or dimensions in defining the threshold between the presence or absence of fluid uptake within the formation. When used, the detected values can be used in the multivariate model, and the calculated value can be compared to the model values. In some embodiments, the output of the multivariate model(s) can be based on a value from the model(s) relative to a normal distribution for the model(s). Thus, the model can represent a distribution or envelope and the resulting temperature features can be used to define where the output of the model lies along the distribution at the location in the wellbore. Thus, each multivariate model can, in some embodiments, represent a specific determination between the presence of absence of fluid uptake at a specific location along a length of the wellbore.

In some embodiments, the fluid outflow model of block 314 can also comprise other types of models. In some embodiments, a machine learning approach comprises a logistic regression model. In some such embodiments, one or more temperature features can be used to determine if fluid uptake into the formation 102 is occurring at one or more locations of interest. The machine learning approach can rely on a training data set that can be obtained from a test set-up (e.g., a flow loop) or obtained based on actual temperature data from known fluid uptake events. The one or more temperature features in the training data set can then be used to train the model using machine learning, including any supervised or unsupervised learning approach. For example, the fluid model can be a neural network, a Bayesian network, a decision tree, a logistical regression model, a normalized logistical regression model, or the like. In some embodiments, the fluid outflow model of block 314 can comprise a model developed using unsupervised learning techniques such a k-means clustering and the like.

Method 300 also includes determining an allocation of the total injected fluid volume across the one or more fluid uptake locations at block 316. As previously described, the one or more temperature features obtained from the temperature signal at block 310 may be utilized to identify one or more fluid uptake locations within a subterranean formation at block 312. Additionally, the one or more temperature features can also be utilized to determine how much of a total injected fluid volume was flowed into the formation at each of the identified fluid uptake locations at block 316. For instance, referring again to the wellbore 114 in FIG. 1, the temperature of the injected fluid may be less than (or at least different) than the formation 102 and wellbore 114—especially at depths typically associated with hydrocarbon production. Thus, upon injecting the fluid through the wellbore 114 (particularly tubular 120) and into formation 102, the temperature within the wellbore 114 and the portions of formation 102 surrounding wellbore 114 may cool. Once the fluid injection is stopped, the ambient temperature within the formation 102 will begin to again increase the temperature within the wellbore 114 back to ambient conditions. However, if a portion of the formation 102 receives the injected fluid (e.g., at one or more of the fluid uptake locations), the temperature rise of that portion of the formation 102 as well as the section or depth interval within the wellbore 114 corresponding to this portion of the formation 102 may see a more gradual or slower increase in temperature over time as compared to other portions of the formation 102 (and the corresponding sections or depth intervals within the wellbore 114 through these other portions) that did not receive any or a less significant portion of the injected fluid. Accordingly, referring back to FIG. 5, by capturing the temperature signal after shutting in the wellbore at block 308, the temperature features may provide an indication (after appropriate analysis within one or more fluid flow models) of not only where the injected fluid entered the formation along the length of the wellbore (e.g., so as to identify the one or more fluid uptake locations), but also of how much (in a relative sense) of the injected fluid was flowed into the identified fluid uptake locations.

Accordingly, in some embodiments, the one or more temperature features may be input into a fluid flow model at block 316 (e.g., which may comprise another multivariate model or plurality of multivariate models as described above for blocks 312, 314) so as to provide an indication of the amount of fluid that may have been received at each uptake location at block 316. In some embodiments, the amount of fluid determined by the fluid flow model at block 316 may comprise an allocation (e.g., percentage, fraction, etc.) of a known total injected volume into the wellbore 114 across each of the identified one or more fluid uptake locations. The total injected fluid volume may be determined in any of the manners previously described above for block 214 of method 200 in FIG. 4. Because the well may be shut in at block 308 following the injection of fluid, the total injected fluid volume may be a static, total volume of fluid that was previously injected before the well was shut in. In some embodiments, the one or more temperature features used at block 316 may provide an indication of a temperature change over time along the length of the wellbore 114, and the temperature change may be utilized (e.g., via the fluid model) to determine an allocation of the total injection fluid volume amongst the fluid uptake locations within the formation.

In some embodiments, the fluid models in blocks 314 and 316 may comprise separate models utilizing separate inputs (e.g., different selections and/or combinations of the one or more temperature features) and providing separate outputs. In some embodiments, the fluid models in blocks 314 and 316 may comprise a combined model that provides both an identification of the one or more fluid uptake locations and an allocation of the total injected fluid volume amongst the identified fluid uptake locations.

Figure 6:
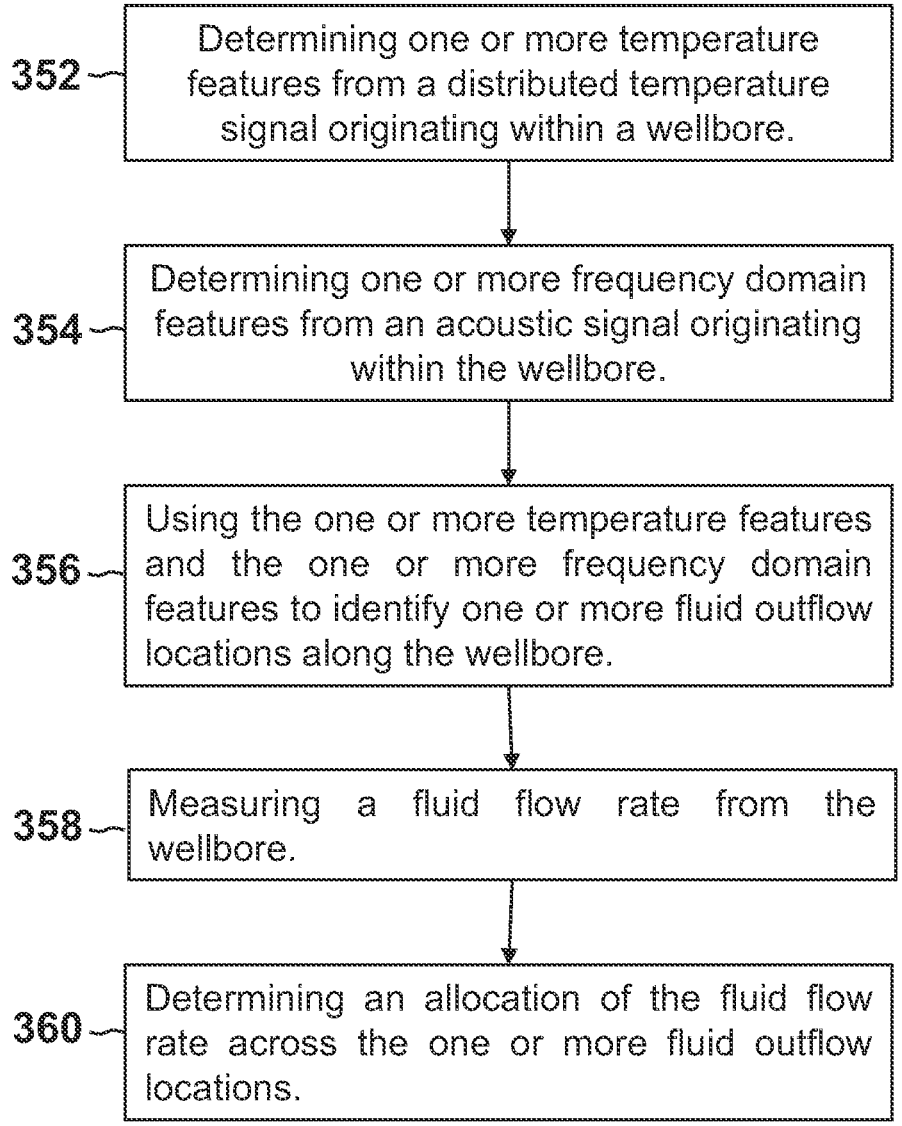
FIG. 6 is a flow diagram of a method of characterizing a fluid outflow from a wellbore based on an acoustic signal and a temperature signal within the wellbore according to some embodiments.

Referring now to FIG. 6, a flow chart of a method 350 of characterizing a fluid outflow from a wellbore according to some embodiments is shown. Generally speaking, method 350 comprises characterizing a fluid outflow from the wellbore using both an acoustic signal and a temperature signal originating within the wellbore. Without being limited to this or any other theory, by characterizing the fluid outflows from a wellbore using both an acoustic signal and a temperature signal, more accurate conclusions may be drawn so as to further enhance a well operator's ability to manage downhole operations within the wellbore.

Specifically, method 350 may comprise determining one or more temperature features from a distributed temperature signal originating within the wellbore at block 352, and determining one or more frequency domain features from an acoustic signal originating within the wellbore at block 354. The temperature features can be determined at 352 using any of the processes and systems as described herein (see e.g., block 310 of method 300 in FIG. 5). In some embodiments, a DTS system (e.g., monitoring system 110 in FIG. 1) can be used to obtain distributed temperature sensing signal within the wellbore. The DTS system can provide distributed temperature measurements within the wellbore over time. A baseline temperature can be stored for the wellbore as described herein and used along with the temperature measurements to determine the temperature features. The temperature features can include any of those described herein including a depth derivative of temperature with respect to depth, a temperature excursion measurement, a baseline temperature excursion, a peak-to-peak value, a statistical measure of a variation with respect to time and/or distance, or a combination thereof.

Similarly, the frequency domain features can be determined using any of the processes and systems as described herein (see e.g., block 206 of method 200 in FIG. 4). In some embodiments, a DAS system (e.g., monitoring system 110 in FIG. 1) can be used to obtain a distributed acoustic signal within the wellbore. The acoustic signals obtained from the DAS system can then be processed to determine one or more frequency domain features as described herein. In some embodiments, the frequency domain features can comprise at least one of: a spectral centroid, a spectral spread, a spectral roll-off, a spectral skewness, an RMS band energy, a total RMS energy, a spectral flatness, a spectral slope, a spectral kurtosis, a spectral flux, a spectral autocorrelation function, or any combination thereof, including combinations and modifications thereof.

Next, method 350 includes using the one or more temperature features and the one or more frequency domain features to identify one or more fluid outflow locations along the wellbore at block 356. For instance the temperature features and the frequency domain features can be inputted into one or more fluid outflow models that may then identify the presence or absence of fluid outflow at one or more locations along the length of the wellbore (e.g., wellbore 114). The fluid model(s) may be similar to any of the other fluid models discussed herein (see e.g., blocks 212, 220 in FIG. 4, block 314 in FIG. 5, etc.), and thus, may comprise one or more multivariate models that utilize the one or more temperature features and/or the one or more frequency domain features to identify the one or more fluid outflow locations from the wellbore (e.g., locations where the fluid is flowing out of tubular 120 into annulus 119 as previously described for FIG. 1).

In some embodiments, the one or more temperature features and the one or more frequency domain features may be inputted together into a single model or set of models making up the fluid outflow model. In some embodiments, the one or more temperature features may be inputted into a first model (or group of first models), the one or more frequency domain features may be inputted in a second model (or group of second models), and the outputs of the first model(s) and the second model(s) may be combined to form a final output identifying the one or more fluid outflow locations within wellbore. Any suitable functions can be used to combine the outputs of the first model(s) and the second model(s). This can include formulas, products, averages, and the like, each of which can comprise one or more constants or weightings to provide the final output. The ability to determine the fluid outflow locations as a function of the output of both models can allow for either model (or group of models) to override the output of the other model (or group of models). For example, if the one model indicates that a location along the wellbore comprises a fluid outflow location, but the other model indicates no fluid outflow, the resulting combined output may be considered to indicate that there is no fluid outflow at that location. Thus, the use of the hybrid model approach can provide two separate ways to verify and determine the fluid outflow locations from the wellbore.

In some embodiments, the preprocessing of the temperature or acoustic signals may occur before determining the one or more temperature features and/or the one or more frequency domain features. For instance, in some embodiments, similar preprocessing steps may be carried out as previously described above for block 204 in method 200 in FIG. 4. In addition, in some embodiments, the one or more temperature features and the one or more frequency domain features may be normalized prior to identifying the one or more fluid outflow locations at block 356. For instance, in some embodiments, similar normalization step(s) may be carried out as previously described above for block 208 of method 200 in FIG. 4.

In some embodiments, method 350 may also include measuring a fluid flow rate from the wellbore at block 358 and determining an allocation of the fluid flow rate across the one or more fluid out flow locations at block 360. The fluid flow rate may be measured via any of the methods previously described above (e.g., see e.g., block 214 in method 200 of FIG. 4). For instance, the fluid inflow rates can be refined by using a measure of the fluid flow rate from the wellbore as measured at logging tool above the producing zones, a wellhead, surface flow line, or the like.

In addition, allocating the fluid flow rate across the one or more fluid flow locations may comprise inputting the one or more temperature features and/or the one or more frequency domain features to a fluid outflow model, which may comprise the same or a different fluid model as described above for block 356. In some embodiments, block 360 may comprising determining the allocation or amounts in any one or more of the manners described above for blocks 214, 222 of method 200 in FIG. 4. If a fluid flow model is utilized to determine the allocation at block 360, the fluid flow model (or group of models) may be derived and used in a similar fashion to the other fluid models described herein (see e.g., block 356).

Figure 7:
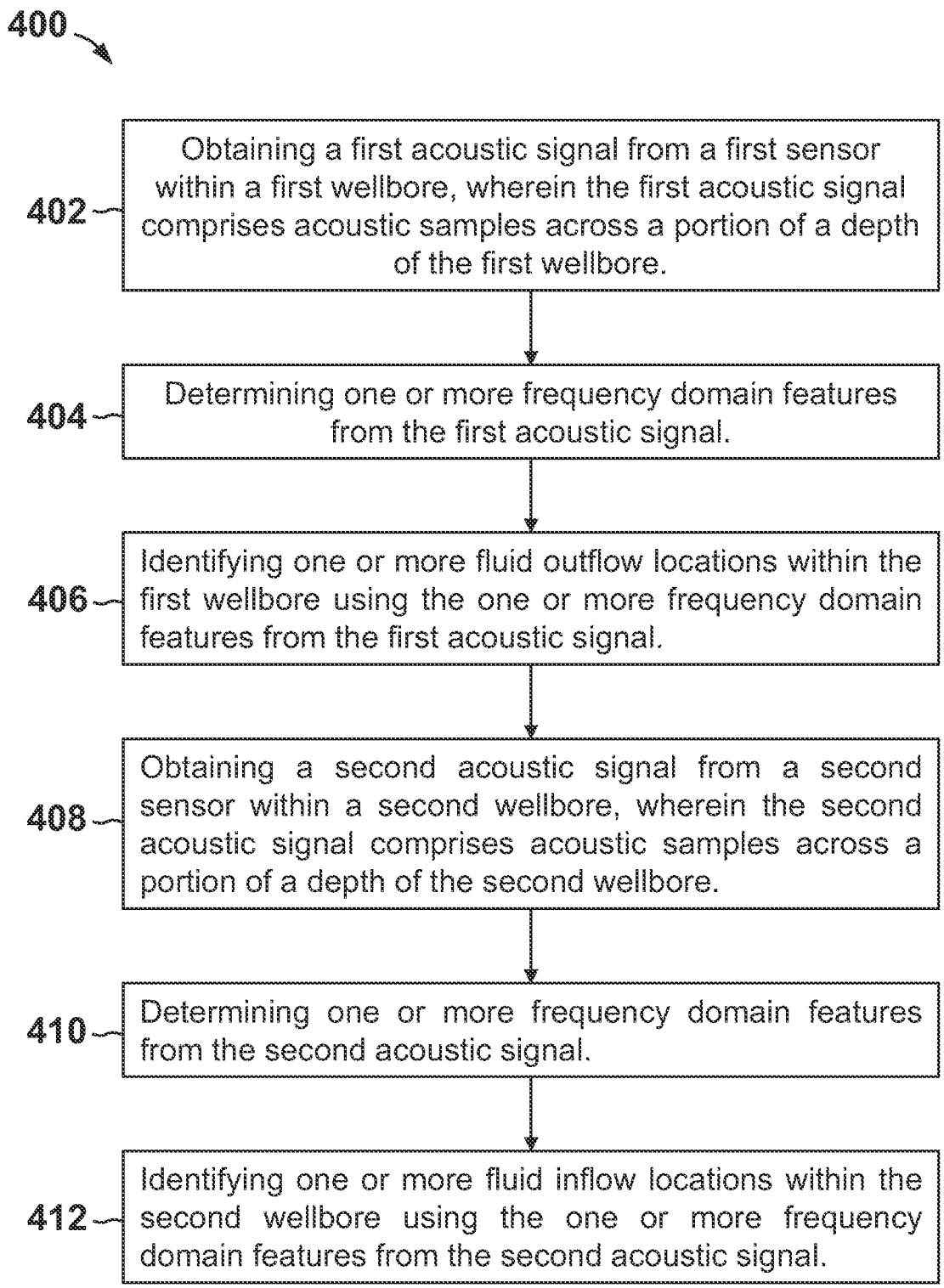
FIG. 7 is a flow diagram of a method of characterizing fluid flows of a fluid injection operation between a pair of wellbores extending within a subterranean formation according to some embodiments.

Referring now to FIG. 7, a method 400 of characterizing the fluids flows of a fluid injection operation between a pair of wellbores extending within a subterranean formation (e.g., formation 102) is shown. Generally speaking, method 400 may be performed so as to characterize one or more of the fluid flows into, through, and/or out of a subterranean formation during a fluid injection operation. In some aspects, the fluid flow characterization can be used to help to improve the injection and production of the wellbore and/or improve a reservoir model used to help to control injection and production within the reservoir. For instance, referring briefly again tot FIG. 3, a fluid may be injected into formation 102 via a first wellbore 114A, which then results in fluid (e.g., injected fluid, formation fluid, both, etc.) being produced into the second wellbore 114B. As will be described in more detail below, the embodiments of method 400 may be performed so as to identify and/or characterize the various fluid outflows from the first wellbore 114A, the fluid flow from the wellbore 114 into the formation 102, and the fluid inflows into the second wellbore 1146, etc.

Initially, method 400 includes obtaining a first acoustic signal from a first sensor within a first wellbore, wherein the first acoustic signal comprises acoustic samples across a portion of a depth of the first wellbore at block 402. In addition, method 400 includes determining one or more frequency domain features from the first acoustic signal at block 404, and identifying one or more fluid outflow locations within the first wellbore using the one or more frequency domain features from the first acoustic signal at block 406.

The first acoustic signal obtained at block 402 may be obtained via a suitable monitoring system, such, for instance, monitoring system 110 in FIG. 1 and/or one of the monitoring systems 110A, 110B in FIG. 3 as previously described above. For instance, the monitoring system (e.g., monitoring systems 110, 110A, 110B, etc.) may comprise an optical fiber (e.g., optical fiber 162, 162A, 162B, etc.) disposed within the wellbore and configured to measure or detect the first acoustic signal. Obtaining the first acoustic signal at block 402 may thus be similar to the steps and features of block 202 in method 200 previously described above.

Determining the one or more frequency domain features at block 404 and identifying the one or more fluid outflow locations within the first wellbore using the one or more frequency domain features at block 406 may comprise similar steps and features as described above for blocks 206 and 210 of method 200 in FIG. 4. Thus, these features are not repeated herein in the interests of brevity. However, it should be appreciated, as a result, that the one or more frequency domain features of the first acoustic signal may be inputted into a fluid outflow model (which may comprise one or a plurality of multivariate models as previously described) that then may provide an indication of the presence or absence of the one or more fluid outflow locations within the first wellbore at a particular depth(s) or range(s) of depths.

In addition, in some embodiments method 400 may also include preprocessing the first acoustic signal and/or normalizing the one or more frequency domain features of the first acoustic signal in a similar manner to that described above for blocks 205 and 208 of method 200 in FIG. 4. Further, in some embodiments, method 400 may also comprise shutting in the wellbore, obtaining a temperature signal (e.g., via a monitoring system 110, 110A, 110B, etc. as previously described), after shutting in the wellbore, and identifying one or more fluid uptake locations within the formation (e.g., formation 102) surrounding the first wellbore in a similar manner to that described above for blocks 308-316 of method 300 in FIG. 5. Still further, in some embodiments, method 400 may also comprise determining an allocation of a total injected fluid flow across the one more fluid outflow locations within the first wellbore in a similar manner that that described above for block 214 of method 200 in FIG. 4, and/or determining an allocation of a total injected fluid volume across the one or more fluid uptake locations within the formation (e.g., formation 102) in a similar manner to that described above for block 316 of method 300 in FIG. 5.

Referring still to FIG. 7, method 400 next includes obtaining a second acoustic signal from a second sensor within a second wellbore, wherein the second acoustic signal comprises acoustic samples across a portion of a depth of the second wellbore at block 408. In addition, method 400 includes determining one or more frequency domain features from the second acoustic signal at block 410. Further, method 400 includes identifying one or more fluid inflow locations within the second wellbore using the one or more frequency domain features from the second acoustic signal at block 412.

The second acoustic signal obtained at block 408 may be obtained via a suitable monitoring system, such, for instance, monitoring system 110 in FIG. 1 and/or one of the monitoring systems 110A, 110B in FIG. 3 as previously described above. For instance, the monitoring system (e.g., monitoring systems 110, 110A, 110B, etc.) may comprise an optical fiber (e.g., optical fiber 162, 162A, 162B, etc.) disposed within the second wellbore and configured to measure or detect the first acoustic signal. Obtaining the first acoustic signal at block 402 may thus be similar to the steps and features of block 202 in method 200 previously described above.

Determining the one or more frequency domain features at block 408 and identifying the one or more fluid inflow locations within the first wellbore using the one or more frequency domain features at block 410 may comprise similar steps and features as described above for blocks 206 and 218 of method 200 in FIG. 4. Thus, these features are not repeated herein in the interests of brevity. However, it should be appreciated, as a result, that the one or more frequency domain features of the second acoustic signal may be inputted into a fluid inflow model (which may comprise one or a plurality of multivariate models as previously described) that then may provide an indication of the presence or absence of the one or more fluid inflow locations within the first wellbore at a given depth or ranges of depths. In addition, as previously described above for block 218 of method 200, identifying the one or more fluid inflow locations at block 412 may comprise identifying at least one of a gas phase inflow, an aqueous phase inflow, or a hydrocarbon liquid phrase inflow at the one or more fluid inflow locations in the manner previously described above.

In addition, in some embodiments method 400 may also include preprocessing the second acoustic signal and/or normalizing the one or more frequency domain features of the second acoustic signal in a similar manner to that described above for blocks 205 and 208 of method 200 in FIG. 4. In addition, in some embodiments, method 400 may comprise determining amounts of fluid inflow (e.g., flow rates, total fluid amounts, etc.) at the one or more fluid inflow locations. In some embodiments, this may involve determining amounts of the one or more of the gas phase inflow, aqueous phase inflow, and the hydrocarbon liquid phase inflow in the manners previously described above for block 222 of method 200 in FIG. 4.

Once the outflow and inflow locations are determined as described herein, the information can be used in a number of ways. In some aspects, the outflow and inflow locations can be used to improve or adjust the parameters of one or more reservoir models. The reservoir models generally provide a model of the reservoir and the reservoir properties. The model allows for production scenarios to be run and tested to improve the production from the wellbore, including modeling of various processes such as secondary and tertiary recovery processes. In general, the models contain a number of assumptions about the reservoir properties that are often based on test data within the wells in the reservoir. As the parameters can change over time, the ability to use the information on the outflow locations and amounts and the inflow locations and amounts can be used to adjust the parameters within the reservoir models to more accurately represent the reservoir properties over time. Thus, the determined properties from the method 400 can be used to update the model over the life of the production from the reservoir to help to optimize the drawdown of the hydrocarbons in the reservoir.

Figure 8:
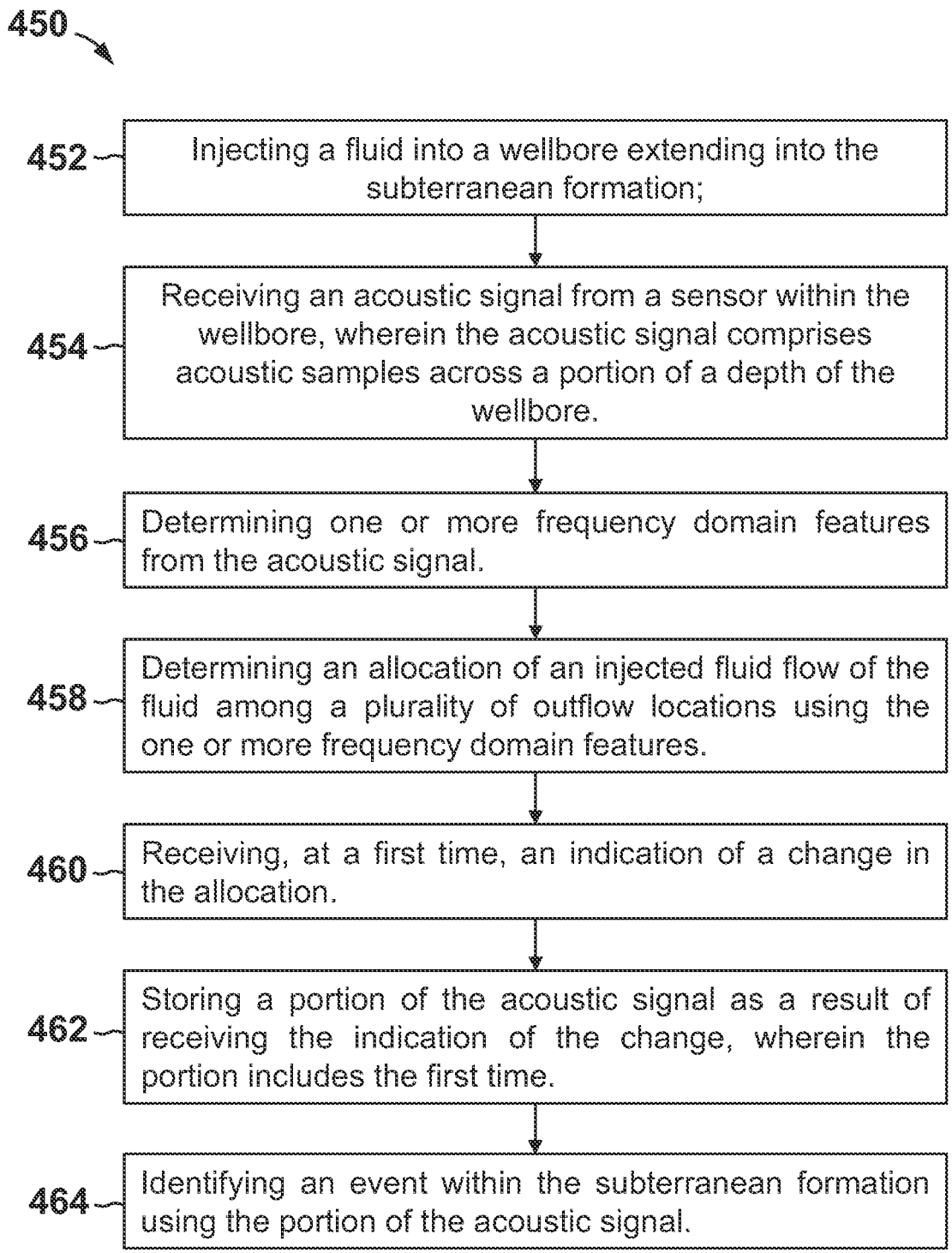
FIG. 8 is a flow diagram of a method of identifying an event within a subterranean formation according to some embodiments.

Referring now to FIG. 8, a method 450 of identifying an event within a subterranean formation is shown. Generally speaking, during wellbore operations, such as, for instance, during an injection operation, various events (e.g., such as so-called micros-seismic events) may occur. These events may include, for instance, opening or forming a fracture within the formation. During various wellbore operations (e.g., such as a fluid injection operation, production operations, hydraulic fracturing operations, etc.), fracture formation may change how and where fluid flows from, into, and through the formation. Some fracture formations or enlargements may reduce an effectiveness of the fluid injection operation (or other type of operation), so that a well operator may wish to have knowledge of when such events occur so that suitable remedial actions may be taken to prevent waste of time and/or resources. Thus, embodiments of method 450 may be performed so as to monitor (e.g., via a monitoring system 110 as previously described) for the occurrence of various events within the formation during the fluid injection operation (which may include any operation whereby fluid is injected within a subterranean wellbore—including secondary recovery operations, hydraulic fracturing, etc.), so that suitable corrective action may be taken.

Initially, method 450 may comprise injecting a fluid into a wellbore extending into a subterranean formation at block 452 and receiving an acoustic signal from a sensor within the wellbore, wherein the acoustic signal comprises acoustic samples across a portion of the a depth of the wellbore at block 454. The acoustic signal received at block 454 may be received via a suitable monitoring system, such, for instance, monitoring system 110 in FIG. 1 and/or one of the monitoring systems 110A, 110B in FIG. 3 as previously described above. For instance, the monitoring system (e.g., monitoring systems 110, 110A, 110B, etc.) may comprise an optical fiber (e.g., optical fiber 162, 162A, 162B, etc.) disposed within the wellbore and configured to measure or detect the acoustic signal. Thus, obtaining the acoustic signal at block 454 may thus be similar to the steps and features of block 202 in method 200 previously described above.

Next, method 450 includes determining one or more frequency domain features from the acoustic signal at block 456 and determining an allocation of an injected volume of the fluid among a plurality of outflow locations using the one or more frequency domain features at block 458. The frequency domain features obtained from the acoustic signal may be any one or more of the frequency domain features described herein, including combinations, variants (e.g., a normalized variant), and/or transformations thereof.

In addition, determining the allocation of the injected fluid flow across the plurality of outflow locations may be conducted in a similar manner to that described above for block 214 of method 200 in FIG. 4. Thus, a detailed description of these steps and features is not repeated herein in the interests of brevity. In addition, in some embodiments, method 450 may include identifying one or more fluid outflow locations using the one or more frequency domain features in the manner described above for block 210 of method 200 in FIG. 4. In some embodiments, the one or more fluid outflow locations may be known (e.g., based on wellbore construction, PLS data, etc.), prior to injecting the fluid at block 452.

Next, method 450 includes receiving, at a first time, an indication of a change in the allocation at block 460. In some embodiments, receiving the indication of the change at block 460 comprise continuously determining the allocation as described above for block 458 (which may involve repeated performance of blocks 456-458 in the manner previously described), and receiving an allocation that is sufficiently different from a previous allocation or a plurality of previous allocations (e.g., such as an average of the previous allocations). In some embodiments, the indication of a change in the allocation may comprise a change in the allocation that is greater than a threshold (e.g., a total numeric change, a percentage change, etc.). In some embodiments, block 460 may alternatively (or additionally) comprise receiving an indication of a change of a total fluid flow rate into the wellbore. Again, the change of the total fluid flow rate may comprise a change that is above a predetermined threshold or limit. In various embodiments, receiving an indication of a change in the allocation (or a change in the total injected fluid flow rate) may be determined based on the acoustic signal obtained from within the wellbore at block 452. In some embodiments, a total fluid flow rate may be adjusted (e.g., increased or decreased) so as to see if a chance in the allocation of the total fluid flow rate across the one or more fluid outflow locations results.

Without being limited to this or any other theory, the indication of a change in ether the allocation of fluid flow across the one or more fluid outflow locations and/or a total fluid flow rate into the wellbore may indicate that an event has occurred within the subterranean formation (e.g., subterranean formation 102). For instance, if a fracture is formed or enlarged within the formation, injected fluid may take a different flow path into and/or through the formation that may then change the allocation of the total fluid flow rate out of the wellbore across the one or more outflow locations, and/or may alter (e.g., increase) a total injected fluid flow rate into the wellbore overall. Thus, the indication of the change received at block 460 may indicate that an event (e.g., such as a micro-seismic event) has occurred within the formation 102.

Next, after an indication of a change in the allocation is received at block 462, method 450 includes storing a portion of the acoustic signal as a result of receiving the indication of the change, wherein the portion includes the first time, at block 462. For instance, if an indication of a change is not received at block 460, the acoustic signal (and the data associated therewith) may be deleted or overwritten (e.g., such as during subsequent performance of blocks 454-460). However, as a result of receiving an indication of a change, the portion of the acoustic signal is then saved on a suitable memory or memories (e.g., memory 170 in FIG. 1) such that further analysis may be performed therewith as described herein. In some embodiments, the portion of the acoustic data that is stored may comprise only those portion(s) of the acoustic data that are associated with depths within the wellbore where the allocation has changed.

Finally, after the portion of the acoustic signal is stored at block 462, method 450 further includes identifying an event within the subterranean formation using the portion of the acoustic signal 464. As previously described, the change in the allocation or total injected flow rate may signal that an event has taken place at or near the first time. As a result, the stored data may be further analyzed to identify the event. In some embodiments, the stored portion of the acoustic signal may be inputted to a fluid flow model that is to identify the presence or absence of an event within the subterranean formation. In some embodiments, one or more frequency domain features may be obtained from the portion of the acoustic signal and submitted to a fluid model (which may comprise one or more multivariate models as previously described for many of the other fluid models described herein). The model may then output an indication of the presence or absence of the event. In some embodiments, method 450 may comprise denoising the portion of the acoustic signal before identifying the event at block 464.

In addition, in some embodiments, identifying the event comprises triangulating the location of the event based on the portion of the acoustic signal. Specifically, because the acoustic signal may comprise a distributed acoustic signal across a portion of a depth of the wellbore (e.g., via an optical fiber 162) as previously described, the event may be identified (e.g., via the fluid model as described above) by the portion of the acoustic data at a plurality of depths within the wellbore. As a result, the portion of the acoustic signal (and/or frequency domain features thereof), at the plurality of depths may be compared (e.g., in the same or a different fluid flow model) so as to determine, via triangulation, a likely location within the formation of the identified event.

Further, in some embodiments, method 450 may also comprise shutting in the wellbore, obtaining a temperature signal (e.g., via a monitoring system 110, 110A, 110B, etc. as previously described) and identifying one or more fluid uptake locations within the formation (e.g., formation 102) surrounding the first wellbore in a similar manner to that described above for blocks 308-316 of method 300 in FIG. 5. In some of these embodiments, determining the allocation at block 458 may comprise determining an allocation may comprise determining an allocation of a total injected fluid volume across the one or more fluid uptake locations either in lieu of or in addition to determining the allocation of the fluid flow rate across the one or more fluid outflow locations. In addition, in some of these embodiments, receiving the indication of the change at block 460 may comprise receiving an indication of a change for the allocation across the one or more fluid outflow locations, the one or more fluid uptake locations, or both.

Still further, in some embodiments, method 450 may comprise receiving an acoustic and/or a temperature signal from a second wellbore, determining one or more frequency domain features and/or temperature features, respectively, from the acoustic signal and/or the temperature signal, respectively, from the second wellbore, and confirming the event (e.g., such as a fracture formation, enlargement, etc.) using the one or more frequency domain features and/or temperature features from the acoustic signal and/or temperature signal from the second wellbore. These steps may be similar to those previously described above for blocks 408-412 of method 400 in FIG. 7 and elsewhere herein, and thus are not repeated in the interests of brevity.

Once the event is identified and/or the location determined as described herein, the information can be used in a number of ways. In some aspects, the type of event, the identification of the event, and/or a location of the event can be used to improve or adjust the parameters of one or more reservoir models, as described herein. In general, the models can contain a number of assumptions about the reservoir properties including the location of features within the. As the events are tracked over time, the reservoir model can be updated to take the identified events and event locations into account. For example, a detected microseismic event can be used to indicate a fluid flow location, a change in the structure of the reservoir, or the like. Thus, the information on the events from the method 450 can be used to update the model over the life of the production from the reservoir to help to optimize the drawdown of the hydrocarbons in the reservoir.

Figure 9:
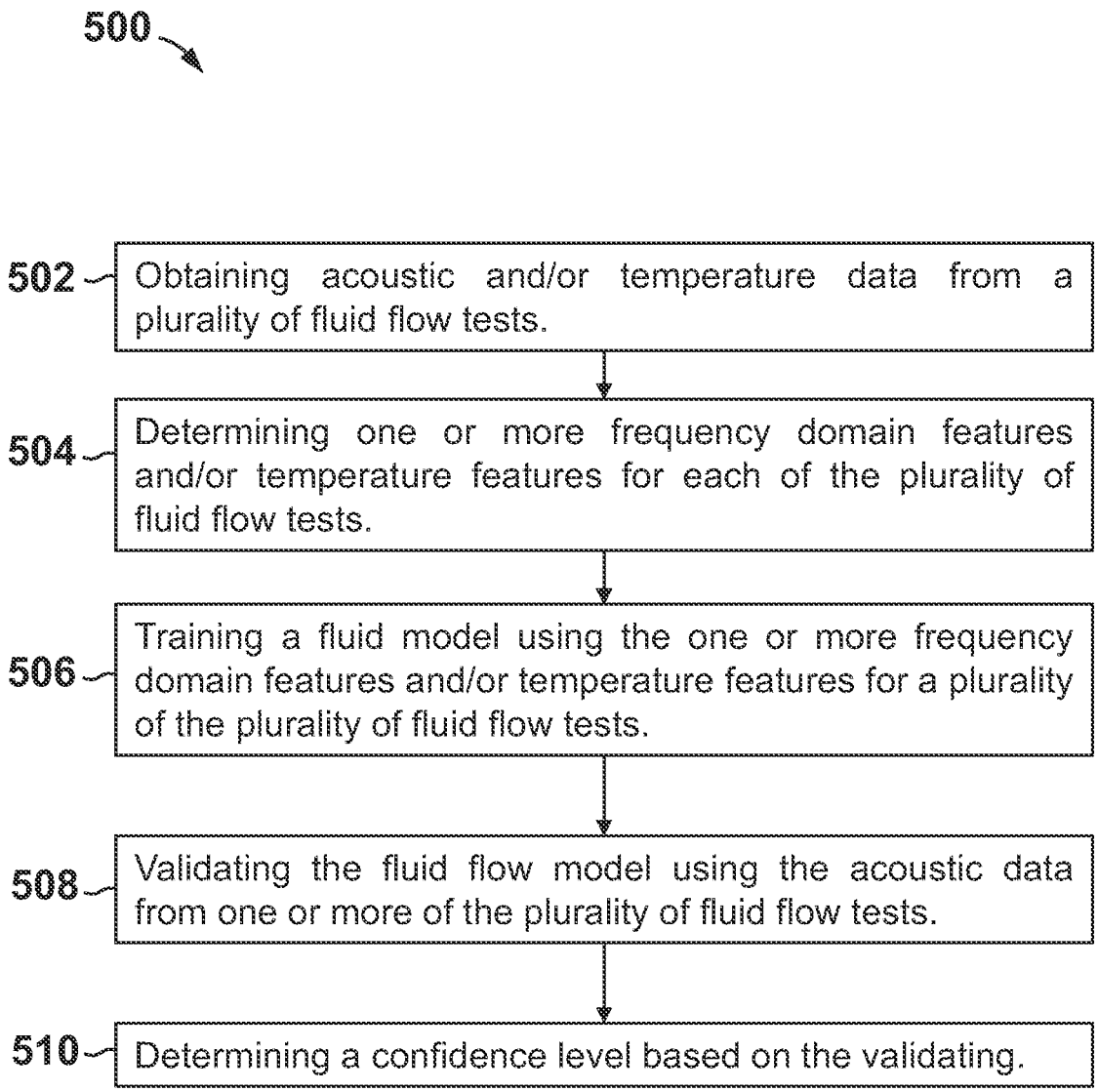
FIG. 9 is a flow diagram of a method of developing a fluid flow model according to some embodiments.

FIG. 9 illustrates a flow diagram of a method 500 of developing a fluid flow model according to some embodiments (e.g., such as the model(s) discussed above for blocks 212, 220, 214, 222, 304, 306, 314, 316, 356, 360, 406, 412, 458. 464 of methods 200, 300, 350, 400, 450, etc.). Thus, the method 500 may be utilized to develop a fluid outflow model, a fluid inflow model, a fluid flow classification model, etc. as described herein. In addition, the method 500 may be utilized to develop a fluid flow model that receives one or more frequency domain features, one or more temperature features, or both as inputs.

The method 500 can comprise obtaining acoustic and/or temperature data or signals from a plurality of fluid flow tests at block 502. The fluid flow tests may be constructed and carried out in a manner so as to provide acoustic and/or temperature data relevant for the particular event the fluid flow model is intended to identify and/or characterize. Thus, when performing method 500 to develop a fluid outflow model to identify one or more fluid outflow or uptake locations and/or a flow rate (or flow rate or volume allocation) of fluid at one or more fluid outflow or uptake locations such as described above, block 502 may comprise obtaining acoustic and/or temperature data from a plurality of fluid flow tests in which one or more of a plurality of fluids are emitted from a conduit at predetermined locations spanning a length of the conduit.

Alternatively, when performing method 500 to develop a fluid inflow model to identify one or more fluid inflow locations, one or more fluid flow test may be performed at block 502 in which one or more fluids of a plurality of fluids are introduced into a conduit at predetermined locations spanning a length of the conduit, wherein the plurality of fluids comprise a hydrocarbon gas, a hydrocarbon liquid, an aqueous fluid, or a combination thereof, and wherein the acoustic and/or temperature signal comprises acoustic and/or temperature samples across a portion of the conduit. The one or more fluids of a plurality of fluids can be introduced into a flowing fluid to determine the inflow signatures for fluid(s) entering flow fluids. In some embodiments, the one or more fluids can be introduced in a relatively stagnant fluid. This may help to model the lower or lowest producing portion of the well where no bulk fluid flow may be passing through the wellbore at the point at which the fluid enters the well. This may be tested to obtain the signature of fluid inflow into a fluid within the wellbore that may not be flowing.

The acoustic and/or temperature signal can be obtained at 502 by any suitable method. In some embodiments, the acoustic and/or temperature data can be from field data where the data is verified by other test instruments. In some embodiments, the acoustic and/or temperature signal is obtained from a sensor or sensors within or coupled to the conduit for each inflow test of the plurality of inflow tests. The sensor(s) can be disposed along the length of the conduit, and the acoustic and/or temperature signal that is obtained can be indicative of an acoustic and/or temperature source along a length of the conduit. The sensor(s) can comprise a fiber optic cable (or a plurality of fiber optic cables) disposed within the conduit, or in some embodiments, coupled to the conduit (e.g., on an outside of the conduit). The conduit can be a continuous section of a tubular, and in some embodiments, the can be disposed in a loop. While described as being a loop in some circumstances, a single section of pipe or tubular can also be used with additional piping used to return a portion of the fluid to the entrance of the conduit.

The configuration of the tubular test arrangement can be selected based on an expected operating configuration. A generic test arrangement may comprise a single tubular having one or more emission or injection points. The acoustic and/or temperature sensor can be disposed within the tubular or coupled to an exterior of the tubular. In some embodiments, other arrangement such as pipe-in-pipe arrangements designed to mimic a production tubular in a casing string can be used for the flow tests. The sensor(s) can be disposed within the inner pipe, in an annulus between the inner pipe and outer pipe, or coupled to an exterior of the outer pipe. The disposition of the sensor(s) and the manner in which it is coupled within the test arrangement can be the same or similar to how it is expected to be disposed within a wellbore. Any number of testing arrangements and sensor placements can be used, thereby allowing for test data corresponding to an expected completion configuration. Over time, a library of configurations and resulting test data can be developed to allow for future models to be developed based on known, labeled data used to train models.

In some embodiments, the conduit comprises a flow loop, and the flowing fluid can selectively comprises an aqueous fluid, a hydrocarbon fluid, a gas, or a combination thereof. The flowing fluid can selectively comprise a liquid phase, a multi-phase mixed liquid, or a liquid-gas mixed phase. In some embodiments, the flowing fluid within the conduit can have a flow regime including, but not limited to, laminar flow, plugging flow, slugging flow, annular flow, turbulent flow, mist flow, bubble flow, or any combination thereof. Within these flow regimes, the flow and/or inflow can be time based. For example, a fluid inflow can be laminar over a first time interval followed by slugging flow over a second time period, followed by a return to laminar or turbulent flow over a third time period. Thus, the specific flow regimes can be interrelated and have periodic or non-periodic flow regime changes over time.

Figure 10A:
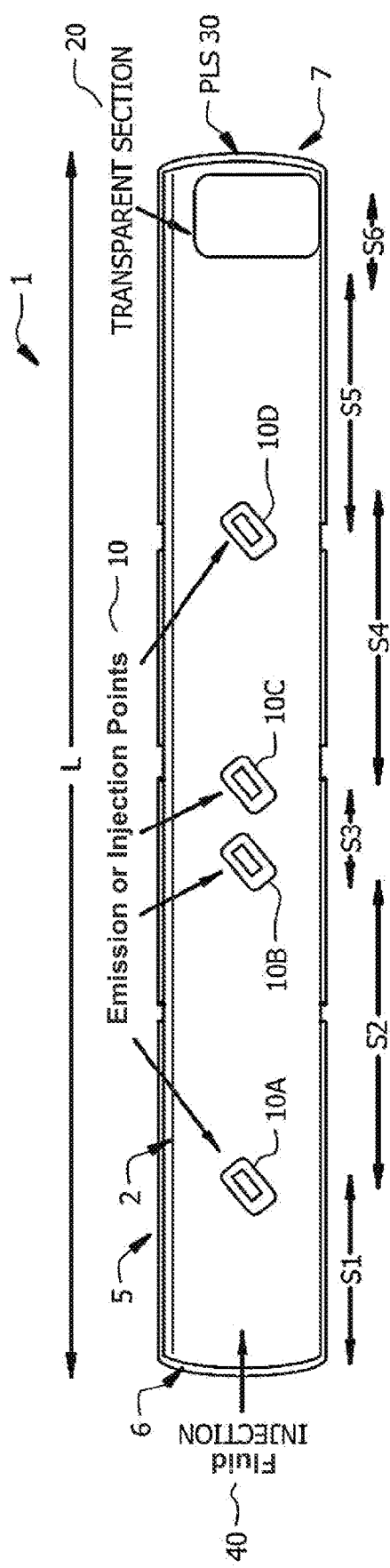
FIG. 10A is a schematic illustration of a flow loop assembly utilized to train an fluid flow model according to some embodiments.
Figure 10B:
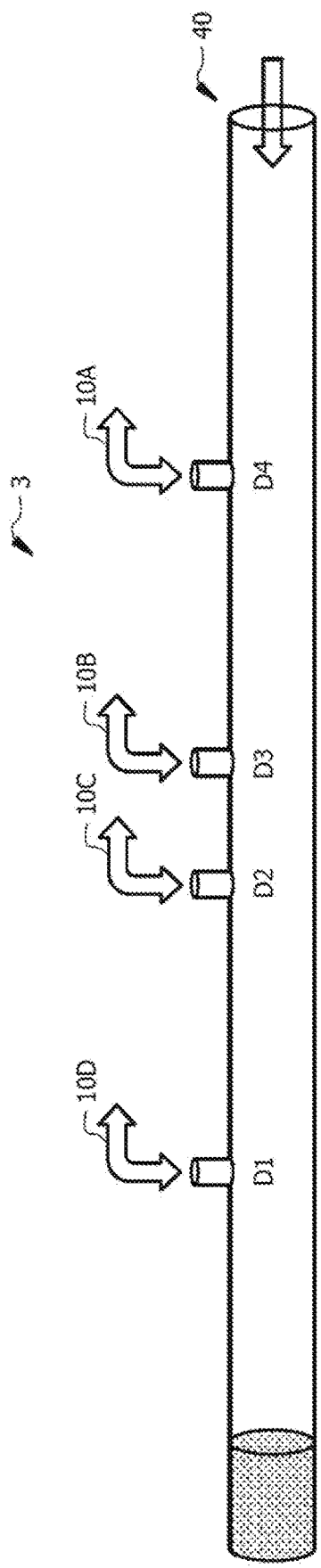
FIG. 10B is a schematic showing wellbore depths corresponding to emission or injection points of FIG. 10A.

Referring now to FIG. 10 (including FIGS. 10A and 10B), an assembly 1 for performing fluid flow tests (e.g., such as those described herein for method 500) is shown. Assembly 1 comprises a conduit 5 into or onto which a sensor 2 (e.g., a fiber optic cable) is disposed. In some embodiments, the fiber optic cable 2 can be disposed within conduit 5. In some embodiments, the fiber optic cable 2 can be disposed along an outside of the conduit 5, for example, coupled to an exterior of the conduit. The fiber optic cable 2 can be disposed along a length L of conduit 5. In some embodiments, other types of sensors can be used such as point source acoustic, vibration, or temperature sensors. A line 40 may be configured for introducing fluid into a first end 6 of conduit 5. One or a plurality of emission or injection points 10 can be disposed along length L of conduit 5. An assembly for performing fluid flow tests can comprise any number of emission or injection points. For example, an assembly for performing an outflow or inflow test according to this disclosure can comprise 1, 2, 3, 4, 5, 6, 7, 8, 9, 10, or more emission or injection points 10. For example, in the embodiment of FIG. 10A, four emission or injection points 10A, 10B, 10C, and 10D are disposed along length L of conduit 5. By way of example, a length L of conduit 5 may be in a range of from about 10 to about 100 meters, from about 20 to about 80 meters, or from about 30 to about 70 meters, for example, 30, 40, 45, 50, 55, 60, 65, or 70 meters. The function of the points 10A, 10B, 10C, 10C, 10D as emission or injection points during a fluid flow test may be determined by whether the points 10A, 10B, 10C, 10C, 10D are coupled to a higher pressure fluid source (e.g., that may deliver fluid through the points 10A, 10B, 10C, 10C, 10D into the conduit 5) or whether the points 10A, 10B, 10C, 10C, 10D are coupled to a lower pressure sink (e.g., such as one or more tanks that would take offloads of fluids from conduit via points 10A, 10B, 10C, 10C, 10D).

The emission or injection points may be positioned a spacing distance apart with regard to each other and/or first end 6 and second end 7 of conduit 5. The spacing distance can be selected based on a spatial resolution of the sensor system such that the injection points can be distinguished from each other in the resulting testing data. When point source sensors are used, the type of sensors can be considered in selecting the spacing distance. The spacing distance may also be selected, at least in part, to be sufficient to allow for a desired flow regime to develop between injection points. In some embodiments, first emission or injection point 10A can be positioned a spacing distance S1 from first end 6 of conduit 5 and a second spacing S2 from second emission or injection point 10B. Second emission or injection point 10B can be positioned a spacing distance S3 from third emission or injection point 10C. Third emission or injection point 10C can be positioned a spacing distance S4 from a fourth emission or injection point 10D. Fourth emission or injection point 10D can be positioned a spacing distance S5 from a transparent section 20 of conduit 5. Transparent section 20 can be utilized to visually confirm the flow regime within conduit 5. The visual appearance information can be recorded as part of the test data set. A Production Logging System (PLS) may be positioned within a spacing distance S6 of second end 7 of conduit 5 and operable to compare data received via sensor or fiber optic cable 2. In some embodiments, without limitation, the spacing distances between emission or injection points (e.g., spacing distances S2, S3, and S4) are in a range of from about 2 to about 20 m, from about 2 to about 15 m, or from about 10 m to about 15 m apart. In some embodiments, the first and last emission or injection points are at least 5, 6, 7, 8, 9, or 10 m from a closest end (e.g., from first end 6 or second end 7) of conduit 5. For example, spacing distances S1 and S5 can be at least 5, 6, 7, 8, 9, or 10 meters, in some embodiments.

The conduit 5 can be disposed at any angle, including any angle between, and including, horizontal to vertical. The angle of the conduit, along with the fluid composition and flow rates can affect the flow regimes within the conduit. For example, a gas phase may collect along a top of a horizontally oriented conduit 5 as compared to a bubbling or slugging flow in a vertical conduit. Thus, the flow regime can change based on an orientation of the conduit even with the same fluid flow rates and compositions. The angle can be selected to represent those conditions that are being modeled to match those found in a wellbore, and the angle of the conduit can become part of the data obtained from the test set up.

Fluid can be injected into line 40 in any of the flow regimes noted herein, for example, laminar flow, plugging flow, slugging flow, annular flow, turbulent flow, mist flow, and/or bubble flow, which may be visually confirmed through transparent section 20 of assembly 1. The injected fluid from line 40 can comprise a liquid phase, a multi-phase mixed liquid, and/or a liquid-gas mixed phase. The fluid flow tests can include various combinations of, pressures, flow rates, etc. of injected fluid at line 40. Outflow and inflow tests can also be performed for the emission and injection of single phase or multiphase fluids (e.g., hydrocarbon liquid and gas, hydrocarbon liquid and water, hydrocarbon liquid, water, and gas) from or into, respectively, the conduit 5.

In order to understand the variability in the measured signal for testing purposes, the flow for each type of flow can be incremented over time. For example, the emission or injection rate can be varied in steps over a time period. As another example, the flow rate, fluid type, flow regime, etc. of the injected fluid 40 may be varied (e.g., in steps, continuously, etc.) over a period of time. Each rate of emission or injection rate (or the rate of fluid injection 40) can be held constant over a time period sufficient to obtain a useable sample data set. The time period should be sufficient to identify variability in the signal at a fixed rate. For example, between about 1 minute and about 30 minutes of data can be obtained at each stepped flow rate before changing the flow rate to a different emission or injection rate.

As depicted in the schematic of FIG. 10B, which is a schematic 3 showing wellbore depths corresponding to injection points of FIG. 10A, the fluid flow tests can be calibrated to a certain reservoir depth, for example, by adjusting the fiber optic signal for the test depth. For example, emission or injection points 10A, 10B, 10C, and 10D can correspond to outflow or inflow depths D1, D2, D3, and D4, respectively. As an example, a length of fiber optic cable can be used that corresponds to typical wellbore depths (e.g., 3,000 m to 10,000 m, etc.). The resulting acoustic and/or temperature signals obtained by the fiber optic cable (or plurality of fiber optic cables) can then represent or be approximations of acoustic and/or temperature signals received under wellbore conditions. During the flow tests, acoustic and/or temperature data can be obtained under known flow conditions. The resulting acoustic data can then be used as training and/or test data for purposes of preparing the fluid flow model. For example, a first portion of the data can be used with machine learning techniques to train the fluid flow model, and a second portion of the data can be used to verify the results from the fluid flow model once it is developed.

Referring again to FIG. 9, in some embodiments, the test data obtained from the flow apparatus of FIG. 10 may be utilized to obtain the acoustic data at 502 for method 500. Next, method 500 may comprise determining one or more frequency domain features and/or temperature features for each of the plurality of fluid flow tests at 504, and training the fluid flow model using the one or more frequency domain features and/or the temperature features for a plurality of the tests and the predetermined locations at 506. The training of the fluid flow model can use machine learning, including any supervised or unsupervised learning approach. For example, the fluid flow model can be a neural network, a Bayesian network, a decision tree, a logistical regression model, a normalized logistical regression model, k-means clustering or the like.

In some embodiments, the fluid flow model can be developed and trained using a logistic regression model. As an example for training of a model used to determine the presence or absence of a hydrocarbon gas phase (e.g., such as discussed above for block 218 of method 200), the training of the fluid flow model at 506 can begin with providing the one or more frequency domain features and/or temperature features (including any frequency domain features and/or temperature features noted hereinabove as well as combinations, transformations, and/or variants thereof) to the logistic regression model corresponding to one or more fluid flow tests where the one or more fluids comprise a hydrocarbon gas. The one or more frequency domain features and/or temperature features can be provided to the logistic regression model corresponding to one or more fluid flow tests where the one or more fluids do not comprise a hydrocarbon gas. A first multivariate model can be determined using the one or more frequency domain features and/or temperature features as inputs. The first multivariate model can define a relationship between a presence and an absence of the hydrocarbon gas in the one or more fluids.

A similar training protocol can be carried out to train the model (or other models) to define a relationship between a presence and absence of aqueous fluid and hydrocarbon liquids. For instance, for a fluid flow model used to determine a fluid outflow location within a wellbore (e.g., such as discussed above for block 214 of method 10), the training of the fluid flow model at 306 can begin by providing the one or more of the plurality of frequency domain features (including any frequency domain features noted herein above as well as combinations, transformation, and/or variants thereof) to the logistic regression model corresponding to one or more outflow tests utilizing an injection fluid of interest (e.g., water). A first multivariate model can be determined using the one or more frequency domain features and/or temperature features as inputs. The first multivariate model can define a relationship between a presence and an absence of the fluid outflow at location of interest.

In the fluid flow model, the multivariate model equations can use the frequency domain features, the temperature features or combinations or transformations thereof to determine when a specific fluid, flow regime, and/or flow rate range is present. The multivariate model can define a threshold, decision point, and/or decision boundary having any type of shapes such as a point, line, surface, or envelope between the presence and absence of the specific fluid or flow regime. In some embodiments, the multivariate model can be in the form of a polynomial, though other representations are also possible. When models such as neural networks are used, the thresholds can be based on node thresholds within the model. As noted herein, the multivariate model is not limited to two dimensions (e.g., two frequency domain features or two variables representing transformed values from two or more frequency domain features), and rather can have any number of variables or dimensions in defining the threshold between the presence or absence of the fluid, flow regime, and/or flow rate range. When used, the detected values can be used in the multivariate model, and the calculated value can be compared to the model values. The presence of the fluid, flow regime, and/or flow rate range can be indicated when the calculated value is on one side of the threshold and the absence of the fluid, flow regime, and/or flow rate range can be indicated when the calculated value is on the other side of the threshold. Thus, each multivariate model can, in some embodiments, represent a specific determination between the presence or absence of a fluid, flow regime, and/or flow rate range. Different models, and therefore thresholds, can be used for each fluid and/or flow regime, and each multivariate model can rely on different frequency domain features or combinations or transformations of frequency domain features. Since the multivariate models define thresholds for the determination and/or identification of specific fluids, and/or different flow rate ranges for each specific fluid, the multivariate models and fluid flow model using such multivariate models can be considered to be event signatures for each type of fluid flow and/or inflow (including flow regimes, flow rate ranges, etc.).

Referring still to FIG. 9, once the model is trained or developed at 506, method 500 may proceed to validate or verify the fluid flow model(s) at 508. In some embodiments, the plurality of tests used for training the fluid flow model at 506 can be a subset of the plurality of fluid flow tests from 502, and the tests used to validate the model(s) at 508 can be another subset of the plurality of fluid flow tests from 502. In addition, in some embodiments the validation at 508 may be carried out using the acoustic signals and/or temperature signals from one or more tests and the predetermined locations of the one or more tests.

Figure 11:
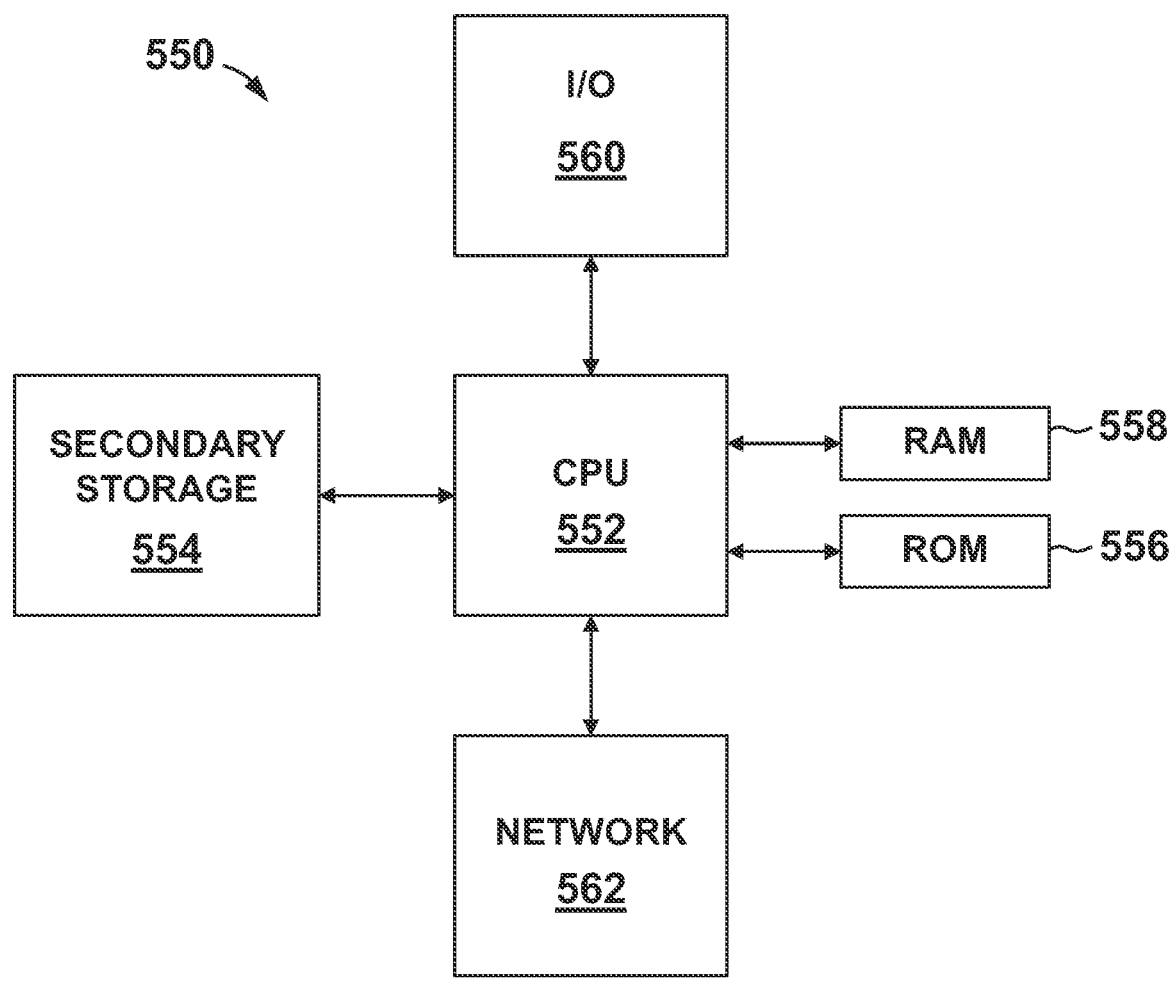
FIG. 11 schematically illustrates a computer that may be used to carry out various methods according to some embodiments.

Any of the systems and methods disclosed herein can be carried out on a computer or other device comprising a processor (e.g., a desktop computer, a laptop computer, a tablet, a server, a smartphone, or some combination thereof), such as the acquisition device 160 of FIG. 1. FIG. 11 illustrates a computer system 550 suitable for implementing one or more embodiments disclosed herein such as the acquisition device or any portion thereof. The computer system 550 includes a processor 552 (which may be referred to as a central processor unit or CPU) that is in communication with memory devices including secondary storage 554, read only memory (ROM) 556, random access memory (RAM) 558, input/output (I/O) devices 560, and network connectivity devices 562. The processor 552 may be implemented as one or more CPU chips.

It is understood that by programming and/or loading executable instructions onto the computer system 550, at least one of the CPU 552, the RAM 558, and the ROM 556 are changed, transforming the computer system 550 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 550 is turned on or booted, the CPU 552 may execute a computer program or application. For example, the CPU 552 may execute software or firmware stored in the ROM 556 or stored in the RAM 558. In some cases, on boot and/or when the application is initiated, the CPU 552 may copy the application or portions of the application from the secondary storage 554 to the RAM 558 or to memory space within the CPU 552 itself, and the CPU 552 may then execute instructions of which the application is comprised. In some cases, the CPU 552 may copy the application or portions of the application from memory accessed via the network connectivity devices 562 or via the I/O devices 560 to the RAM 558 or to memory space within the CPU 552, and the CPU 552 may then execute instructions of which the application is comprised. During execution, an application may load instructions into the CPU 552, for example load some of the instructions of the application into a cache of the CPU 552. In some contexts, an application that is executed may be said to configure the CPU 552 to do something, e.g., to configure the CPU 552 to perform the function or functions promoted by the subject application. When the CPU 552 is configured in this way by the application, the CPU 552 becomes a specific purpose computer or a specific purpose machine.

The secondary storage 554 is typically comprised of one or more disk drives or tape drives and is used for non-volatile storage of data and as an over-flow data storage device if RAM 558 is not large enough to hold all working data. Secondary storage 554 may be used to store programs which are loaded into RAM 558 when such programs are selected for execution. The ROM 556 is used to store instructions and perhaps data which are read during program execution. ROM 556 is a non-volatile memory device which typically has a small memory capacity relative to the larger memory capacity of secondary storage 554. The RAM 558 is used to store volatile data and perhaps to store instructions. Access to both ROM 556 and RAM 558 is typically faster than to secondary storage 554. The secondary storage 554, the RAM 558, and/or the ROM 556 may be referred to in some contexts as computer readable storage media and/or non-transitory computer readable media.

I/O devices 560 may include printers, video monitors, electronic displays (e.g., liquid crystal displays (LCDs), plasma displays, organic light emitting diode displays (OLED), touch sensitive displays, etc.), keyboards, keypads, switches, dials, mice, track balls, voice recognizers, card readers, paper tape readers, or other well-known input devices.

The network connectivity devices 562 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 562 may enable the processor 552 to communicate with the Internet or one or more intranets. With such a network connection, it is contemplated that the processor 552 might receive information from the network, or might output information to the network (e.g., to an event database) in the course of performing the above-described method steps. Such information, which is often represented as a sequence of instructions to be executed using processor 552, may be received from and outputted to the network, for example, in the form of a computer data signal embodied in a carrier wave.

Such information, which may include data or instructions to be executed using processor 552 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several known methods. The baseband signal and/or signal embodied in the carrier wave may be referred to in some contexts as a transitory signal.

The processor 552 executes instructions, codes, computer programs, scripts which it accesses from hard disk, floppy disk, optical disk (these various disk based systems may all be considered secondary storage 554), flash drive, ROM 556, RAM 558, or the network connectivity devices 562. While only one processor 552 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 554, for example, hard drives, floppy disks, optical disks, and/or other device, the ROM 556, and/or the RAM 558 may be referred to in some contexts as non-transitory instructions and/or non-transitory information.

In an embodiment, the computer system 550 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 550 to provide the functionality of a number of servers that is not directly bound to the number of computers in the computer system 550. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 550, at least portions of the contents of the computer program product to the secondary storage 554, to the ROM 556, to the RAM 558, and/or to other non-volatile memory and volatile memory of the computer system 550. The processor 552 may process the executable instructions and/or data structures in part by directly accessing the computer program product, for example by reading from a CD-ROM disk inserted into a disk drive peripheral of the computer system 550. Alternatively, the processor 552 may process the executable instructions and/or data structures by remotely accessing the computer program product, for example by downloading the executable instructions and/or data structures from a remote server through the network connectivity devices 562. The computer program product may comprise instructions that promote the loading and/or copying of data, data structures, files, and/or executable instructions to the secondary storage 554, to the ROM 556, to the RAM 558, and/or to other non-volatile memory and volatile memory of the computer system 550.

In some contexts, the secondary storage 554, the ROM 556, and the RAM 558 may be referred to as a non-transitory computer readable medium or a computer readable storage media. A dynamic RAM embodiment of the RAM 558, likewise, may be referred to as a non-transitory computer readable medium in that while the dynamic RAM receives electrical power and is operated in accordance with its design, for example during a period of time during which the computer system 550 is turned on and operational, the dynamic RAM stores information that is written to it. Similarly, the processor 552 may comprise an internal RAM, an internal ROM, a cache memory, and/or other internal non-transitory storage blocks, sections, or components that may be referred to in some contexts as non-transitory computer readable media or computer readable storage media.

Having described various systems and methods herein, certain aspects can include:

In a first aspect, a method of monitoring fluid outflow along a wellbore comprises: obtaining an acoustic signal from a sensor within the wellbore, wherein the acoustic signal comprises acoustic samples across a portion of a depth of the wellbore; determining one or more frequency domain features from the acoustic signal; and identifying one or more fluid outflow locations along the portion of the depth of the wellbore using the one or more frequency domain features.

A second aspect can include the method of the first aspect, wherein the one or more frequency domain features comprises at least two different frequency domain features.

A third aspect can include the method of the first or second aspect, wherein the sensor comprises a fiber optic cable disposed within the wellbore.

A fourth aspect can include the method of the third aspect, wherein the one or more frequency domain features comprises at least one of: a spectral centroid, a spectral spread, a spectral roll-off, a spectral skewness, a root mean square (RMS) band energy, a total RMS energy, a spectral flatness, a spectral slope, a spectral kurtosis, a spectral flux, a spectral autocorrelation function, or a normalized variant thereof.

A fifth aspect can include the method of any one of the first to fourth aspects, further comprising: denoising the acoustic signal prior to determining the one or more frequency domain features.

A sixth aspect can include the method of the fifth aspect, wherein denoising the acoustic signal comprises median filtering the acoustic data.

A seventh aspect can include the method of the sixth aspect, further comprising: calibrating the acoustic signal.

An eighth aspect can include the method of the seventh aspect, further comprising: normalizing the one or more frequency domain features prior to identifying the one or more outflow locations using the one or more frequency domain features.

A ninth aspect can include the method of any one of the first to eighth aspects, wherein identifying the one or more fluid outflow locations comprises: identifying a background fluid flow signature using the acoustic signal; and removing the background fluid flow signature from the acoustic signal prior to identifying the one or more fluid outflow locations.

A tenth aspect can include the method of any one of the first to ninth aspects, wherein identifying the one or more fluid outflow locations comprises: identifying one or more anomalies in the acoustic signal using the one or more frequency domain features; and selecting depth intervals of the one or more anomalies as the one or more outflow locations.

An eleventh aspect can include the method of the tenth aspect, wherein the depth intervals comprise depth intervals between packers within the wellbore, wherein the packers are disposed within an annulus between a tubular member and a wall of the wellbore, and wherein the one or more outflow locations comprise locations where fluid is flowing into the annulus from the tubular member.

A twelfth aspect can include the method of any one of the first to eleventh aspects, wherein the identifying the one or more fluid outflow locations comprises identifying the one or more fluid outflow locations using a logistic regression model that comprises a multivariate model having the one or more frequency domain features as inputs.

A thirteenth aspect can include the method of any one of the first to twelfth aspects, further comprising: determining an allocation of a total fluid flow across the one or more fluid outflow locations using the one or more frequency domain features.

A fourteenth aspect can include the method of any one of the first to thireenth aspects, wherein the sensor comprises a fiber optic-based acoustic sensor.

In a fifteenth aspect, a system for monitoring fluid outflow along a wellbore comprises: a processor; a memory; and an analysis program stored in the memory, wherein the analysis program is configured, when executed on the processor, to: obtain an acoustic signal, wherein the acoustic signal is received from a sensor within a wellbore, wherein the acoustic signal comprises acoustic samples across a portion of a depth of the wellbore; determine one or more frequency domain features from the acoustic signal; and identify one or more fluid outflow locations along the portion of the depth of the wellbore using the one or more frequency domain features.

A sixteenth aspect can include the system of the fifteenth aspect, wherein the one or more frequency domain features comprises at least two different frequency domain features.

A seventeenth aspect can include the system of the fifteenth or sixteenth aspect, wherein the sensor comprises a fiber optic cable disposed within the wellbore.

An eighteenth aspect can include the system of the seventeenth aspect, wherein the one or more frequency domain features comprises at least one of: a spectral centroid, a spectral spread, a spectral roll-off, a spectral skewness, a root mean square (RMS) band energy, a total RMS energy, a spectral flatness, a spectral slope, a spectral kurtosis, a spectral flux, a spectral autocorrelation function, or a normalized variant thereof.

A nineteenth aspect can include the system of any one of the fifteenth to eighteenth aspects, wherein the analysis program is configured, when executed on the processor, to denoise the acoustic signal prior to determining the one or more frequency domain features.

A twentieth aspect can include the system of the nineteenth aspect, wherein the analysis program is configured, when executed on the processor, to denoise the acoustic signal by median filtering the acoustic data.

A twenty first aspect can include the system of the nineteenth or twentieth aspect, wherein the analysis program is configured, when executed on the processor, to calibrate the acoustic signal.

A twenty second aspect can include the system of the twenty first aspect, wherein the analysis program is configured, when executed on the processor, to normalize the one or more frequency domain features prior to identifying the one or more outflow locations using the one or more frequency domain features.

A twenty third aspect can include the system of any one of the fifteenth to twenty second aspects, wherein the analysis program is configured, when executed on the processor, to: identify a background fluid flow signature using the acoustic signal; and remove the background fluid flow signature from the acoustic signal prior to identifying the one or more fluid outflow locations.

A twenty fourth aspect can include the system of any one of the fifteenth to twenty third aspects, wherein the analysis program is configured, when executed on the processor, to: identify one or more anomalies in the acoustic signal using the one or more frequency domain features; and select depth intervals of the one or more anomalies as the one or more outflow locations.

A twenty fifth aspect can include the system of the twenty fourth aspect, wherein the depth intervals comprise depth intervals between packers within the wellbore, wherein the packers are disposed within an annulus between a tubular member and a wall of the wellbore, and wherein the one or more outflow locations comprise locations where fluid is flowing into the annulus from the tubular member.

A twenty sixth aspect can include the system of any one of the fifteenth to twenty fifth aspects, wherein the analysis program is configured, when executed on the processor, to use a logistic regression model to identify the one or more fluid outflow locations, wherein the logistic regression model uses the one or more frequency domain features as inputs.

A twenty seventh aspect can include the system of any one of the fifteenth to twenty sixth aspects, wherein the analysis program is configured, when executed on the processor, to: determine an allocation of a total fluid flow across the one or more fluid outflow locations using the one or more frequency domain features.

A twenty eighth aspect can include the system of any one of the fifteenth to twenty seventh aspects, wherein the sensor comprises a fiber optic-based acoustic sensor.

In a twenty ninth aspect, a method of monitoring fluid outflow along a wellbore comprises: obtaining an acoustic signal from a sensor within the wellbore, wherein the acoustic signal comprises acoustic samples across a portion of a depth of the wellbore; determining a plurality of frequency domain features from the acoustic signal, wherein the plurality of frequency domain features are obtained across a plurality of depth intervals within the portion of the depth of the wellbore, and wherein the plurality of frequency domain features comprise at least two different frequency domain features; identifying a plurality of fluid outflows at a plurality of fluid outflow locations within the plurality of depth intervals using the plurality of frequency domain features; and determining an allocation of a total fluid flow across each of the plurality of fluid outflows using the plurality of frequency domain features.

A thirtieth aspect can include the method of the twenty ninth aspect, wherein identifying the plurality of fluid outflow locations comprises: providing the plurality of frequency domain features to a fluid outflow model, wherein the fluid outflow model comprises a logistic regression model; and determining that the plurality of fluid outflows are present at the plurality of fluid outflow locations based on an output from the fluid outflow model.

A thirty first aspect can include the method of the thirtieth aspect, wherein identifying the plurality of fluid outflow locations comprises providing at least a subset of the plurality of frequency domain features as inputs to the fluid outflow model to determine when the fluid outflows are present within the wellbore.

A thirty second aspect can include the method of the thirty first aspect, comprising removing a background signal from the acoustic signal prior to determining the plurality of frequency domain features.

A thirty third aspect can include the method of the thirty second aspect, wherein the sensor comprises a fiber optic-based acoustic sensor.

In a thirty fourth aspect, a method of monitoring an injection of fluid into a subterranean formation comprises: obtaining one or more frequency domain features from an acoustic signal originating within a wellbore extending into the subterranean formation; identifying one or more fluid outflow locations within the wellbore using the one or more frequency domain features; obtaining one or more temperature features from a temperature signal originating within the wellbore; and identifying one or more fluid uptake locations within the subterranean formation using the temperature features within the wellbore.

A thirty fifth aspect can include the method of the thirty fourth aspect, comprising shutting in the wellbore before obtaining the one or more temperature features.

A thirty sixth aspect can include the method of the thirty fifth aspect, wherein the wellbore comprises one or more packers disposed within an annulus between a tubular member and a wall of the wellbore, and wherein the one or more outflow locations comprise locations where fluid is flowing into the annulus from the tubular member.

A thirty seventh aspect can include the method of any one of the thirty fourth to thirty sixth aspects, wherein the one or more temperature features comprises one or more of: a depth derivative of temperature with respect to depth; a temperature excursion measurement, wherein the temperature excursion measurement comprises a difference between a temperature reading at a first depth and a smoothed temperature reading over a depth range, wherein the first depth is within the depth range; a baseline temperature excursion, wherein the baseline temperature excursion comprises a derivative of a baseline excursion with depth, wherein the baseline excursion comprises a difference between a baseline temperature profile and a smoothed temperature profile; a peak-to-peak value, wherein the peak-to-peak value comprises a derivative of a peak-to-peak difference with depth, wherein the peak-to-peak difference comprises a difference between a peak high temperature reading and a peak low temperature reading with an interval; an autocorrelation, wherein the autocorrelation is a cross-correlation of the temperature signal with itself; a heat loss parameter; or a time-depth derivative, a depth-time derivative, or both.

A thirty eighth aspect can include the method of any one of the thirty fourth to thirty seventh aspects, wherein the one or more frequency domain features comprises at least one of: a spectral centroid, a spectral spread, a spectral roll-off, a spectral skewness, an RMS band energy, a total RMS energy, a spectral flatness, a spectral slope, a spectral kurtosis, a spectral flux, a spectral autocorrelation function, a normalized variant thereof, or any combination thereof.

A thirty ninth aspect can include the method of any one of the thirty fourth to thirty eighth aspects, comprising: determining an allocation of a total volumetric flow across the one or more fluid outflow locations using the one or more frequency domain features.

A fortieth aspect can include the method of any one of the thirty fourth to thirty ninth aspects, comprising: determining a temperature change at depths associated with the one or more fluid uptake locations for a time period; and determining an allocation of a total injected fluid volume across the one or more fluid uptake locations based on the temperature change for the period of time.

A forty first aspect can include the method of any one of the thirty fourth to fortieth aspects, comprising: determining an allocation of a total injected fluid volume across the one or more update locations using the one or more temperature features.

A forty second aspect can include the method of any one of the thirty fourth to forty first aspects, wherein obtaining the one or more frequency domain features comprises receiving the acoustic signal from a fiber optic-based distributed acoustic sensor within the wellbore.

A forty third aspect can include the method of the forty second aspect, wherein obtaining the one or more temperature features comprises receiving the temperature signal from a fiber optic-based distributed temperature sensor within the wellbore.

A forty fourth aspect can include the method of the forty third aspect, wherein the fiber optic-based distributed acoustic sensor and the fiber optic based distributed temperature sensor comprise a single fiber optic cable.

A forty fifth aspect can include the method of any one of the thirty fourth to forty fourth aspects, wherein identifying the one or more fluid outflow locations comprises using the one or more frequency domain features in a first model.

A forty sixth aspect can include the method of the forty fifth aspect, wherein identifying the one or more fluid uptake locations comprises using the one or more temperature features in a second model.

In a forth seventh aspect, a system for monitoring an injection of fluid into a subterranean formation comprises: a processor; a memory; and an analysis program stored in the memory, wherein the analysis program is configured, when executed on the processor, to: obtain one or more frequency domain features from an acoustic signal originating within a wellbore extending into the subterranean formation; identify one or more fluid outflow locations within the wellbore using the one or more frequency domain features; obtain one or more temperature features from a temperature signal originating within the wellbore; and identify one or more fluid uptake locations within the subterranean formation using the temperature features.

A forty eighth aspect can include the system of the forty seventh aspect, wherein the wellbore comprises one or more packers disposed within an annulus between a tubular member and a wall of the wellbore, and wherein the one or more outflow locations comprise locations where fluid is flowing into the annulus from the tubular member.

A forty ninth aspect can include the system of the forty seventh or forty eighth aspect, wherein the one or more temperature features comprises one or more of: a depth derivative of temperature with respect to depth; a temperature excursion measurement, wherein the temperature excursion measurement comprises a difference between a temperature reading at a first depth and a smoothed temperature reading over a depth range, wherein the first depth is within the depth range; a baseline temperature excursion, wherein the baseline temperature excursion comprises a derivative of a baseline excursion with depth, wherein the baseline excursion comprises a difference between a baseline temperature profile and a smoothed temperature profile; a peak-to-peak value, wherein the peak-to-peak value comprises a derivative of a peak-to-peak difference with depth, wherein the peak-to-peak difference comprises a difference between a peak high temperature reading and a peak low temperature reading with an interval; an autocorrelation, wherein the autocorrelation is a cross-correlation of the temperature signal with itself; a heat loss parameter; or a time-depth derivative, a depth-time derivative, or both.

A fiftieth aspect can include the system of any one of the forty seventh to forty ninth aspects, wherein the one or more frequency domain features comprises at least one of: a spectral centroid, a spectral spread, a spectral roll-off, a spectral skewness, an RMS band energy, a total RMS energy, a spectral flatness, a spectral slope, a spectral kurtosis, a spectral flux, a spectral autocorrelation function, a normalized variant thereof, or any combination thereof.

A fifty first aspect can include the system of any one of the forty seventh to fiftieth aspects, wherein the analysis program is configured, when executed on the processor, to: determining an allocation of a total volumetric flow across the one or more fluid outflow locations using the one or more frequency domain features.

A fifty second aspect can include the system of any one of the forty seventh to fifty first aspects, wherein the analysis program is configured, when executed on the processor, to: determine a temperature change at depths associated with the one or more fluid uptake locations for a time period; and determine an allocation of a total injected fluid volume across the one or more fluid uptake locations based on the temperature change for the period of time.

A fifty third aspect can include the system of any one of the forty seventh to fifty second aspects, wherein the analysis program is configured, when executed on the processor, to: determine an allocation of a total injected fluid volume across the one or more update locations using the one or more temperature features.

A fifty fourth aspect can include the system of any one of the forty seventh to fifty third aspects, comprising a fiber optic-based distributed acoustic sensor within the wellbore, wherein the analysis program is configured, when executed by the processor, to obtain the acoustic signal from the fiber optic-based distributed acoustic sensor.

A fifty fifth aspect can include the system of the fifty fourth aspect, comprising a fiber optic-based distributed temperature sensor within the wellbore, wherein the analysis program is configured, when executed by the processor, to obtain the temperature signal from the fiber optic-based temperature sensor.

A fifty sixth aspect can include the system of the fifty fifth aspect, wherein the fiber optic-based distributed acoustic sensor and the fiber optic-based distributed temperature sensor comprise a single fiber optic cable.

A fifty seventh aspect can include the system of any one of the forty seventh to fifty sixth aspects, wherein the analysis program is configured, when executed on the processor, to identify the one or more fluid outflow locations by inputting the one or more frequency domain features into a first model.

A fifty eighth aspect can include the system of the fifty seventh aspect, wherein the analysis program is configured, when executed on the processor, to identify the one or more fluid uptake locations by inputting the one or more temperature features into a second model.

In a fifty ninth aspect, a method of monitoring an injection of fluid into a subterranean formation comprises: obtaining an acoustic signal from a fiber optic-based acoustic sensor within a wellbore extending into the subterranean formation; obtaining a plurality of frequency domain features from the acoustic signal; identifying a plurality of fluid outflow locations within the wellbore using the plurality of the frequency domain features; obtaining a temperature signal from a fiber optic-based temperature sensor within the wellbore; obtaining a plurality of temperature features from the temperature signal; and identifying a plurality of fluid uptake locations within the subterranean formation using the temperature features.

A sixtieth aspect can include the method of the fifty ninth aspect, comprising: determining an allocation of a total injected fluid volume across the plurality of fluid outflow locations using the plurality of frequency domain features.

A sixty first aspect can include the method of the sixtieth aspect, comprising: determining an allocation of the total injected fluid volume across the plurality of fluid uptake locations using the plurality of temperature features.

A sixty second aspect can include the method of the sixty first aspect, comprising shutting in the well after obtaining the acoustic signal and before obtaining the temperature signal.

A sixty third aspect can include the method of the sixty second aspect, wherein the plurality of temperature features comprises one or more of: a depth derivative of temperature with respect to depth; a temperature excursion measurement, wherein the temperature excursion measurement comprises a difference between a temperature reading at a first depth and a smoothed temperature reading over a depth range, wherein the first depth is within the depth range; a baseline temperature excursion, wherein the baseline temperature excursion comprises a derivative of a baseline excursion with depth, wherein the baseline excursion comprises a difference between a baseline temperature profile and a smoothed temperature profile; a peak-to-peak value, wherein the peak-to-peak value comprises a derivative of a peak-to-peak difference with depth, wherein the peak-to-peak difference comprises a difference between a peak high temperature reading and a peak low temperature reading with an interval; an autocorrelation, wherein the autocorrelation is a cross-correlation of the temperature signal with itself; a heat loss parameter; or a time-depth derivative, a depth-time derivative, or both.

A sixty fourth aspect can include the method of the sixty third aspect, wherein the plurality of frequency domain features comprises at least two of: a spectral centroid, a spectral spread, a spectral roll-off, a spectral skewness, an RMS band energy, a total RMS energy, a spectral flatness, a spectral slope, a spectral kurtosis, a spectral flux, a spectral autocorrelation function, a normalized variant thereof, or any combination thereof.

A sixty fifth aspect can include the method of the sixty fourth aspect, wherein obtaining an acoustic signal comprises obtaining the acoustic signal from a fiber optic cable, and wherein obtaining the temperature signal comprises obtaining the temperature signal from the fiber optic cable.

In a sixty sixth aspect, a method of monitoring fluid outflow along a wellbore comprises: determining one or more temperature features from a distributed temperature signal originating in the wellbore; determining one or more frequency domain features from an acoustic signal originating in the wellbore; and using the one or more temperature features and the one or more frequency domain features to identify one or more fluid outflow locations along the wellbore.

A sixty seventh aspect can include the method of the sixty sixth aspect, wherein using the one or more temperature features and the one or more frequency domain features comprises: using the one or more temperature features in a first fluid outflow model; using the one or more frequency domain features in a second fluid outflow model; combining an output from the first fluid outflow model and an output from the second fluid outflow model to form a combined output; and identifying the one or more fluid outflow locations along the wellbore based on the combined output.

A sixty eighth aspect can include the method of the sixty seventh aspect, wherein the first fluid outflow model comprise one or more multivariate models, and wherein the output from each multivariate model of the one or more multivariate models comprises an indication of the one or more locations along the wellbore.

A sixty ninth aspect can include the method of the sixty eighth aspect, wherein the second fluid outflow model comprises a regression model, and wherein the output from the regression model comprises an indication of a fluid outflow rate at the one or more locations along the wellbore.

A seventieth aspect can include the method of the sixty ninth aspect, wherein combining the output from the first fluid outflow model with the output from the second fluid outflow model comprises determining the combined output as a function of: 1) the output from the first fluid outflow model, and 2) the output from the second fluid outflow model.

A seventy first aspect can include the method of the seventieth aspect, further comprising determining an allocation of a total injected fluid flow into the wellbore across the one or more fluid outflow locations based on the combined output.

A seventy second aspect can include the method of any one of the sixty sixth to seventy first aspects, wherein the one or more temperature features comprise at least one of: a depth derivative of temperature with respect to depth, a temperature excursion measurement, wherein the temperature excursion measurement comprises a difference between a temperature reading at a first depth and a smoothed temperature reading over a depth range, wherein the first depth is within the depth range; a baseline temperature excursion, wherein the baseline temperature excursion comprises a derivative of a baseline excursion with depth, wherein the baseline excursion comprises a difference between a baseline temperature profile and a smoothed temperature profile; a peak-to-peak value, wherein the peak-to-peak value comprises a derivative of a peak-to-peak difference with depth, wherein the peak-to-peak difference comprises a difference between a peak high temperature reading and a peak low temperature reading with an interval; an autocorrelation, wherein the autocorrelation is a cross-correlation of the temperature signal with itself; a heat loss parameter; or a time-depth derivative, a depth-time derivative, or both.

A seventy third aspect can include the method of any one of the sixty sixth to seventy second aspects, wherein the one or more frequency domain features comprise at least one of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

A seventy fourth aspect can include the method of any one of the sixty sixth to seventy third aspects, comprising obtaining the distributed temperature signal from a fiber optic-based temperature sensor within the wellbore.

A seventy fifth aspect can include the method of any one of the sixty sixth to seventy fourth aspects, comprising obtaining the acoustic signal from a fiber optic-based acoustic sensor within the wellbore.

In a seventy sixth aspect, a system for monitoring fluid outflow along a wellbore comprises: a processor; a memory; and an analysis program stored in the memory, wherein the analysis program is configured, when executed on the processor, to: receive a distributed temperature signal and an acoustic signal, wherein the distributed temperature sensing signal and the acoustic signal originated within the wellbore; determine one or more temperature features from the distributed temperature sensing signal; determine one or more frequency domain features from the acoustic signal; and identify one or more fluid outflow locations along the wellbore using the one or more temperature features and the one or more frequency domain features.

A seventy seventh aspect can include the system of the seventy sixth aspect, wherein the analysis program is configured, when executed on the processor, to: use the one or more temperature features in a first fluid outflow model; use the one or more frequency domain features in a second fluid outflow model; combine an output from the first fluid outflow model and an output from the second fluid outflow model to form a combined output; and identify the one or more fluid outflow locations along the wellbore based on the combined output.

A seventy eighth aspect can include the system of the seventy seventh aspect, wherein the first fluid outflow model comprises one or more multivariate models, and wherein the output from each multivariate model of the one or more multivariate models comprises an indication of the one or more locations along the wellbore.

A seventy ninth aspect can include the system of the seventy seventh or seventy eighth aspect, wherein the second fluid outflow model comprises a regression model, and wherein the output from the regression model comprises an indication of a fluid outflow rate at the one or more locations along the wellbore.

An eightieth aspect can include the system of any one of the seventy seventh to seventh ninth aspects, wherein the analysis program is configured, when executed on the processor, to combine the output from the first fluid outflow model with the output from the second fluid outflow model as a function of: 1) the output from the first fluid outflow model, and 2) the output from the second fluid outflow model.

An eighty first aspect can include the system of any one of the seventy seventh to eightieth aspects, wherein the analysis program is configured, when executed on the processor, to determine an allocation of a total injected fluid flow into the wellbore across the one or more fluid outflow locations based on the combined output.

An eighty second aspect can include the system of any one of the seventy sixth to eighty first aspects, wherein the one or more temperature features comprise at least one of: a depth derivative of temperature with respect to depth; a temperature excursion measurement, wherein the temperature excursion measurement comprises a difference between a temperature reading at a first depth and a smoothed temperature reading over a depth range, wherein the first depth is within the depth range; a baseline temperature excursion, wherein the baseline temperature excursion comprises a derivative of a baseline excursion with depth, wherein the baseline excursion comprises a difference between a baseline temperature profile and a smoothed temperature profile; a peak-to-peak value, wherein the peak-to-peak value comprises a derivative of a peak-to-peak difference with depth, wherein the peak-to-peak difference comprises a difference between a peak high temperature reading and a peak low temperature reading with an interval; an autocorrelation, wherein the autocorrelation is a cross-correlation of the temperature signal with itself; a heat loss parameter; or a time-depth derivative, a depth-time derivative, or both.

An eighty third aspect can include the system of any one of the seventy sixth to eighty second aspects, wherein the one or more frequency domain features comprise at least one of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

An eighty fourth aspect can include the system of any one of the seventy sixth to eighty third aspects, comprising a fiber optic-based temperature sensor within the wellbore, wherein the analysis program is configured, when executed on the processor, to obtain the distributed temperature signal from the fiber optic-based temperature sensor.

An eighty fifth aspect can include the system of any one of the seventy sixth to eighty fourth aspects, comprising a fiber optic-based acoustic sensor within the wellbore, wherein the analysis program is configured, when executed on the processor, to obtain the acoustic signal from the fiber optic-based acoustic sensor.

In an eighty sixth aspect, a method of monitoring fluid outflow along a wellbore comprises: determining one or more temperature features from a distributed temperature sensing signal originating in a wellbore, wherein the one or more temperature features comprise at least one of: a depth derivative of temperature with respect to depth, a temperature excursion measurement, a baseline temperature excursion, or a peak-to-peak value; determining one or more frequency domain features from an acoustic signal originated in the wellbore; and determining a fluid outflow rate at one or more locations along the wellbore using the one or more temperature features and the one or more frequency domain features.

An eighty seventh aspect can include the method of the eighty sixth aspect, wherein: the temperature excursion measurement comprises a difference between a temperature reading at a first depth and a smoothed temperature reading over a depth range, wherein the first depth is within the depth range; the baseline temperature excursion comprises a derivative of a baseline excursion with depth, wherein the baseline excursion comprises a difference between a baseline temperature profile and a smoothed temperature profile, and the peak-to-peak value comprises a derivative of a peak-to-peak difference with depth, wherein the peak-to-peak difference comprises a difference between a peak high temperature reading and a peak low temperature reading with an interval.

An eighty eighth aspect can include the method of the eighty sixth or eighty seventh aspect, wherein the one or more frequency domain features comprise at least one of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

An eighty ninth aspect can include the method of any one of the eighty sixth to eighty eighth aspects, wherein determining the fluid outflow rate at the one or more locations comprises: using the one or more temperature features in a first fluid outflow model; using the one or more frequency domain features in a second fluid outflow model; combining an output from the first fluid outflow model and an output from the second fluid outflow model to form a combined output; and determining the fluid outflow rate at the one or more locations based on the combined output.

A ninetieth aspect can include the method of the eighty ninth aspect, wherein the first fluid outflow model comprise one or more multivariate models, and wherein the output from each multivariate model of the one or more multivariate model comprises an indication of the one or more locations along the wellbore.

A ninety first aspect can include the method of the eighty ninth or ninetieth aspect, wherein the second fluid outflow model comprises a regression model, and wherein the output from the regression model comprises an indication of a fluid outflow rate at the one or more locations along the wellbore.

A ninety second aspect can include the method of any one of the eighty sixth to ninety first aspects, wherein determining the fluid outflow rate at the one or more locations comprises determining an allocation a total injected fluid flow into the wellbore across the one or more fluid outflow locations based on the combined output.

In a ninety third aspect, a method of monitoring fluid injection into a subterranean formation comprises: obtaining a first acoustic signal from a first sensor within a first wellbore, wherein the first acoustic signal comprises acoustic samples across a portion of a depth of the first wellbore; determining one or more frequency domain features from the first acoustic signal; identifying one or more fluid outflow locations within the first wellbore using the one or more frequency domain features from the first acoustic signal; obtaining a second acoustic signal from a second sensor within a second wellbore, wherein the second acoustic signal comprises acoustic samples across a portion of a depth of the second wellbore; determining one or more frequency domain features from the second acoustic signal; and identifying one or more fluid inflow locations within the second wellbore using the one or more frequency domain features from the second acoustic signal.

A ninety fourth aspect can include the method of the ninety third aspect, comprising: obtaining a distributed temperature signal from the first wellbore; obtaining one or more temperature features from the distributed temperature signal; and identifying one or more fluid uptake locations within the subterranean formation using the temperature features within the first wellbore.

A ninety fifth aspect can include the method of the ninety fourth aspect, comprising shutting in the first wellbore after obtaining the first acoustic signal and before obtaining the distributed temperature signal.

A ninety sixth aspect can include the method of the ninety fourth or ninety fifth aspect, wherein the one or more temperature features comprise at least one of: a depth derivative of temperature with respect to depth, a temperature excursion measurement, wherein the temperature excursion measurement comprises a difference between a temperature reading at a first depth and a smoothed temperature reading over a depth range, wherein the first depth is within the depth range; a baseline temperature excursion, wherein the baseline temperature excursion comprises a derivative of a baseline excursion with depth, wherein the baseline excursion comprises a difference between a baseline temperature profile and a smoothed temperature profile; a peak-to-peak value, wherein the peak-to-peak value comprises a derivative of a peak-to-peak difference with depth, wherein the peak-to-peak difference comprises a difference between a peak high temperature reading and a peak low temperature reading with an interval; an autocorrelation, wherein the autocorrelation is a cross-correlation of the temperature signal with itself; a heat loss parameter; or a time-depth derivative, a depth-time derivative, or both.

A ninety seventh aspect can include the method of any one of the ninety fourth to ninety sixth aspects, wherein identifying the one or more fluid outflow locations comprises inputting the one or more frequency domain features from the first acoustic signal into a fluid outflow model, and wherein identifying the one or more fluid inflow locations comprises inputting the one or more frequency domain features from the second acoustic signal into a fluid inflow model.

A ninety eighth aspect can include the method of the ninety seventh aspect, wherein identifying the one or more fluid uptake locations comprises inputting the one or more temperature features into a fluid uptake model.

A ninety ninth aspect can include the method of the ninety eighth aspect, further comprising: determining a temperature change within the first wellbore at depths associated with the one or more fluid uptake locations for a time period; and determining an allocation of a total injected fluid volume into the first wellbore among the one or more fluid uptake locations based on the temperature change for the period of time.

A one hundredth aspect can include the method of any one of the ninety third to ninety ninth aspects, further comprising: determining an indication of a fluid flow rate through the one or more fluid outflow locations using the one or more frequency domain features from the first acoustic signal; and determining an indication of a fluid flow rate through the one or more fluid inflow locations using the one or more frequency domain features from the second acoustic signal.

A one hundred first aspect can include the method of the one hundredth aspect, wherein determining the indication of the fluid flow rate through the one or more fluid outflow locations comprises: determining an allocation of a total injected fluid volume into the first wellbore across the one or more fluid outflow locations using the one or more frequency domain features from the first acoustic signal.

A one hundred second aspect can include the method of the one hundredth aspect, wherein determining the indication of the fluid flow rate through the one or more fluid inflow locations comprises: determining an allocation of a total fluid volume produced from the second wellbore across the one or more fluid inflow locations using the one or more frequency domain features from the second acoustic signal.

A one hundred third aspect can include the method of the one hundredth aspect, comprising: identifying at least one of a gas phase flow, an aqueous phase flow, or a hydrocarbon liquid phase flow through the one or more inflow locations using the one or more the frequency domain features from the second acoustic signal.

A one hundred fourth aspect can include the method of the one hundred third aspect, wherein determining the indication of the fluid flow rate through the one or more fluid inflow locations comprises classifying a flow rate of the at least one of the gas phase flow, the aqueous phase flow, or the hydrocarbon liquid phase flow using the plurality of frequency domain features from the second acoustic signal.

A one hundred fifth aspect can include the method of the one hundred fourth aspect, wherein classifying the flow rate comprises classifying the flow rate of the at least one of the gas phase flow, the aqueous phase flow, or the hydrocarbon liquid phase flow into a plurality of predetermined flow rate ranges using the plurality of frequency domain features.

A one hundred sixth aspect can include the method of any one of the ninety third to one hundred fifth aspects, wherein the one or more frequency domain features of the first acoustic signal and the one or more frequency domain features of the second acoustic signal comprise at least one of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

A one hundred seventh aspect can include the method of any one of the ninety third to one hundred sixth aspects, wherein the first sensor comprises a first fiber optic-based acoustic sensor within the first wellbore, and the second sensor comprises a second fiber optic-based acoustic sensor within the second wellbore.

A one hundred eighth aspect can include the method of any one of the ninety third to one hundred seventh aspects, further comprising: adjusting one or more parameters of a reservoir model using the one or more fluid inflow locations and the one or more outflow locations, wherein the first wellbore and the second wellbore are within a reservoir represented by the reservoir model.

In a one hundred ninth aspect, a system for monitoring fluid injection into a subterranean formation comprises: a processor; a memory; and an analysis program stored in the memory, wherein the analysis program is configured, when executed on the processor, to: obtain a first acoustic signal, wherein the first acoustic signal is received from a first sensor within a first wellbore, wherein the first acoustic signal comprises acoustic samples across a portion of a depth of the first wellbore; determine one or more frequency domain features from the first acoustic signal; identify one or more fluid outflow locations within the first wellbore using the one or more frequency domain features from the first acoustic signal; obtain a second acoustic signal, wherein the second acoustic signal is received from a second sensor within a second wellbore, wherein the second acoustic signal comprises acoustic samples across a portion of a depth of the second wellbore; determine one or more frequency domain features from the second acoustic signal; and identify one or more fluid inflow locations within the second wellbore using the one or more frequency domain features from the second acoustic signal.

A one hundred tenth aspect can include the system of the one hundred ninth aspect, wherein the analysis program is configured, when executed on the processor, to: obtain a distributed temperature signal from the first wellbore; obtain one or more temperature features from the distributed temperature signal; and identify one or more fluid uptake locations within the subterranean formation using the temperature features within the first wellbore.

A one hundred eleventh aspect can include the system of the one hundred ninth or one hundred tenth aspect, wherein the one or more temperature features comprise at least one of: a depth derivative of temperature with respect to depth, a temperature excursion measurement, wherein the temperature excursion measurement comprises a difference between a temperature reading at a first depth and a smoothed temperature reading over a depth range, wherein the first depth is within the depth range; a baseline temperature excursion, wherein the baseline temperature excursion comprises a derivative of a baseline excursion with depth, wherein the baseline excursion comprises a difference between a baseline temperature profile and a smoothed temperature profile; a peak-to-peak value, wherein the peak-to-peak value comprises a derivative of a peak-to-peak difference with depth, wherein the peak-to-peak difference comprises a difference between a peak high temperature reading and a peak low temperature reading with an interval; an autocorrelation, wherein the autocorrelation is a cross-correlation of the temperature signal with itself; a heat loss parameter; or a time-depth derivative, a depth-time derivative, or both.

A one hundred twelfth aspect can include the system of any one of the one hundred ninth to one hundred eleventh aspects, wherein the analysis program is configured, when executed on the processor, to: input the one or more frequency domain features from the first acoustic signal into a fluid outflow model to identify the one or more fluid outflow locations, and input the one or more frequency domain features from the second acoustic signal into a fluid inflow model to identify the one or more fluid inflow locations.

A one hundred thirteenth aspect can include the system of the one hundred twelfth aspect, wherein the analysis program is configured, when executed on the processor, to input the one or more temperature features into a fluid uptake model to identify the one or more fluid uptake locations.

A one hundred fourteenth aspect can include the system of the one hundred thirteenth aspect, wherein the analysis program is configured, when executed on the processor, to: determine a temperature change within the first wellbore at depths associated with the one or more fluid uptake locations for a time period; and determine an allocation of a total injected fluid volume into the first wellbore across the one or more fluid uptake locations based on the temperature change for the period of time.

A one hundred fifteenth aspect can include the system of the one hundred fourteenth aspect, wherein the analysis program is configured, when executed on the processor, to: determine an indication of a fluid flow rate through the one or more fluid outflow locations using the one or more frequency domain features from the first acoustic signal; and determine an indication of a fluid flow rate through the one or more fluid inflow locations using the one or more frequency domain features from the second acoustic signal.

A one hundred sixteenth aspect can include the system of the one hundred fourteenth aspect, wherein the analysis program is configured, when executed on the processor, to determine the indication of the fluid flow rate through the one or more fluid outflow locations by: determining an allocation of a total injected fluid volume into the first wellbore across the one or more fluid outflow locations using the one or more frequency domain features from the first acoustic signal.

A one hundred seventeenth aspect can include the system of the one hundred sixteenth aspect, wherein the analysis program is configured, when executed on the processor, to determine the indication of the fluid flow rate through the one or more fluid inflow locations by: determining an allocation of a total fluid volume produced from the second wellbore across the one or more fluid inflow locations using the one or more frequency domain features from the second acoustic signal.

A one hundred eighteenth aspect can include the system of the one hundred sixteenth aspect, wherein the analysis program is configured, when executed on the processor, to: identifying at least one of a gas phase flow, an aqueous phase flow, or a hydrocarbon liquid phase flow through the one or more inflow locations using the one or more the frequency domain features from the second acoustic signal.

A one hundred nineteenth aspect can include the system of the one hundred eighteenth aspect, wherein the analysis program is configured, when executed on the processor, to determine the indication of the fluid flow rate through the one or more fluid inflow locations by classifying a flow rate of the at least one of the gas phase flow, the aqueous phase flow, or the hydrocarbon liquid phase flow using the plurality of frequency domain features from the second acoustic signal.

A one hundred twentieth aspect can include the system of the one hundred nineteenth aspect, wherein the analysis program is configured, when executed on the processor, to classify the flow rate of the at least one of the gas phase flow, the aqueous phase flow, or the hydrocarbon liquid phase flow into a plurality of predetermined flow rate ranges using the plurality of frequency domain features.

A one hundred twenty first aspect can include the system of any one of the one hundred ninth to one hundred twentieth aspects, wherein the one or more frequency domain features of the first acoustic signal and the one or more frequency domain features of the second acoustic signal comprise at least one of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

A one hundred twenty second aspect can include the system of any one of the one hundred ninth to one hundred twenty first aspects, wherein the first sensor is a first fiber optic-based acoustic sensor within the first wellbore, and the second sensor is a second fiber optic-based acoustic sensor within the second wellbore.

A one hundred twenty third aspect can include the system of any one of the one hundred ninth to one hundred twenty second aspects, wherein the analysis program is configured: adjust one or more parameters of a reservoir model using the one or more fluid inflow locations and the one or more outflow locations, wherein the first wellbore and the second wellbore are within a reservoir represented by the reservoir model.

In a one hundred twenty fourth aspect, a method of monitoring fluid injection into a subterranean formation comprises: injecting a volume of fluid into a first wellbore; obtaining a first acoustic signal from a first sensor within the first wellbore, wherein the first acoustic signal comprises acoustic samples across a portion of a depth of the first wellbore; determining one or more frequency domain features from the first acoustic signal; identifying one or more fluid outflow locations within the first wellbore using the one or more frequency domain features from the first acoustic signal; obtaining a distributed temperature signal from the first wellbore; obtaining one or more temperature features from the distributed temperature signal; determining a portion of the volume of fluid that is received within a plurality of uptake locations within the subterranean formation using the one or more temperature features; obtaining a second acoustic signal from a second sensor within a second wellbore, wherein the second acoustic signal comprises acoustic samples across a portion of a depth of the second wellbore; determining one or more frequency domain features from the second acoustic signal; and identifying a presence of at least one of a gas phase inflow, an aqueous phase inflow, or a hydrocarbon liquid phase inflow at one or more fluid inflow locations using the one or more frequency domain features from the second acoustic signal.

A one hundred twenty fifth aspect can include the method of the one hundred twenty fourth aspect, wherein obtaining the first acoustic signal comprises obtaining the first acoustic signal with a first fiber optic cable within the first wellbore, and wherein obtaining the second acoustic signal comprises obtaining the second acoustic signal with a second fiber optic cable within the second wellbore.

A one hundred twenty sixth aspect can include the method of the one hundred twenty fourth or one hundred twenty sixth aspect, wherein obtaining the distributed temperature signal comprises obtaining the distributed temperature signal with the first fiber optic cable.

A one hundred twenty seventh aspect can include the method of the one hundred twenty sixth aspect, comprising shutting in the first well after obtaining the first acoustic signal and before obtaining the distributed temperature signal.

A one hundred twenty eighth aspect can include the method of any one of the one hundred twenty fourth to one hundred twenty seventh aspects, wherein the one or more frequency domain features of the first acoustic signal and the one or more frequency domain features of the second acoustic signal comprise at least one of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

A one hundred twenty ninth aspect can include the method of any one of the one hundred twenty fourth to one hundred twenty eighth aspects, wherein the one or more temperature features comprise at least one of: a depth derivative of temperature with respect to depth, a temperature excursion measurement, wherein the temperature excursion measurement comprises a difference between a temperature reading at a first depth and a smoothed temperature reading over a depth range, wherein the first depth is within the depth range; a baseline temperature excursion, wherein the baseline temperature excursion comprises a derivative of a baseline excursion with depth, wherein the baseline excursion comprises a difference between a baseline temperature profile and a smoothed temperature profile; a peak-to-peak value, wherein the peak-to-peak value comprises a derivative of a peak-to-peak difference with depth, wherein the peak-to-peak difference comprises a difference between a peak high temperature reading and a peak low temperature reading with an interval; an autocorrelation, wherein the autocorrelation is a cross-correlation of the temperature signal with itself; a heat loss parameter; or a time-depth derivative, a depth-time derivative, or both.

In a one hundred thirtieth aspect, a method for monitoring fluid injection into a subterranean formation comprises: injecting a fluid into a wellbore extending into the subterranean formation; receiving an acoustic signal from a sensor within the wellbore, wherein the acoustic signal comprises acoustic samples across a portion of a depth of the wellbore; determining one or more frequency domain features from the acoustic signal; determining an allocation of an injected volume of the fluid across a plurality of outflow locations using the one or more frequency domain features; receiving, at a first time, an indication of a change in the allocation; storing a portion of the acoustic signal as a result of receiving the indication of the change, wherein the portion includes the first time; and identifying an event within the subterranean formation using the portion of the acoustic signal.

A one hundred thirty first aspect can include the method of the one hundred thirtieth aspect, wherein storing the portion of the acoustic signal comprises storing the portion of the acoustic signal associated with a selected depth or depth interval within the wellbore that corresponds with the indication of the change.

A one hundred thirty second aspect can include the method of the one hundred thirtieth or one hundred thirty first aspect, wherein the event comprises fracture formation within the subterranean formation.

A one hundred thirty third aspect can include the method of the one hundred thirty second aspect, wherein the change in the allocation comprises a change that is greater than a predetermined threshold.

A one hundred thirty fourth aspect can include the method of any one of the one hundred thirtieth to one hundred thirty third aspects, comprising denoising the portion of the acoustic signal before identifying the event.

A one hundred thirty fifth aspect can include the method of the one hundred thirty fourth aspect, wherein identifying the event comprises triangulating the location of the fracture within the subterranean formation based on the acoustic signal along the portion of the depth of the wellbore.

A one hundred thirty sixth aspect can include the method of any one of the one hundred thirtieth to one hundred thirty fifth aspects, wherein the one or more frequency domain features comprise at least one of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

A one hundred thirty seventh aspect can include the method of the one hundred thirty sixth aspect, comprising identifying the plurality of fluid outflow locations using the one or more frequency domain features.

A one hundred thirty eighth aspect can include the method of any one of the one hundred thirtieth to one hundred thirty seventh aspects, comprising: shutting in the wellbore; determining a temperature change over time at depths associated with one or more fluid uptake locations within the subterranean formation; and determining an allocation of the injected volume across the one or more fluid uptake locations based on the temperature change.

A one hundred thirty ninth aspect can include the method of the one hundred thirty eighth aspect, wherein determining the temperature change comprises receiving a temperature signal from a fiber optic-based temperature sensor disposed within the wellbore.

A one hundred fortieth aspect can include the method of any one of the one hundred thirtieth to one hundred thirty ninth aspects, wherein receiving the acoustic signal comprises receiving the acoustic signal from a fiber optic-based sensor within the wellbore.

A one hundred forty first aspect can include the method of the one hundred thirty second aspect, comprising: obtaining a second acoustic signal from a second sensor within a second wellbore extending in the subterranean formation, wherein the second acoustic signal comprises acoustic samples across a portion of a depth of the second wellbore; determining one or more frequency domain features from the second acoustic signal; and confirming the fracture formation using the one or more frequency domain features from the second acoustic signal.

A one hundred forty second aspect can include the method of any one of the one hundred thirtieth to one hundred forty first aspects, further comprising: adjusting one or more parameters of a reservoir model based on the identification of the event within the subterranean formation.

In a one hundred forty third aspect, a system for monitoring fluid injection into a subterranean formation comprises: a processor; a memory; and an analysis program stored in the memory, wherein the analysis program is configured, when executed on the processor, to: receive an acoustic signal, wherein the acoustic signal is received from a sensor within a wellbore as a fluid is injected within the wellbore, wherein the acoustic signal comprises acoustic samples across a portion of a depth of the wellbore; determine one or more frequency domain features from the acoustic signal; determine an allocation of an injected volume of the fluid across a plurality of outflow locations using the one or more frequency domain features; receive, at a first time, an indication of a change in the allocation; store a portion of the acoustic signal as a result of receiving the indication of the change, wherein the portion includes the first time; and identify an event within the subterranean formation using the portion of the acoustic signal.

A one hundred forty fourth aspect can include the system of the one hundred forty third aspect, wherein the event comprises fracture formation within the subterranean formation.

A one hundred forty fifth aspect can include the system of the one hundred forty third or one hundred forty fourth aspect, wherein the change in the allocation comprises a change that is greater than a predetermined threshold.

A one hundred forty sixth aspect can include the system of any one of the one hundred forty third to one hundred forty fifth aspects, wherein the analysis program is configured, when executed on the processor, to denoise the portion of the acoustic signal before identifying the event.

A one hundred forty seventh aspect can include the system of any one of the one hundred forty fourth to one hundred forty sixth aspects, wherein the analysis program is configured, when executed on the processor, to locate the fracture within the subterranean formation based on the acoustic signal along the portion of the depth of the wellbore.

A one hundred forty eighth aspect can include the system of any one of the one hundred forty third to one hundred forty seventh aspects, wherein the one or more frequency domain features comprise at least one of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

A one hundred forty ninth aspect can include the system of any one of the one hundred forty third to one hundred forty eighth aspects, comprising identifying the plurality of fluid outflow locations using the one or more frequency domain features.

A one hundred fiftieth aspect can include the system of the one hundred forty ninth aspect, wherein the analysis program is configured, when executed on the processor, to: determine a temperature change over time at depths associated with one or more fluid uptake locations within the subterranean formation; and determine an allocation of the injected volume among the one or more fluid uptake locations based on the temperature change.

A one hundred fifty first aspect can include the system of the one hundred fiftieth aspect, comprising a fiber optic-based temperature sensor disposed within the wellbore; wherein the analysis program is configured, when executed on the processor, to: receive a temperature signal from the fiber optic-based temperature sensor; and determine the temperature change based on the temperature signal.

A one hundred fifty second aspect can include the system of the one hundred fifty first aspect, comprising a fiber optic-based acoustic sensor disposed within the wellbore, wherein the analysis program is configured, when executed on the processor, to receive the acoustic signal from the fiber optic-based acoustic sensor.

A one hundred fifty third aspect can include the system of any one of the one hundred forty third to one hundred fifty second aspects, wherein the analysis program is configured, when executed on the processor, to: adjust one or more parameters of a reservoir model based on the identification of the event within the subterranean formation.

In a one hundred fifty fourth aspect, a method for monitoring fluid injection into a subterranean formation comprises: injecting a fluid into a wellbore extending into the subterranean formation; receiving an acoustic signal from a sensor within the wellbore, wherein the acoustic signal comprises acoustic samples across a portion of a depth of the wellbore; determining one or more frequency domain features from the acoustic signal; determining an allocation of an injected volume of the fluid across a plurality of outflow locations using the one or more frequency domain features; receiving, at a first time, an indication of a change in the allocation; storing a portion of the acoustic signal as a result of receiving the indication of the change, wherein the portion includes the first time; and identifying and locating a fracture within the subterranean formation using the portion of the acoustic signal.

A one hundred fifty fifth aspect can include the method of the one hundred fifty fourth aspect, comprising: shutting in the wellbore; determining a temperature change over time at depths associated with one or more fluid uptake locations within the subterranean formation; and determining an allocation of the injected volume among the one or more fluid uptake locations based on the temperature change.

A one hundred fifty sixth aspect can include the method of the one hundred fifty fourth or one hundred fifty fifth aspect, wherein receiving the acoustic signal comprises receiving the acoustic signal from a fiber optic-based sensor within the wellbore.

A one hundred fifty seventh aspect can include the method of the one hundred fifty sixth aspect, wherein determining the temperature change comprises receiving a temperature signal from a fiber optic-based temperature sensor disposed within the wellbore.

A one hundred fifty eighth aspect can include the method of any one of the one hundred fifty fourth to the one hundred fifty seventh aspects, wherein the one or more frequency domain features comprise at least one of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

A one hundred fifty ninth aspect can include the method of the one hundred fifty eighth aspect, wherein determining the allocation of the injected volume comprises: determining an amplitude of fluid outflow through each of the plurality of fluid outflow locations; and determining the allocation based on the amplitude.

The embodiments disclosed herein include systems and methods for characterizing various fluid flows within, into, and out of a subterranean wellbore. In some embodiments, the embodiments disclosed herein may utilize a fiber optic cable to make distributed acoustic and/or temperature measurements within the wellbore, and then using these measurement determine, identify, or otherwise characterize various parameters, events, etc. of the fluid flowing within, into, or out of the wellbore during operations. Accordingly, through use of the systems methods disclosed herein, well operators are given enhanced indications and knowledge of the downhole environment so that downhole operations with the wellbore may be improved.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of monitoring fluid outflow along a wellbore, the method comprising:
   determining one or more temperature features from a distributed temperature signal originating in the wellbore, wherein the one or more temperature features represent a distribution of measure temperatures and comprise statistical variations of a temperature measurement obtained from the distributed temperature signal through depth or both time and depth;
   determining one or more frequency domain features from an acoustic signal originating in the wellbore; and
   using the one or more temperature features and the one or more frequency domain features to identify one or more fluid outflow locations along the wellbore, wherein the one or more fluid outflow locations comprise locations having fluid flow from within the wellbore to a surrounding subterranean formation.

2. The method of claim 1, wherein using the one or more temperature features and the one or more frequency domain features comprises:
   using the one or more temperature features in a first fluid outflow model;
   using the one or more frequency domain features in a second fluid outflow model;
   combining an output from the first fluid outflow model and an output from the second fluid outflow model to form a combined output; and
   identifying the one or more fluid outflow locations along the wellbore based on the combined output.

3. The method of claim 2, wherein the first fluid outflow model comprises one or more multivariate models, and wherein the output from each multivariate model of the one or more multivariate models comprises an indication of the one or more locations along the wellbore.

4. The method of claim 3, wherein the second fluid outflow model comprises a regression model, and wherein the output from the regression model comprises an indication of a fluid outflow rate at the one or more locations along the wellbore.

5. The method of claim 4, wherein combining the output from the first fluid outflow model with the output from the second fluid outflow model comprises determining the combined output as a function of: 1) the output from the first fluid outflow model, and 2) the output from the second fluid outflow model.

6. The method of claim 5, further comprising determining an allocation of a total injected fluid flow into the wellbore across the one or more fluid outflow locations based on the combined output.

7. The method of claim 1, wherein the one or more temperature features comprise at least one of:
   a depth derivative of temperature with respect to depth,
   a temperature excursion measurement, wherein the temperature excursion measurement comprises a difference between a temperature reading at a first depth and a smoothed temperature reading over a depth range, wherein the first depth is within the depth range;
   a baseline temperature excursion, wherein the baseline temperature excursion comprises a derivative of a baseline excursion with depth, wherein the baseline excursion comprises a difference between a baseline temperature profile and a smoothed temperature profile;
   a peak-to-peak value, wherein the peak-to-peak value comprises a derivative of a peak-to-peak difference with depth, wherein the peak-to-peak difference comprises a difference between a peak high temperature reading and a peak low temperature reading with an interval;
   an autocorrelation, wherein the autocorrelation is a cross-correlation of the temperature signal with itself;
   a heat loss parameter; or
   a time-depth derivative, a depth-time derivative, or both.

8. The method of claim 1, wherein the one or more frequency domain features comprise at least one of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

9. The method of claim 1, comprising obtaining the distributed temperature signal from a fiber optic-based temperature sensor within the wellbore.

10. The method of claim 1, comprising obtaining the acoustic signal from a fiber optic-based acoustic sensor within the wellbore.

11. A system for monitoring fluid outflow along a wellbore, the system comprising:
    a processor;
    a memory; and
    an analysis program stored in the memory, wherein the analysis program is configured, when executed on the processor, to:
      receive a distributed temperature signal and an acoustic signal, wherein the distributed temperature sensing signal and the acoustic signal originated within the wellbore;
      determine one or more temperature features from the distributed temperature sensing signal, wherein the one or more temperature features represent a distribution of measure temperatures and comprise statistical variations of a temperature measurement obtained from the distributed temperature sensing signal through depth or both time and depth;
      determine one or more frequency domain features from the acoustic signal; and
      identify one or more fluid outflow locations along the wellbore using the one or more temperature features and the one or more frequency domain features, wherein the one or more fluid outflow locations comprise locations having fluid flow from within the wellbore to a surrounding subterranean formation.

12. The system of claim 11, wherein the analysis program is configured, when executed on the processor, to:
    use the one or more temperature features in a first fluid outflow model;
    use the one or more frequency domain features in a second fluid outflow model;
    combine an output from the first fluid outflow model and an output from the second fluid outflow model to form a combined output; and
    identify the one or more fluid outflow locations along the wellbore based on the combined output.

13. The system of claim 12, wherein the first fluid outflow model comprises one or more multivariate models, and wherein the output from each multivariate model of the one or more multivariate models comprises an indication of the one or more locations along the wellbore.

14. The system of claim 12, wherein the second fluid outflow model comprises a regression model, and wherein the output from the regression model comprises an indication of a fluid outflow rate at the one or more locations along the wellbore.

15. The system of claim 12, wherein the analysis program is configured, when executed on the processor, to combine the output from the first fluid outflow model with the output from the second fluid outflow model as a function of: 1) the output from the first fluid outflow model, and 2) the output from the second fluid outflow model.

16. The system of claim 12, wherein the analysis program is configured, when executed on the processor, to determine an allocation of a total injected fluid flow into the wellbore across the one or more fluid outflow locations based on the combined output.

17. The system of claim 11, wherein the one or more temperature features comprise at least one of:
- a depth derivative of temperature with respect to depth;
- a temperature excursion measurement, wherein the temperature excursion measurement comprises a difference between a temperature reading at a first depth and a smoothed temperature reading over a depth range, wherein the first depth is within the depth range;
- a baseline temperature excursion, wherein the baseline temperature excursion comprises a derivative of a baseline excursion with depth, wherein the baseline excursion comprises a difference between a baseline temperature profile and a smoothed temperature profile;
- a peak-to-peak value, wherein the peak-to-peak value comprises a derivative of a peak-to-peak difference with depth, wherein the peak-to-peak difference comprises a difference between a peak high temperature reading and a peak low temperature reading with an interval;
- an autocorrelation, wherein the autocorrelation is a cross-correlation of the temperature signal with itself;
- a heat loss parameter; or
- a time-depth derivative, a depth-time derivative, or both.

18. The system of claim 11, wherein the one or more frequency domain features comprise at least one of: a spectral centroid, a spectral spread, a spectral roll-off, a spectral skewness, an RMS band energy, a total RMS energy, a spectral flatness, a spectral slope, a spectral kurtosis, a spectral flux, or a spectral autocorrelation function.

19. The system of claim 11, comprising a fiber optic-based temperature sensor within the wellbore, wherein the analysis program is configured, when executed on the processor, to obtain the distributed temperature signal from the fiber optic-based temperature sensor.

20. The system of claim 11, comprising a fiber optic-based acoustic sensor within the wellbore, wherein the analysis program is configured, when executed on the processor, to obtain the acoustic signal from the fiber optic-based acoustic sensor.

* * * * *